(12) United States Patent
Ware et al.

(10) Patent No.: US 11,780,154 B2
(45) Date of Patent: Oct. 10, 2023

(54) EXTRUSION PRINTING OF LIQUID CRYSTAL ELASTOMERS

(71) Applicants: Board of Regents, The University of Texas System, Austin, TX (US); University of Pittsburgh—Of the Commonwealth System of Higher Education, Pittsburgh, PA (US)

(72) Inventors: Taylor H. Ware, Dallas, TX (US); Cedric P. Ambulo, Plano, TX (US); Mohand O. Saed, Dallas, TX (US); Jennifer M. Boothby, Plano, TX (US); Julia J. Henricks, Dallas, TX (US); Ravi Shankar Meenakshisundaram, Aspinwall, PA (US)

(73) Assignees: University of Pittsburgh—Of the Commonwealth System of Higher Education, Pittsburgh, PA (US); Board of Regents, The University of Texas System, Austin, TX (US)

( * ) Notice: Subject to any disclaimer, the term of this patent is extended or adjusted under 35 U.S.C. 154(b) by 147 days.

(21) Appl. No.: 17/238,771

(22) Filed: Apr. 23, 2021

(65) Prior Publication Data

US 2021/0331374 A1    Oct. 28, 2021

Related U.S. Application Data

(62) Division of application No. 16/104,574, filed on Aug. 17, 2018, now Pat. No. 11,014,285.

(Continued)

(51) Int. Cl.
*B33Y 70/00* (2020.01)
*C09D 11/101* (2014.01)

(Continued)

(52) U.S. Cl.
CPC .......... *B29C 64/106* (2017.08); *B29C 64/112* (2017.08); *B29C 71/04* (2013.01);
(Continued)

(58) Field of Classification Search
None
See application file for complete search history.

(56) References Cited

U.S. PATENT DOCUMENTS

| 6,218,578 B1 * | 4/2001 | Coates .................. C09K 19/38 |
| | | 568/61 |
| 2014/0106089 A1 * | 4/2014 | Lee .................... C09K 19/2007 |
| | | 428/1.23 |

FOREIGN PATENT DOCUMENTS

WO    WO-2006131191 A1 *  12/2006    ............. C09K 19/04

OTHER PUBLICATIONS sciencedirect.com/topics/chemistry/oligomer (downloaded Oct. 31, 2022).*

(Continued)

*Primary Examiner* — Vu A Nguyen

(74) *Attorney, Agent, or Firm* — The Webb Law Firm

(57) ABSTRACT

A method of ink-extrusion printing an object, including providing a mixture including liquid crystal monomers and photo-catalyzing or heating the mixture to produce a liquid crystal ink. The ink is in a nematic phase. The method includes extruding the ink through a print-head orifice moving along a print direction to form an extruded film of the object. The extruded film exhibits birefringence. Also disclosed are a liquid crystal ink. The ink includes a mixture including liquid crystal monomers. The mixture when at a target printing temperature is in a nematic phase. Also disclosed is ink-extrusion-printed object. The object includes an extrusion-printed film including a nematic liquid (Continued)

Figure 1:
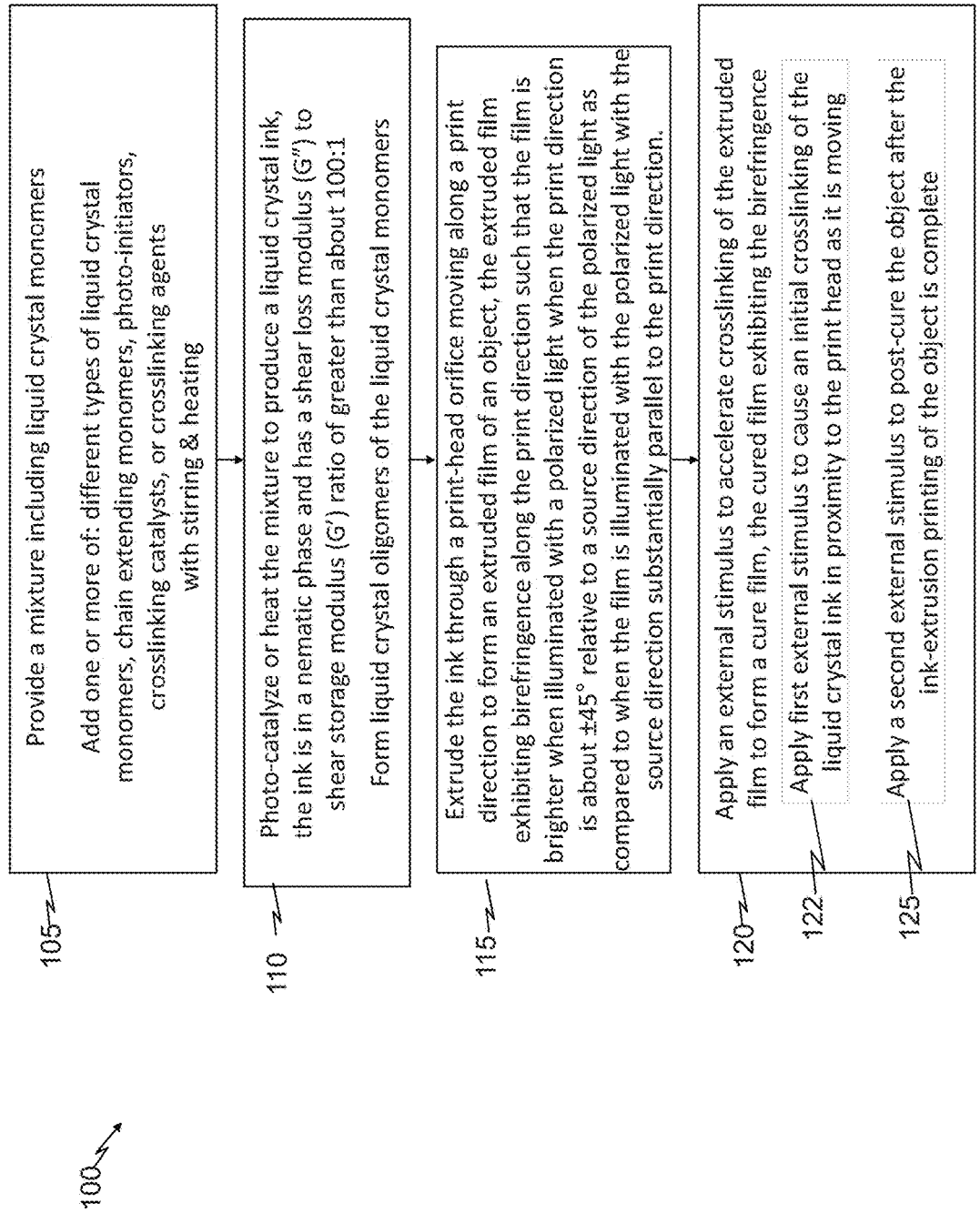

crystal elastomer, wherein the film exhibits birefringence along an extrusion axis of the film.

12 Claims, 63 Drawing Sheets

Related U.S. Application Data

(60) Provisional application No. 62/702,127, filed on Jul. 23, 2018, provisional application No. 62/547,782, filed on Aug. 19, 2017.

(51) Int. Cl.

| | |
|---|---|
| C09D 11/107 | (2014.01) |
| C09K 19/38 | (2006.01) |
| B29C 64/106 | (2017.01) |
| B29C 64/112 | (2017.01) |
| B29C 71/04 | (2006.01) |
| B33Y 80/00 | (2015.01) |
| B33Y 10/00 | (2015.01) |
| C09K 19/00 | (2006.01) |
| B29C 35/08 | (2006.01) |
| B29K 105/00 | (2006.01) |

(52) U.S. Cl.
CPC ............... *B33Y 10/00* (2014.12); *B33Y 70/00* (2014.12); *B33Y 80/00* (2014.12); *C09D 11/101* (2013.01); *C09D 11/107* (2013.01); *C09K 19/00* (2013.01); *B29C 2035/0827* (2013.01); *B29K 2105/0079* (2013.01)

(56) References Cited

OTHER PUBLICATIONS

Kamal and Park, Chem. Commun., 2014, 50, 2030 (ESI).*
Bende et al., "Geometrically controlled snapping transitions in shells with curved creases", Applied Physical Sciences, PNAS, Sep. 5, 2015, pp. 11175-11180, vol. 12, No. 36, www.pnas.org/cgi/doi/10.1073/pnas.1509228112.
Bladon et al., "Transitions and instabilities in liquid-crystal elastomers", The American Physical Society, Physical Review E, Jun. 1993, 3 pages, vol. 47, No. 6.
Brostow et al., "Rheological properties and morphology of binary blends of a longitudinal polymer liquid crystal with engineering polymers", Polymer, 1996, pp. 1561-1574, vol. 37, No. 9.
Camacho-Lopez et al., "Fast liquid crystal elastomer swims into the dark", electronic-Liquid Crystal Communications, Nov. 26, 2003, 9 pages, http://www.e-lc.org/docs/2003_11_25_00_32_43.
Compton et al., "3D-Printing of Lightweight Cellular Composites", Advanced Materials, www.MaterialsViews.com, willeyonlinelibrary.com, 2014, pp. 5930-5935.
Dehaan et al., "Engineering of Complex Order and Macroscopic Deformation of Liquid Crystal Polymer Networks", Smart Materials, Angew. Chem. Int. Ed., 51, Angewandte Communications, 2012, pp. 12469-12472.
Felton et al., "A method for building self-folding machines", http://science.sciencemag.org, Aug. 8, 2014, 4 pages, vol. 345, Issue 6197.
Ge et al., "Active origami by 4D printing", Smart Materials and Structures, 2014, pp. 1-15, IOP Publishing.
Ge et al., "Multimaterials 4D Printing with Tailorable Shape Memory polymers", Scientific Reports, www.nature.com/scientificreports, Apr. 1, 2016, pp. 1-11.
Gladman et al., "Biomimetic 4D printing", nature materials, Advance Online Publishtion, www.nature.com/naturematerials, Jan. 25, 2016, 27 pages.
Huang et al., "Ultrafast Digital Printing toward 4D Shape Changing Materials", Advanced Science News, www.advancedsciencenews.com, www.advmat.de, wileyonlinelibrary.com, Adv. Mater., 29, 1605390, 2017, pp. 1-6.
Keplinger et al., "Harnessing snap-through instability in soft dielectrics to acheive giant voltage-triggered deformation", Soft Matter, www.rsc.org/softmatter, The Royal Society of Chemistry, 2012, pp. 285-288.
Krause et al., "Photocrosslinkable Liquid Crystal Main-Chain Polymers: Thin Films and Electrospinning", Macromolecular Rapid Communications, Macromolecular Journals, 2007, pp. 2062-2068.
Lee et al., "First jump of microgel, actuation speed enhancement by elastic instability", www.rsc.org/softmatter, The Royal Society of Chemistry, Mar. 11, 2010, pp. 4342-4345.
Liu et al., "Liquid Crystal Polymer Networks: Preparation, Properties, and Appliances of Films with Patterned Molecular Alignment", Langmuir, pubs.acs.org/Langmuir, ACS Publications, American Chemical Society, 2014, pp. 13499-13509.
Mao et al., "3D Printed Reversible Shape Changing Components with Stimuli Responsive Materials", Scientific Reports, www.nature.com/scientificreports, Jan. 14, 2016, pp. 1-13.
Modes et al., "Gaussian curvature from flat elastica sheets", Proceedings of The Royal Society, http://rspa.royalsocietypublishing.org, Oct. 20, 2010, pp. 1121-1140.
Modes et al., "Responsive nematic solid shells: Topology, compatibility, and shape", A Letters Journal Exploring the Frontiers of Physics, www.epjournal.org, Aug. 19, 2011, pp. 1-4.
Morales et al., "Bending of Responsive Hydrogel Sheets Guided by Field-Assembled Microparticle Endoskeleton Structures", Soft Actuators, www.MaterialsViews.com, www.small-journal.com, 2016, pp. 2283-2290.
Morrison et al., "Mitigation of Tracheobronchomalacia with 3D-Printed Personalized Medical Devices in Pediatric Patients", HHS Public Access, Author manuscript, Apr. 29, 2016, 23 pages.
Naciri et al., "Nematic Elastomer Fiber Actuator", Macromolecules, American Chemical Society, Jul. 2, 2003, pp. 8499-8505.
Ohm et al., "A Continuous Flow Synthesis of Micrometer-Sized Actuators from Liquid Crystalline Elastomers", Advanced Materials, www.advmat.de, 2009, pp. 4859-4862.
Patel et al., "Highly Stretchable and UV Curable Elastomers for Digital Light Processing Based 3D Printing", Advanced Materials, www.advmat.de, Advanced Science News, www.advancedsciencenews.com, Feb. 2017, pp. 1-7.
Pei et al., "Mouldable liquid-crystalline elastomer actuators with exchangeable covalent bonds", nature materials, vww.nature.com/naturematerials, 2013, pp. 36-41, vol. 13.
Raviv et al., "Active Printed Materials for Complex Self-Evolving Deformations", Scientific Reports; Jul. 14, 2014, pp. 1-8, 4:7422.
Rodriguez et al., "Shape-morphing composites with designed microarchitectures", Scientific Reports, www.nature.com/scientificreports, Feb. 10, 2016, pp. 1-10, 6:27933.
Rossiter et al., "Printing 3D dielectric elastomer actuators for soft robotics", Electroactive Polymer Actuators and Devices (EAPAD), 2009, 10 pages, vol. 7287, http://proceedings.spiedigitallibrary.org.
Sawa et al., "Shape selection of twist-nematic-elastomer ribbons", PNAS, Apr. 19, 2011, pp. 6344-6368, vol. 108, No. 16, www.pnas.org/cgi/doi/10.1073/pnas.1017658108.
Shankar et al., "Contactless, photoinitiated snap-through in azobenzene-functionalized polymers", PNAS, Jul. 12, 2013, pp. 18792-18797, vol. 110, No. 47, www pnas org/cgi/doi/10.1313195110.
Tajbakhsh et al., "Spontaneous thermal expansion of nematic elastomers", The European Physical Journal E, EPD Sciences, Jun. 25, 2001, pp. 181-188.
Taylor et al., "Bimodal Orientation Defects in Main-Chain Thermotropic Liquid Crystalline Polymer Fibers", Macromolecules 2002, 35, American Chemical Society, Apr. 27, 2001, pp. 1751-1758.
Thomsen III et al., "Liquid Crystal Elastomers with Mechanical Properties of a Muscle", Macromolecules 2001, 34, American Chemical Society, Sep. 22, 2000, pp. 5868-5875.
Villar et al., "A Tissue-Like Printed Material", NIH Public Access, Author Manuscript, Apr. 5, 2013, 9 pages.
Ware et al., "Localized soft elasticity in liquid crystal elastomers", nature communications, www.nature.com/naturecommunications, Feb. 23, 2016, pp. 1-7.

(56) References Cited

OTHER PUBLICATIONS

Ware et al., "programmable Liquid Crystal Elastomers Prepared by Thiol-Ene Photopolymerization", ACS Macro Letters, pubs acs.org/macroletters, American Chemical Society, Jul. 23, 2015, pp. 942-946.

Ware et al., "Voxelated liquid crystal elastomers", Actuating Materials, sciencemag.org, Feb. 27, 2015, 4 pages, vol. 347, Issue 6225.

Warner et al., "Curvature in nematic elastic responding to light and heat", Proceedings of The Royal Society, Apr. 29, 2010, pp. 2975-2898, http://rspa.royalsocietypublishing.org.

Wei et al., "Direct-Write Fabrication of 4D Active Shape-Changing Structures Based on a Shape Memory Polymer and Its Nanocomposite", Applied Materials & Interfaces, www.acsami.org, American Chemical Society, Oct. 9, 2016, pp. 876-883.

Wernter et al., "Liquid crystalline elastomers as artificial muscles", e-Polymers 2001, Jul. 19, 2001, pp. 1-13, No. 013, http://www.e-polymers.org.

Wissbrun et al., "Rheology of a Thermotropic Polyester in the Nematic and Isotropic States", Journal of Polymer Science: Polymer Physics Edition, pp. 1835-1845, vol. 20.

Wu et al., "Isotropic Negative Thermal Expansion Metamaterialls", Applied Materials & Interfaces, www.acsami.org, American Chemical Society, 2016, pp. 17721-17727.

Yakacki et al., "Tailorable and programmable liquid-crystalline elastomers using a two-stage thiol-acrylate reaction", RSC Advances, www.rcs.org/advances, Royal Society of Chemistry, Jan. 18, 2015, pp. 18997-19001.

Yu et al., "Controlled Sequential Shape Changing Components by 3D Printing f Shape Memory Polymer Multimaterials", ScienceDirect, www.sciencedirect.com, www.elsevier.com/locate/procedia, IUTAM Symposium on Mechanics of Soft Active Materials, 2014, 11 pages.

Yuan et al., "3D printed reversible shape changing soft actuator assisted by liquid crystal elastomer", Royal Society of Chemistry, rsc.li/soft-matter-journal, 2017, 25 pages.

Zarek et al., "4D Printing of Shape Memory-Based Personalized Endoluminal Medical Devices", Macromolecular Rapid Communications, Macromolecular Journals, wileyonlinelibrary.com, 2017, pp. 1-6.

Zeng et al., "Light Robots: Bridging the Gap between Microbotics and Photomachanics in Soft Materials", Research News, Advanced Materials, www.advmat.de, 2017, pp. 1-9.

\* cited by examiner

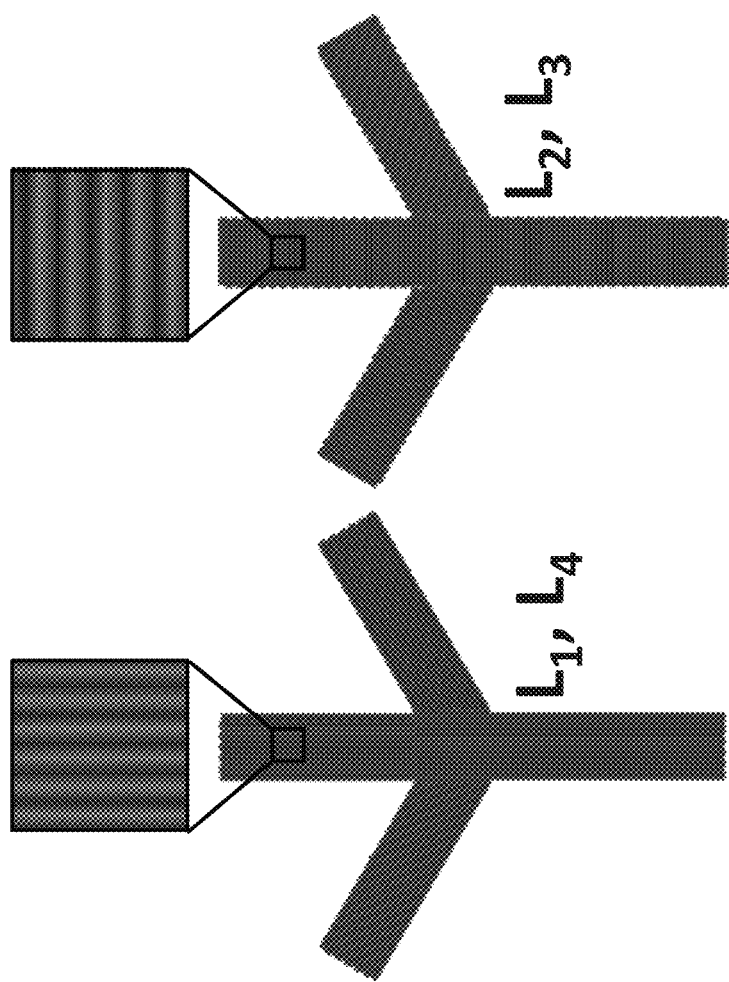

EXTRUSION PRINTING OF LIQUID CRYSTAL ELASTOMERS

CROSS-REFERENCE TO RELATED APPLICATION

This application is a divisional of U.S. Non-Provisional application Ser. No. 16/104,574, filed Aug. 17, 2018, which claims the benefit of U.S. Provisional Application Ser. No. 62/547,782, filed by Ware, et al. on Aug. 19, 2017, entitled "A METHOD FOR ADDITIVE MANUFACTURING OF LIQUID CRYSTAL ELASTOMERS," and U.S. Provisional Application Ser. No. 62/702,127, by Ware, et al. on Jul. 23, 2018, entitled "MOLECULARLY-ENGINEERED, 4D-PRINTED LIQUID CRYSTAL ELASTOMERS," by Ware et al. commonly assigned with this application and incorporated herein by reference.

GOVERNMENT LICENSE RIGHTS

This invention was made with Government Support under FA9550-17-1-0328 awarded by the Air Force Office of Scientific Research. The government has certain rights in this invention.

TECHNICAL FIELD

This application is directed, in general, to liquid crystal elastomer objects, to methods for ink-extrusion printing, to inks for manufacturing such object, and objects manufactured therefrom.

BACKGROUND

Four-dimensional (4D) printing is a term that describes additive manufacturing of stimuli-responsive materials. This process results in 3D structures capable of morphing into a distinct 3D geometry over time[p1-1-3]. These morphing structures may enable a wide variety of smart devices from soft robots[p1-4-6] to morphing medical devices[p1-7-9]. A variety of material strategies have arisen to enable these morphing structures. Printed shape memory polymers can be mechanically processed after fabrication to temporarily store and then recover a printed shape[p1-2,p1-10-12]. However, this method may require mechanical programming to achieve desired shape change. To fabricate 3D structures capable of autonomous and reversible shape change, several strategies have been developed that program the stimulus response of the material during the printing process[p1-1,p1-3,p1-13]. Important to this strategy is programming material microstructures in a way that controls macroscopic deformations. For example, by controlling the local coefficient of thermal expansion in printed structures, porous objects with negative global coefficient of thermal expansion can be fabricated. However, this deformation is limited by the small magnitude and isotropic nature of thermal expansion. Another approach to designing morphing structures is to locally program anisotropic stimulus response[p1-3,p1-14,p1-15]. Direct-write printing (often referred to as extrusion-printing herein), an intrinsic anisotropic process, can be used to create hydrogels that locally swell anisotropically. This large, programmable shape change can be utilized to create structures that bend, twist, or curve on the macroscale. However, shape change in hydrogels is often limited by diffusion speed and the requisite aqueous environment[p1-16]. It would be desirable to have printable materials that undergo large, anisotropic, rapid, and reversible deformations to enable future 4D printed smart system.

Liquid crystal elastomers (LCEs) are a class of stimuli-responsive polymers that undergo large, reversible, anisotropic shape change in response to a variety of stimuli, including heat and light. Unlike many materials that undergo reversible shape change, these materials neither require an external load nor an aqueous environment, making them ideal candidates for many applications. For LCEs to undergo reversible shape-change in the absence of load, the LCE should be crosslinked in an aligned state[p1-17]. Commonly, partially-crosslinked LCEs are fully crosslinked under a mechanical load leading to permanent orientation of the liquid crystal (LC) molecules within the polymer network[p1-18,p1-19]. On heating, the resulting aligned LCEs contract along the alignment direction, or nematic director, and expand in the perpendicular axes[p1-20]. With this process, it is difficult to program the stimulus response of the material in a spatially-varied manner. As such, several methods have been developed to align monomeric or oligomeric LCE precursors. Using patterned surface treatments first developed to pattern densely crosslinked LC polymer networks[p1-21], LC monomers can be patterned with high spatial resolution[p1-22,p-23]. LCEs resulting from this process can be designed to undergo both in-plane and out-of-plane patterned shape change. However, this technique maybe limited to the production of relatively thin, planar films (less than 100 μm thick). Shear forces have been shown to induce alignment within monomeric and oligomeric LC molecules. Alignment results from processes such as electrospinning[p1-24,p1-25] and fiber drawing from the melt[p1-26, p1-27] However, to our knowledge, shear has not been used to spatially or hierarchically control alignment within LCEs.

Mechanically-active soft materials may replace traditional actuators in applications where low density, large shape change, and autonomous activation provide critical benefits, including applications such as soft robots,[p2-1][p2-2] artificial muscles,[p2-3] sensors,[p2-4] and aerospace systems.[p2-5] These smart materials can be designed to transduce thermal,[p2-4][p2-6] chemical,[p2-1][p2-7] magnetic,[p2-8][p2-9] or light[p2-10][p2-11][p2-12] energy into mechanical work. As compared to rigid active materials, such as shape memory alloys, a primary advantage of active soft materials is that polymer processing techniques can be used to control the properties of the material.[p2-13][p2-14] A number of conventional manufacturing strategies have been employed to fabricate smart, soft material such as casting, fiber spinning, and molding.[p2-15][p2-16][p2-17] More recently, additive manufacturing techniques have been applied to mechanically-active polymers.[p2-18] The resulting printed, 3D structures are capable of undergoing change in shape over time and, as such, these manufacturing techniques are denoted as 4D printing. 4D printing has already been used to fabricate a range of mechanically-active smart materials, such as shape memory polymers (SMPs),[p2-19][p2-20] hydrogels,[p2-21] and fluidic elastomer actuators (FEAs).[p2-22] Demonstrated 4D printed structures include SMP hinges in origami robots,[p2-23] morphing hydrogel structures,[p2-24] and somatosensitive grippers with complex networks of FEA sensors.[p2-22] However, all of these materials strategies have fundamental design limitations preventing them from achieving reversible, untethered, and low-hysteresis shape change that would enable 4D printed materials to operate as autonomous morphing structures. For example, printable SMPs exhibit irreversible deformation, limiting SMPs to applications requiring deployment. Reversible swelling in printed, anisotropic hydrogel composites can be used to create morphing structures, but these materials have relatively low blocking stress and diffusion-limited actuation speed. FEAs can exert high stresses but require a tethered fluid pressure system to induce large reversible deformation.

Liquid crystal elastomers (LCEs) are mechanically-active soft materials that undergo reversible shape change that does not require mechanical bias, aqueous environment, or tethered power source and as such these materials are of interest as actuators and morphing structures. Shape change of up to 400% is observed in response to stimuli that induce the transition of the material from ordered to disordered, most typically a change in temperature.[p2-25] Finkelmann and co-workers first reported this behavior by uniaxially aligning LCEs during crosslinking by applying a load.[p2-26][p2-10] Recently, several processing methods have arisen to enable LCEs that undergo complex shape change in response to a stimulus.[p2-27] Liquid crystal elastomers with dynamic covalent bonds have been synthesized that can be aligned during bond rearrangement.[p2-28] Furthermore, chemistries amenable to surface alignment techniques have been introduced allowing for precise patterning of the molecular order in a voxel-by-voxel manner.[p2-29] LCEs produced by this method morph reversibly from planar films to complex shapes in response to an environmental stimulus. Recently, our group and others have used direct ink writing (DIW) to print 3D LCE geometries with patterned molecular order.[p2-30-32] The method utilizes the shear forces imposed on the polymerizable LC ink during the printing process to align the mesogens along the printed path, which is subsequently locked into LCE via photo-curing. The resulting 3D structures can be designed to morph between 3D shapes. However, this method has been limited to LCEs with elevated actuation temperatures in excess of 100° C., which limits the functionality of this new processing technique for LCEs.

In LCEs the actuation temperature of the final material is intrinsically tied to the processing conditions. To orient precursors of the LCE, the precursors must be processed in a liquid crystalline phase (i.e. nematic phase).[p2-27] Crosslinking converts these precursors into LCEs with programmed molecular orientation but also stabilizes the nematic phase, thus increasing the transition temperature between the ordered nematic and isotropic phase.[p2-25] Many synthetic strategies utilize crosslinking reactions that introduce heterogeneity into the elastomer network, such as acrylate homopolymerization.[p2-29][p2-33] This heterogeneity therefore broadens the temperature range over which the LCE changes shape. Together, these factors often combine to create materials that change shape over a relatively high and broad range of temperatures, precluding applications where these soft actuators interface with the human body and other sensitive systems.

SUMMARY

One aspect of the disclosure provides a method of ink-extrusion printing an object. The mixture includes providing a mixture including liquid crystal monomers and photo-catalyzing or heating the mixture to produce a liquid crystal ink. The ink is in a nematic phase. The method also includes extruding the ink through a print-head orifice moving along a print direction to form an extruded film of the object. The extruded film exhibits birefringence.

Another aspect of the disclosure provides a liquid crystal ink for ink-extrusion printing. The ink includes a mixture including liquid crystal monomers, wherein the mixture, when at a target printing temperature is in a nematic phase.

Another aspect of the disclosure provides an ink-extrusion-printed object. The object includes an extrusion-printed film including a nematic liquid crystal elastomer. The film exhibits birefringence along an extrusion axis of the film.

BRIEF DESCRIPTION

Figure 2:
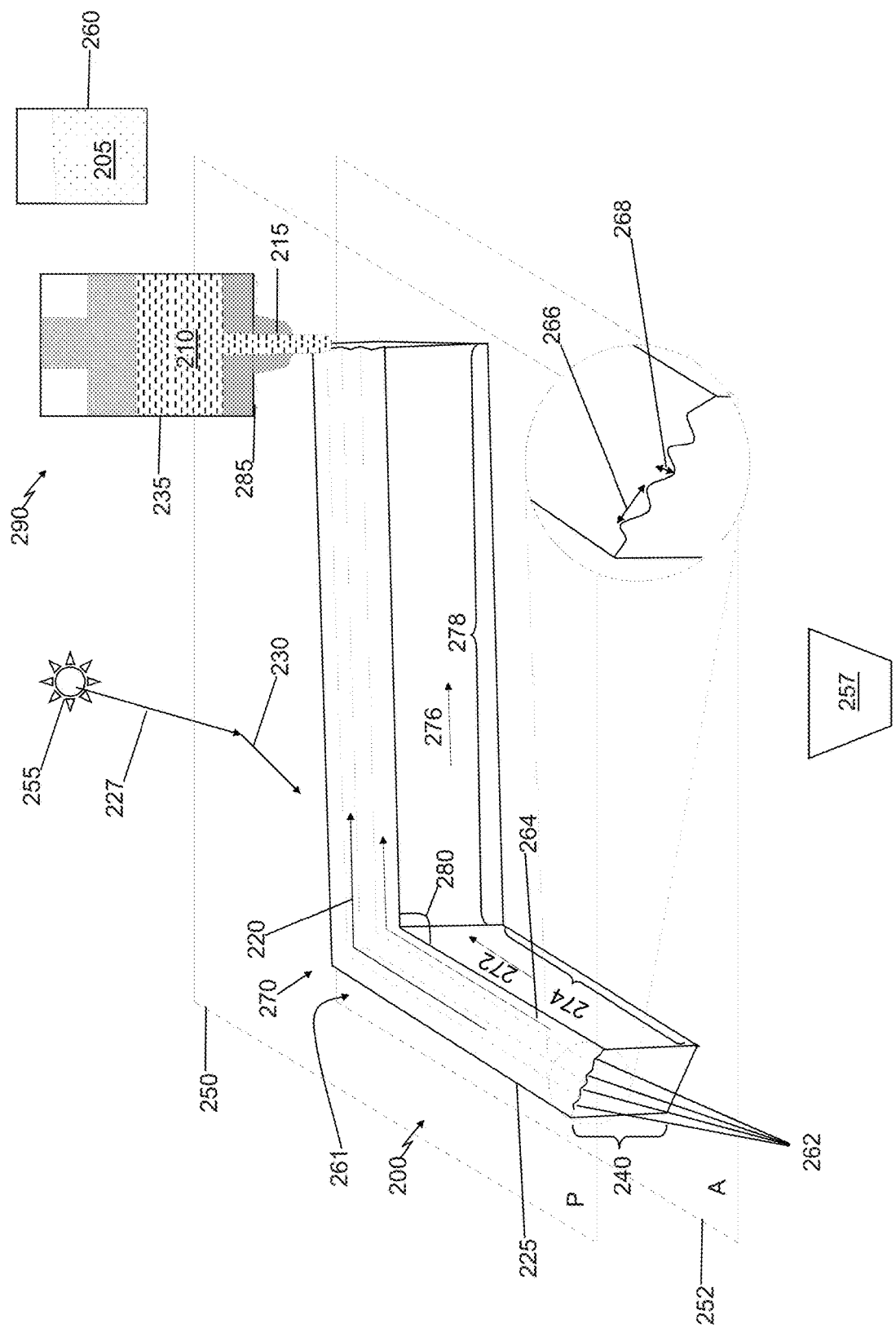
Figure 3A:
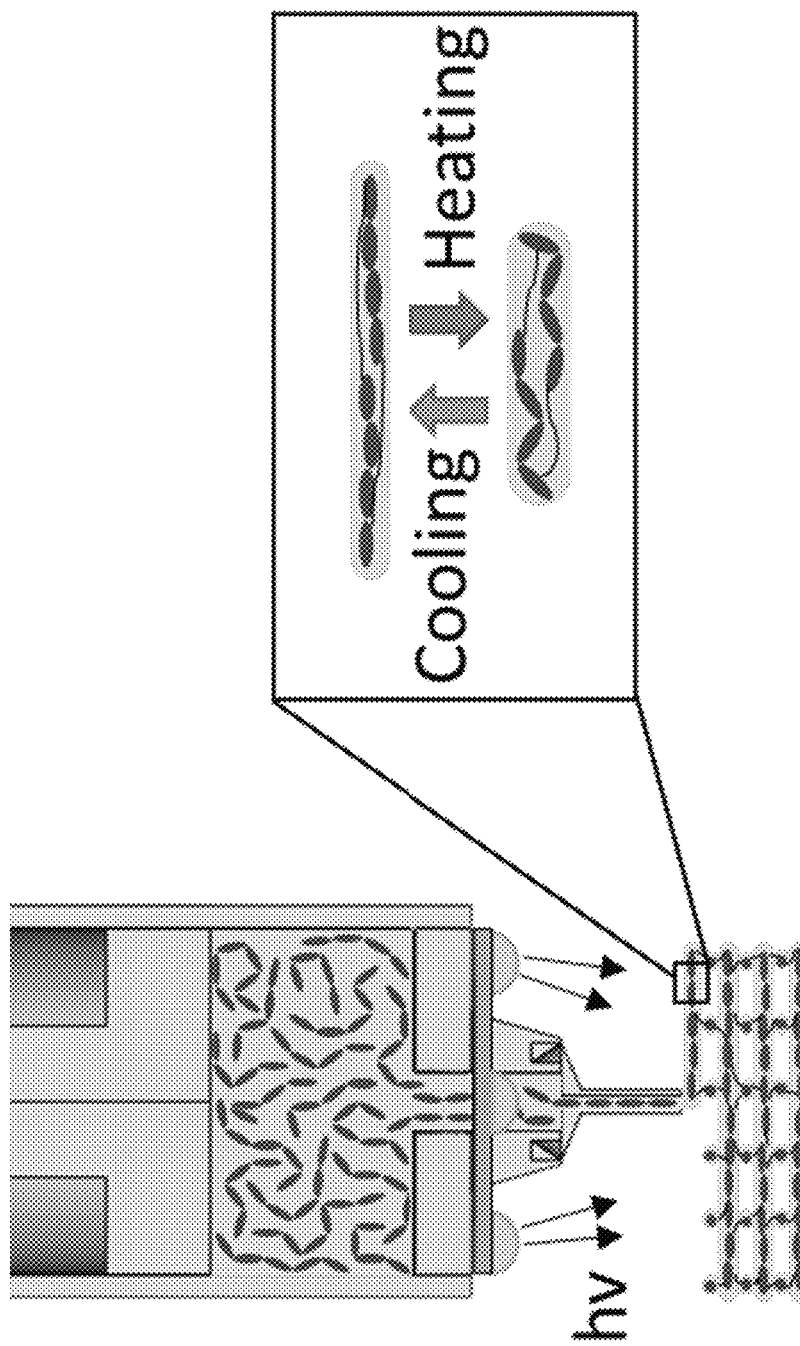
Figure 3B:
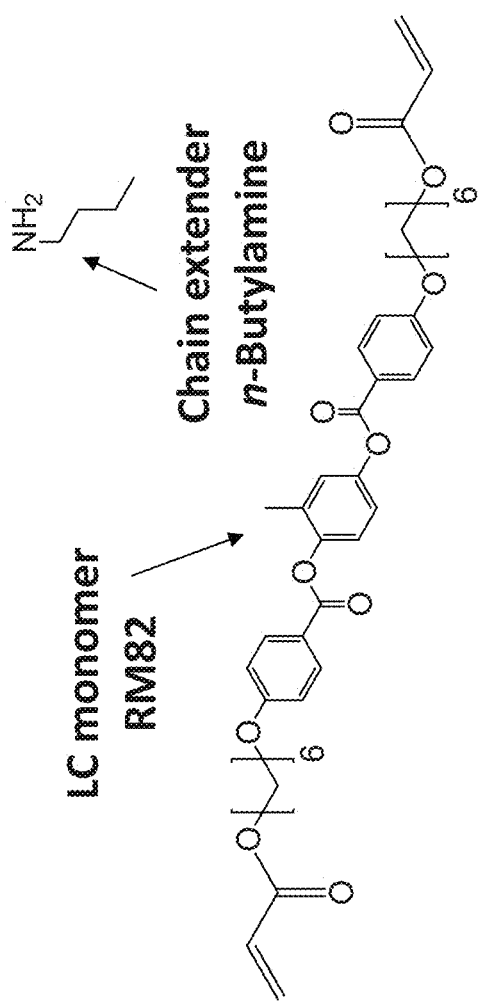
Figure 3C:
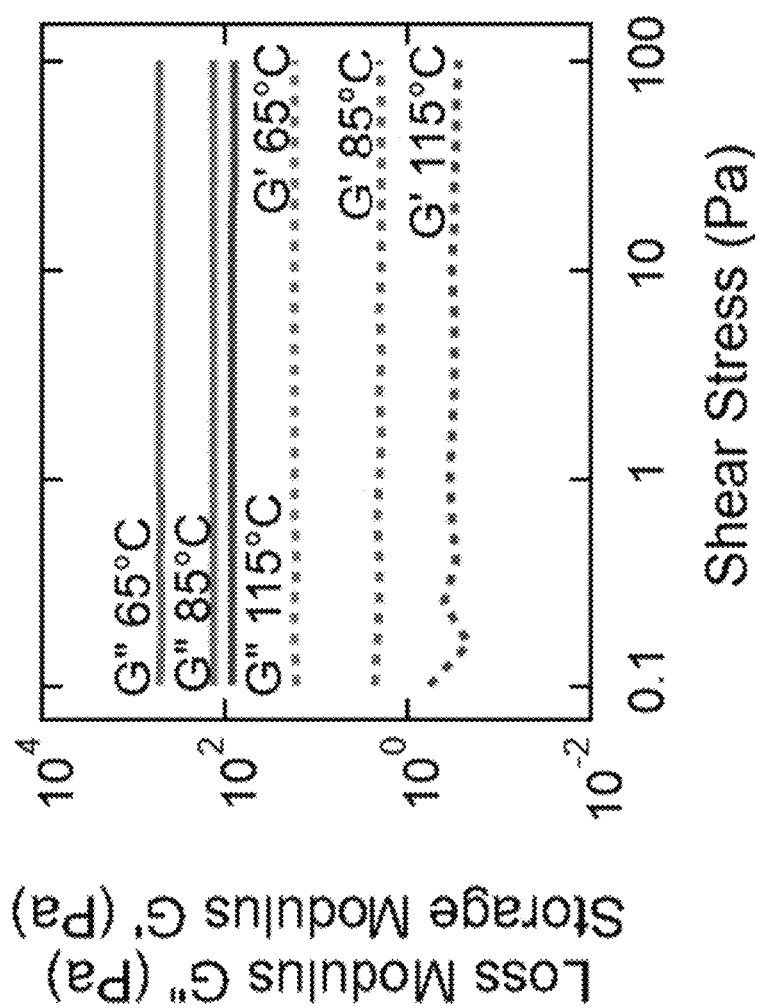
Figure 3D:
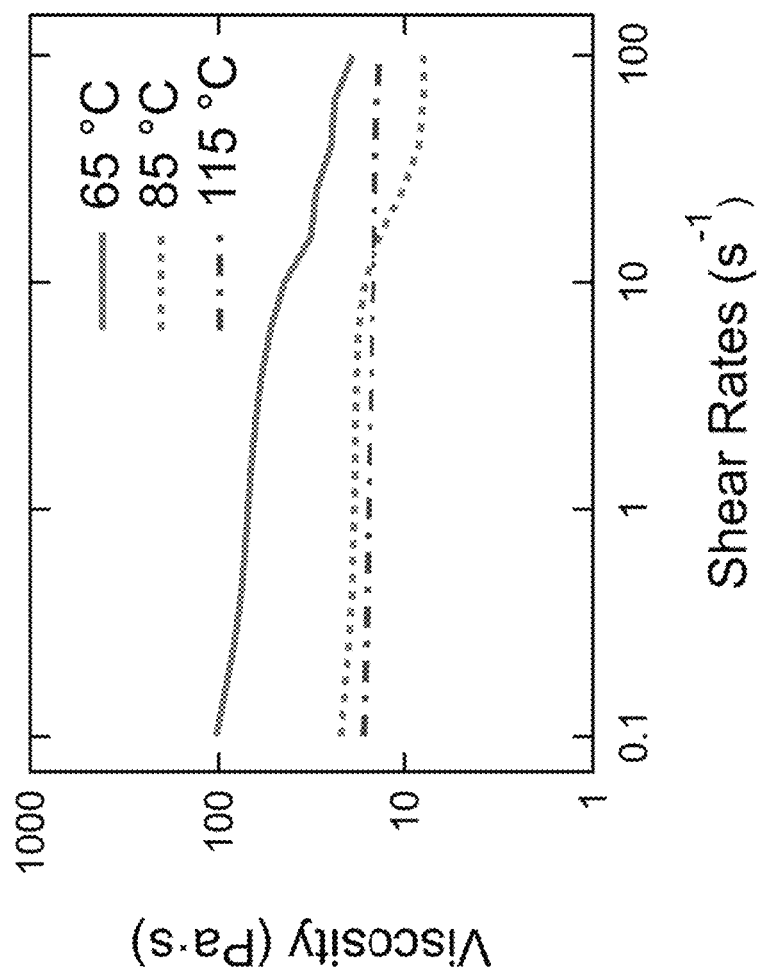
Figure 3E:
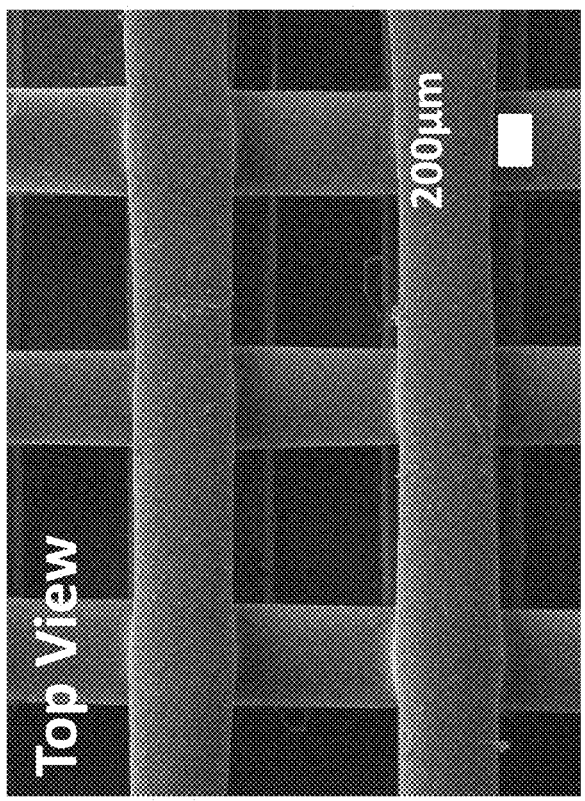
Figure 3E:
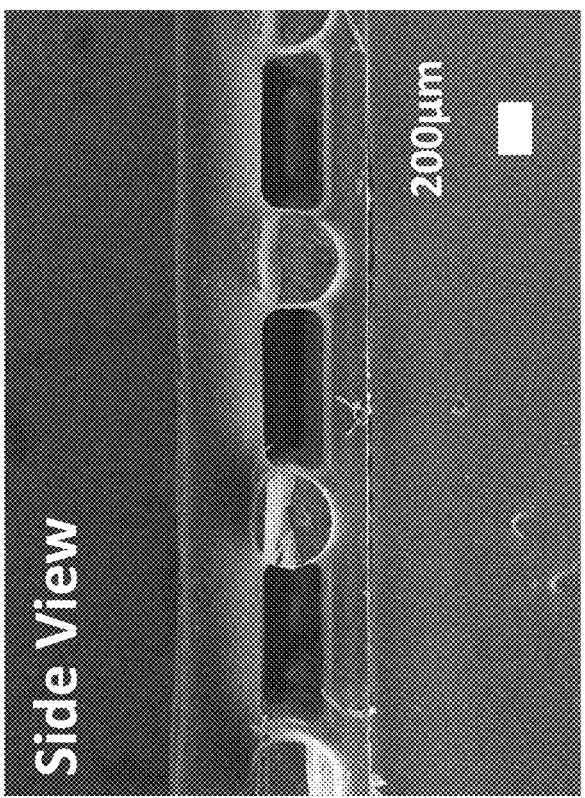
Figure 3F:
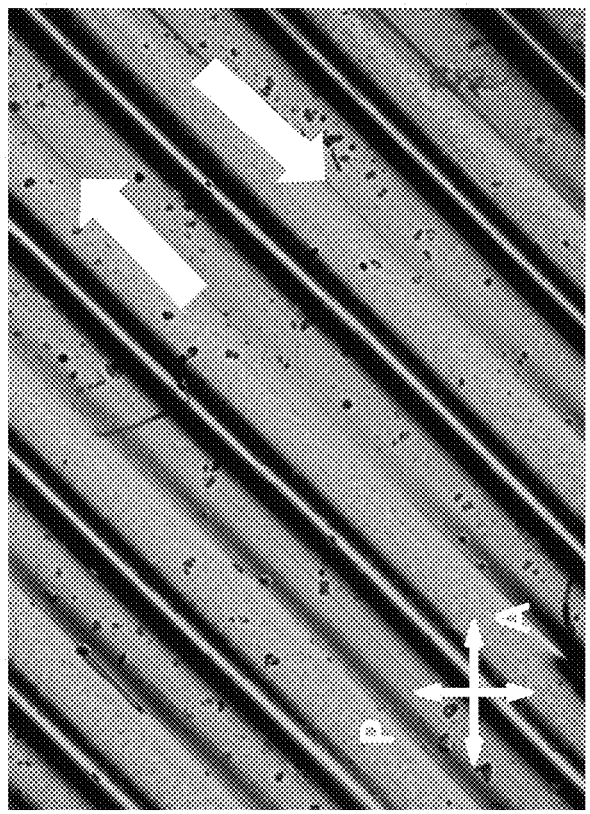
Figure 3F:
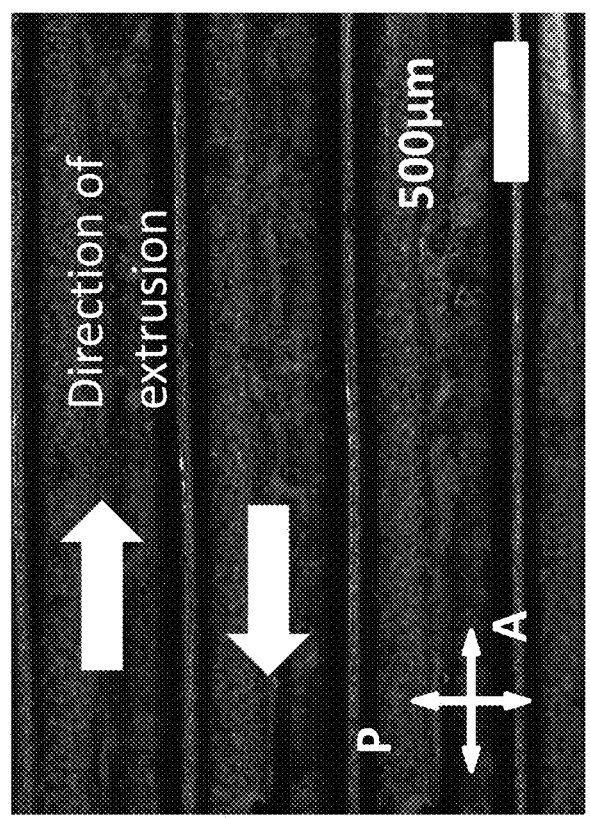
Figure 3G:
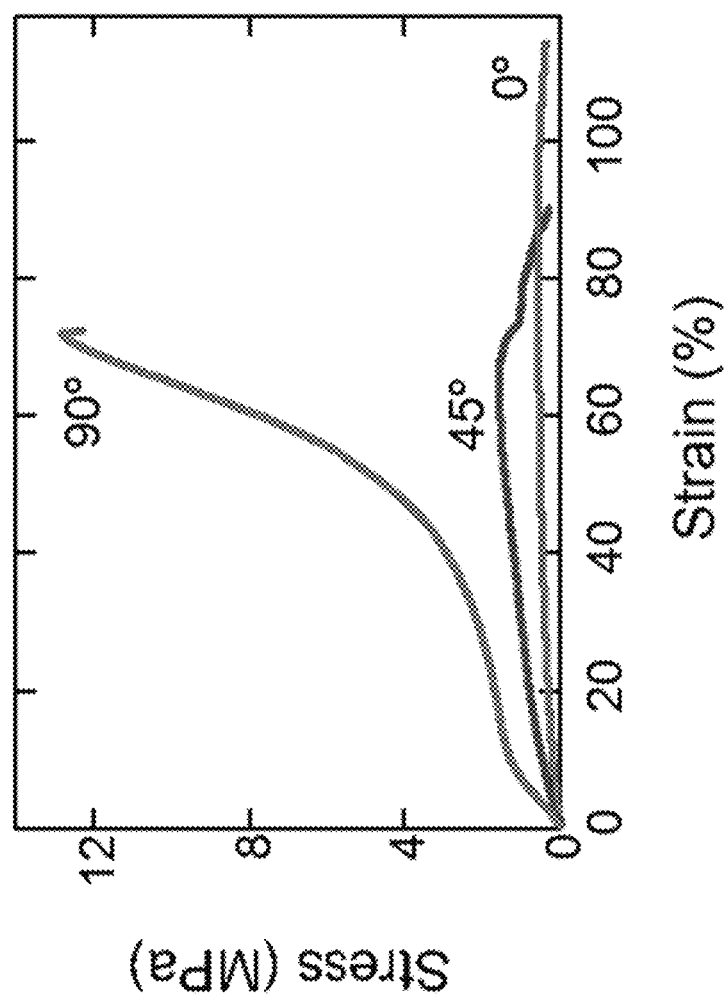
Figure 3H:
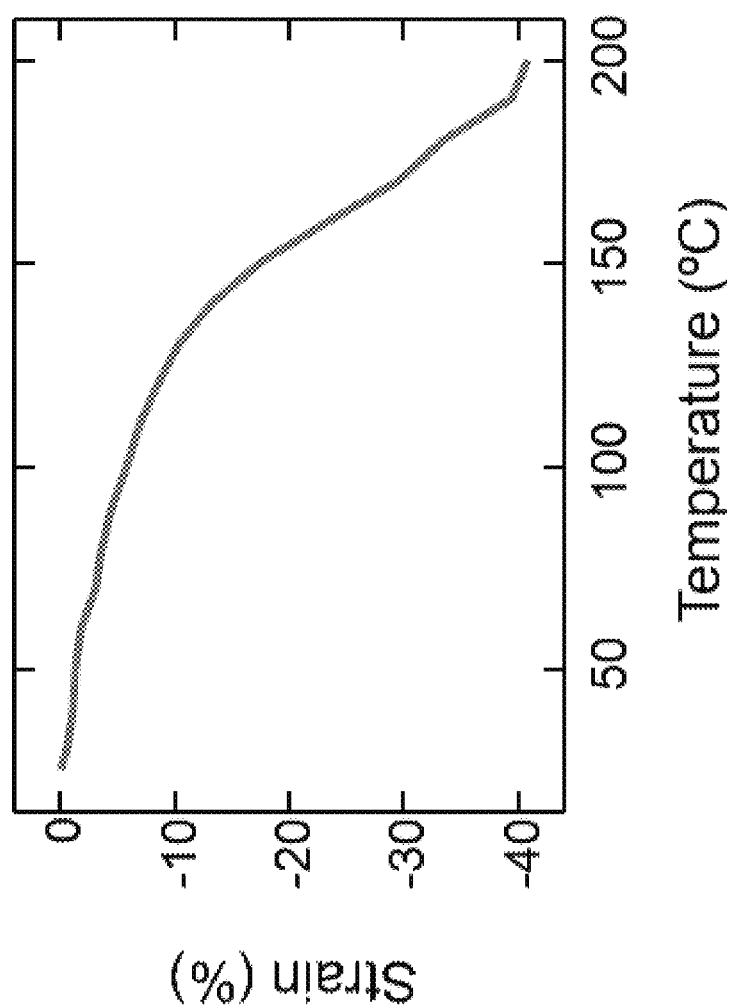
Figure 4A:
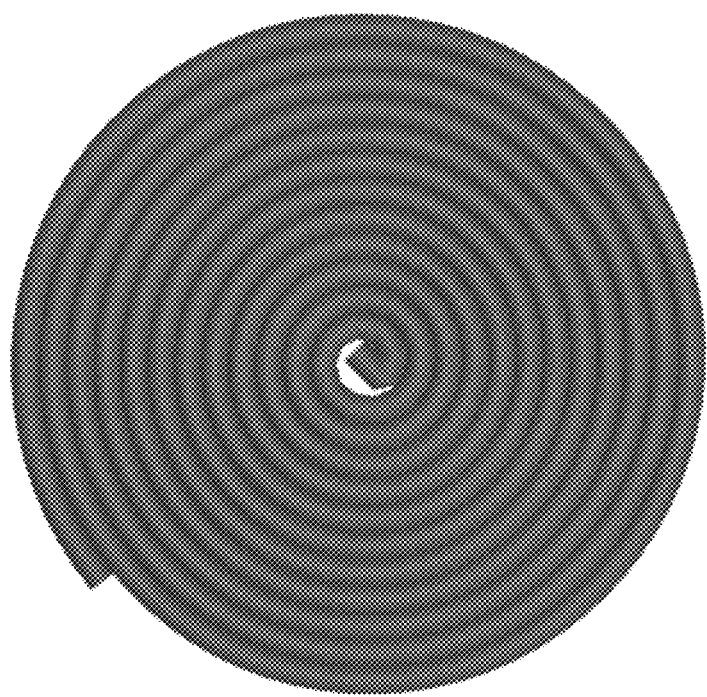
Figure 4B:
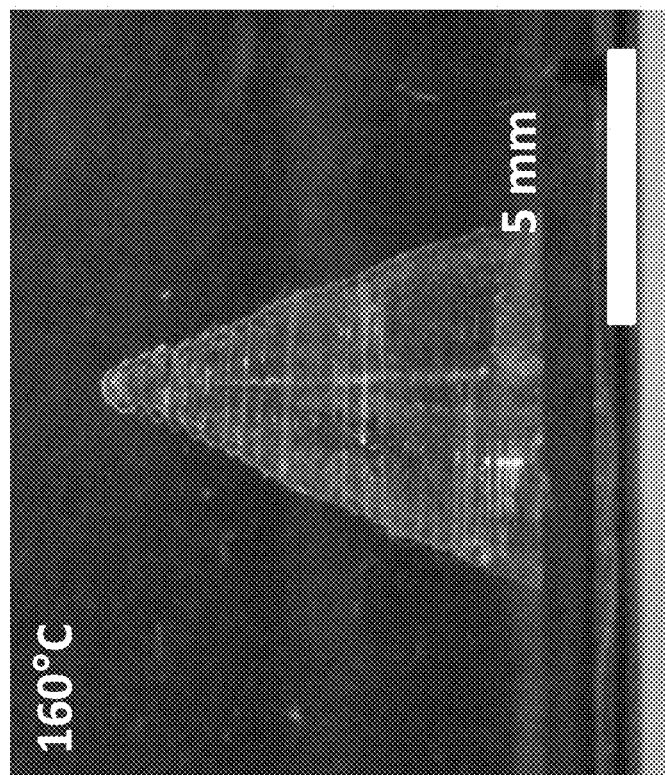
Figure 4B:
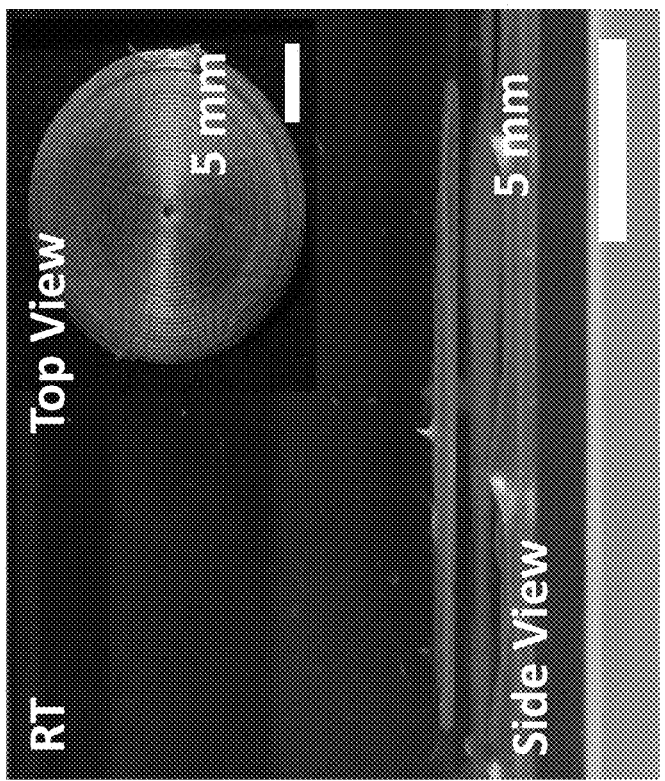
Figure 4C:
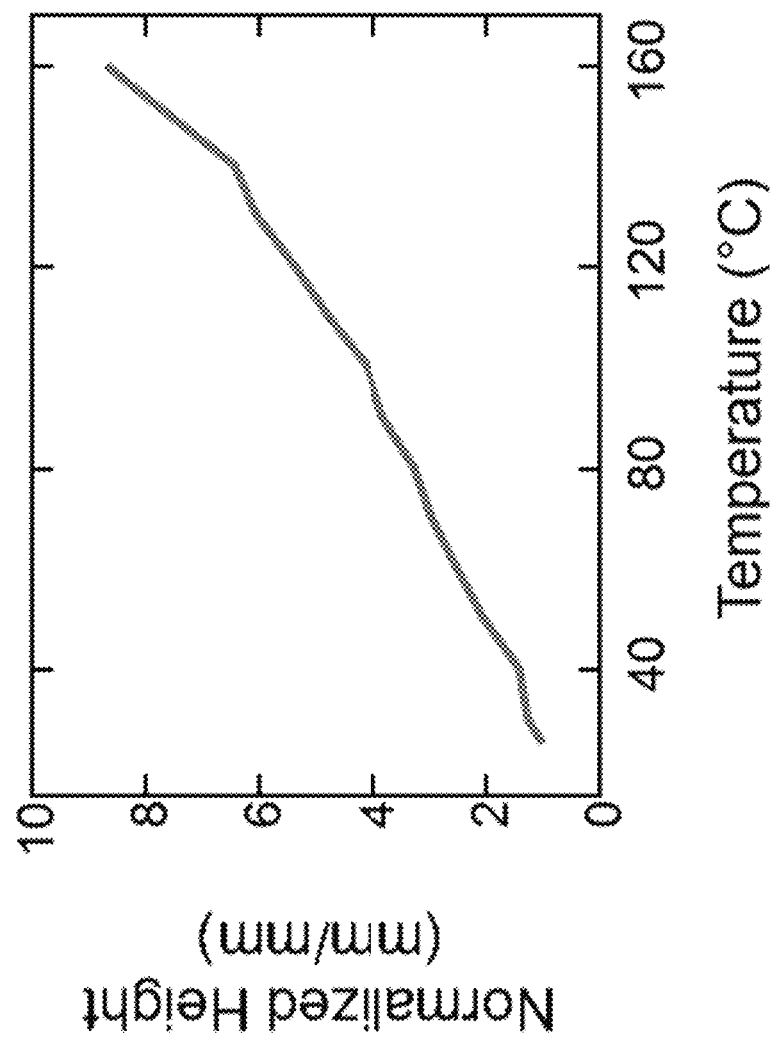
Figure 4D:
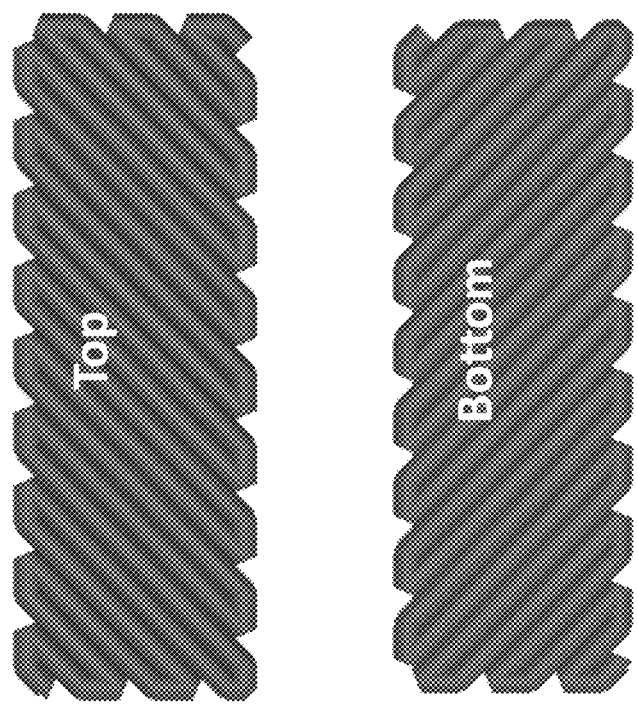
Figure 4E:
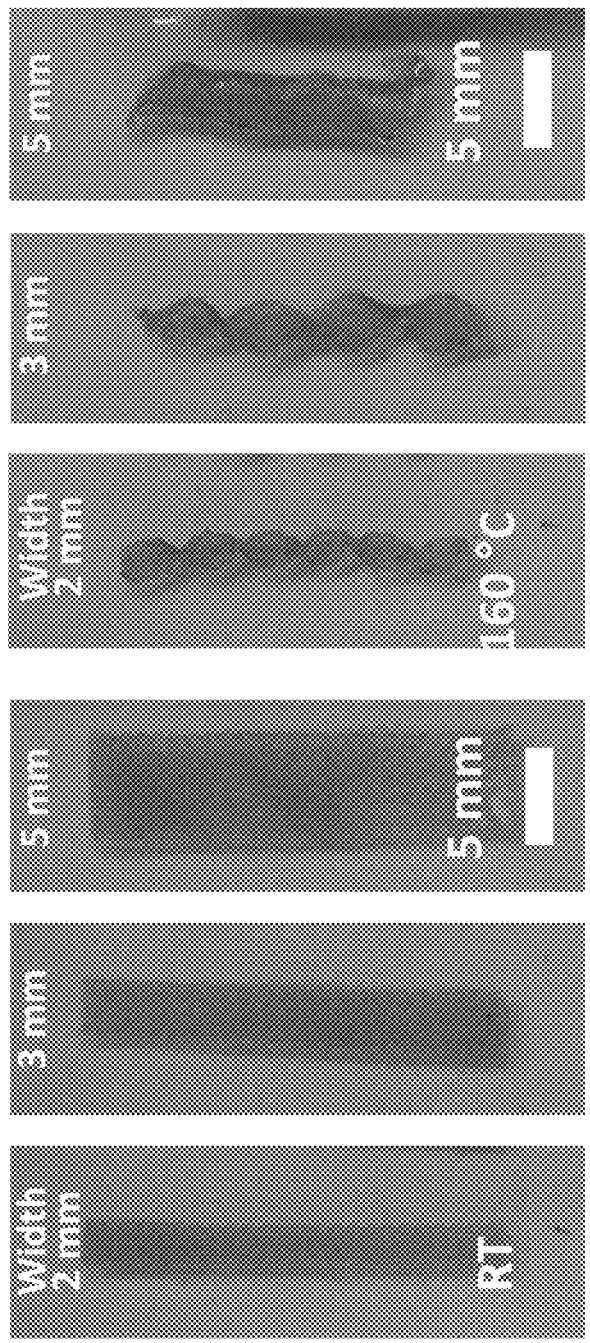
Figure 4F:
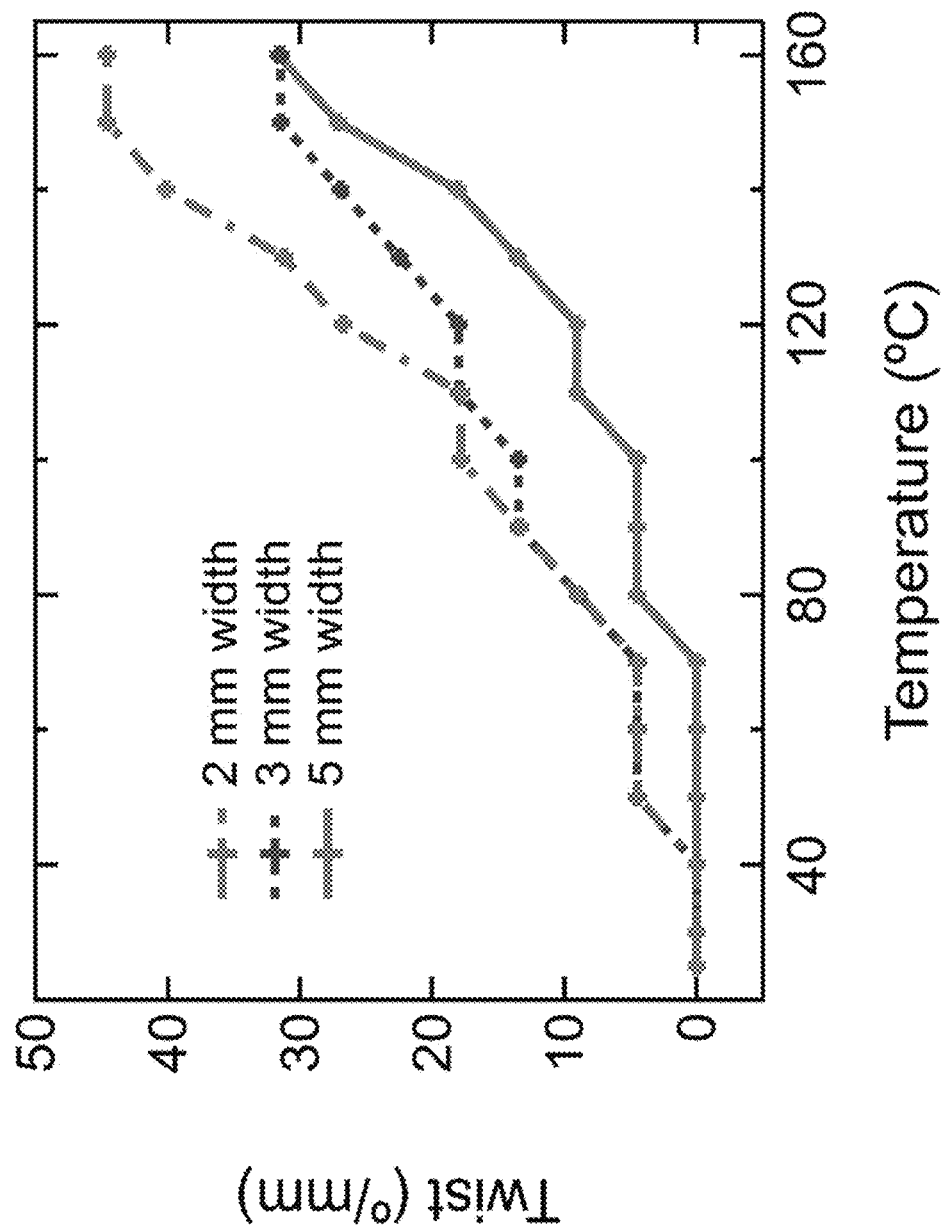
Figure 4G:
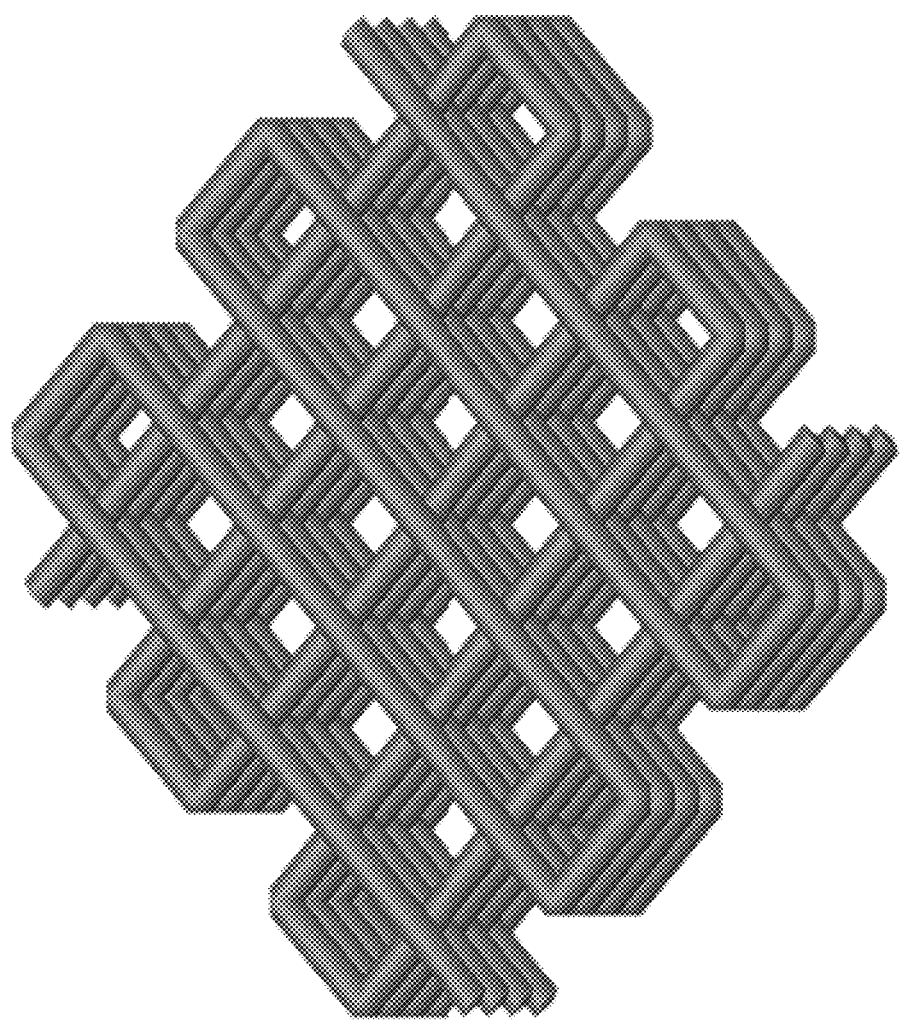
Figure 4H:
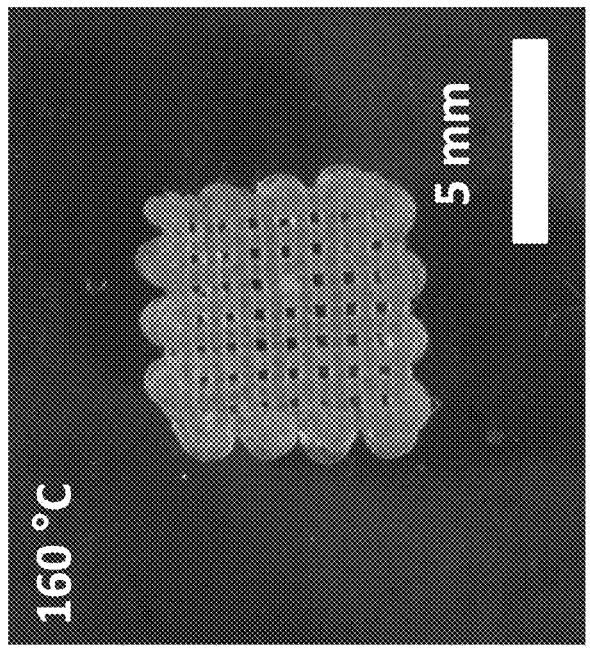
Figure 4H:
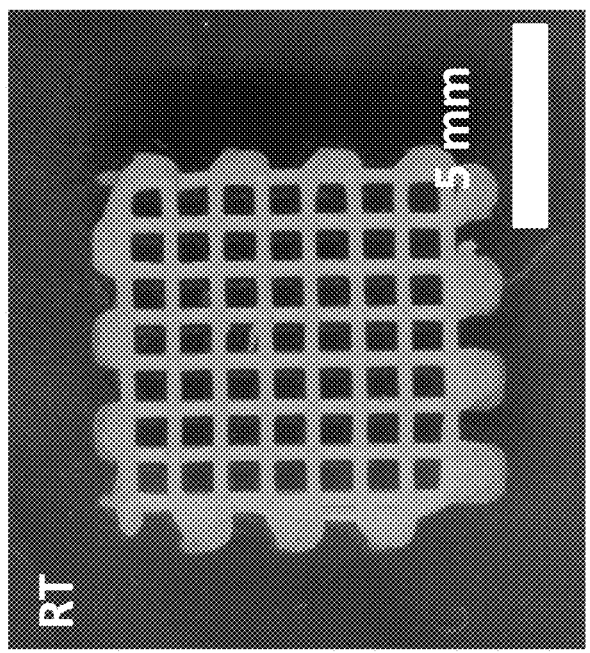
Figure 4I:
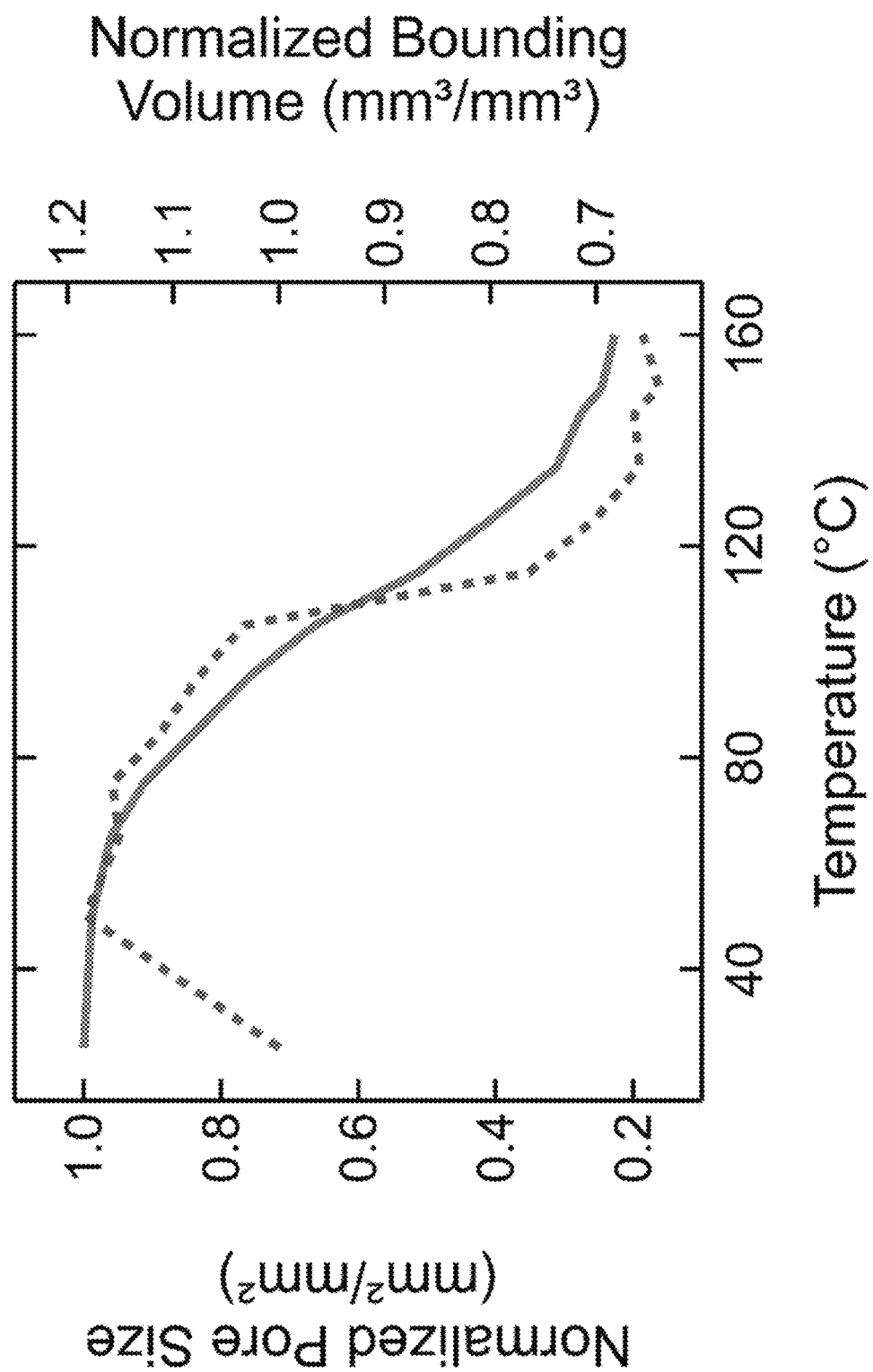
Figure 5A:
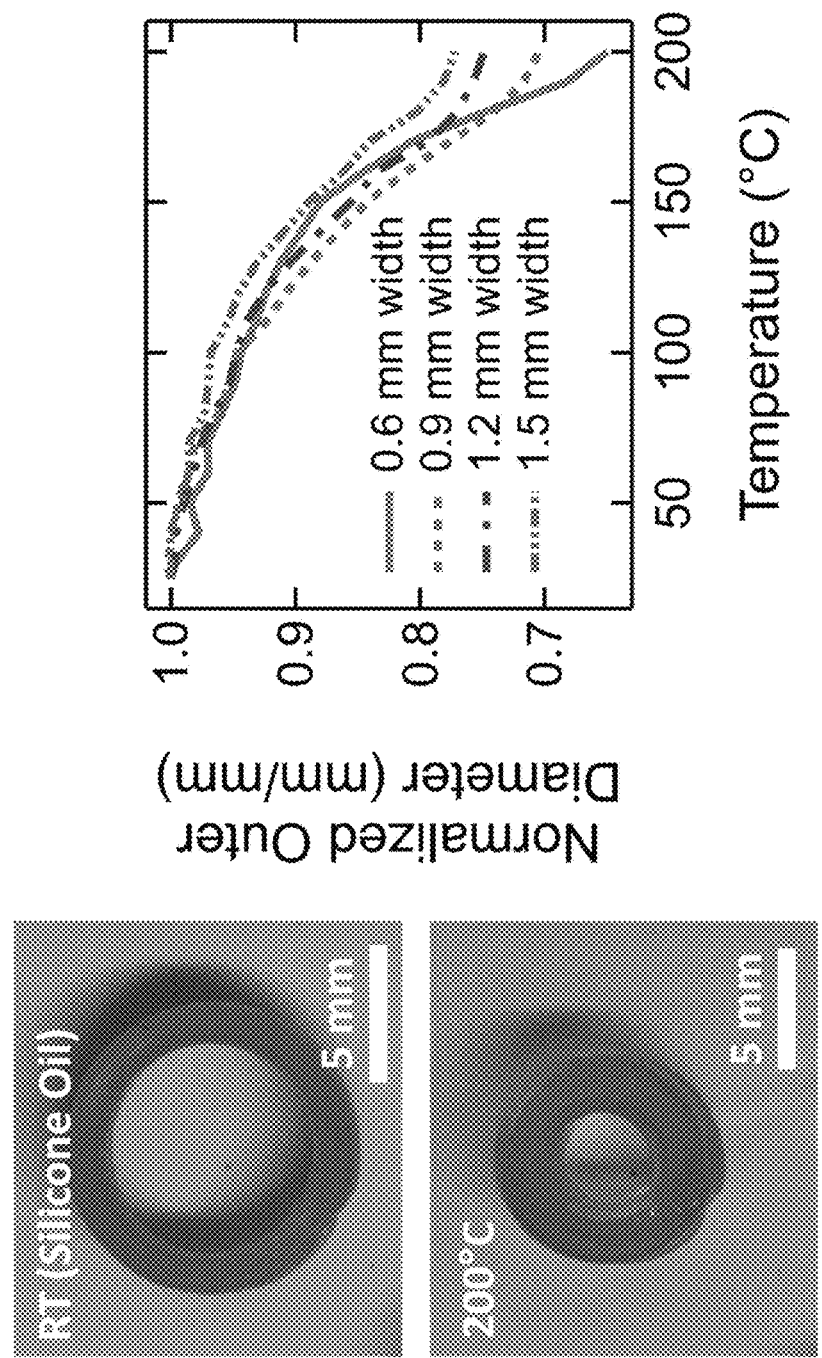
Figure 6A:
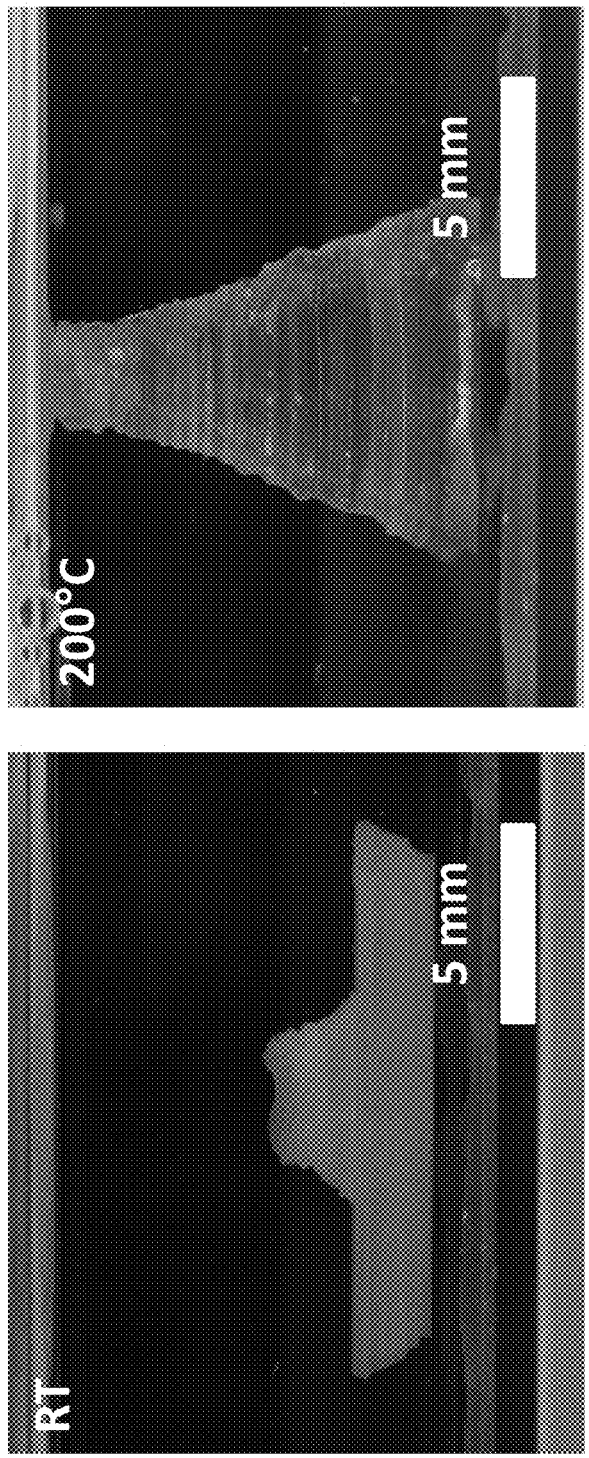
Figure 7:
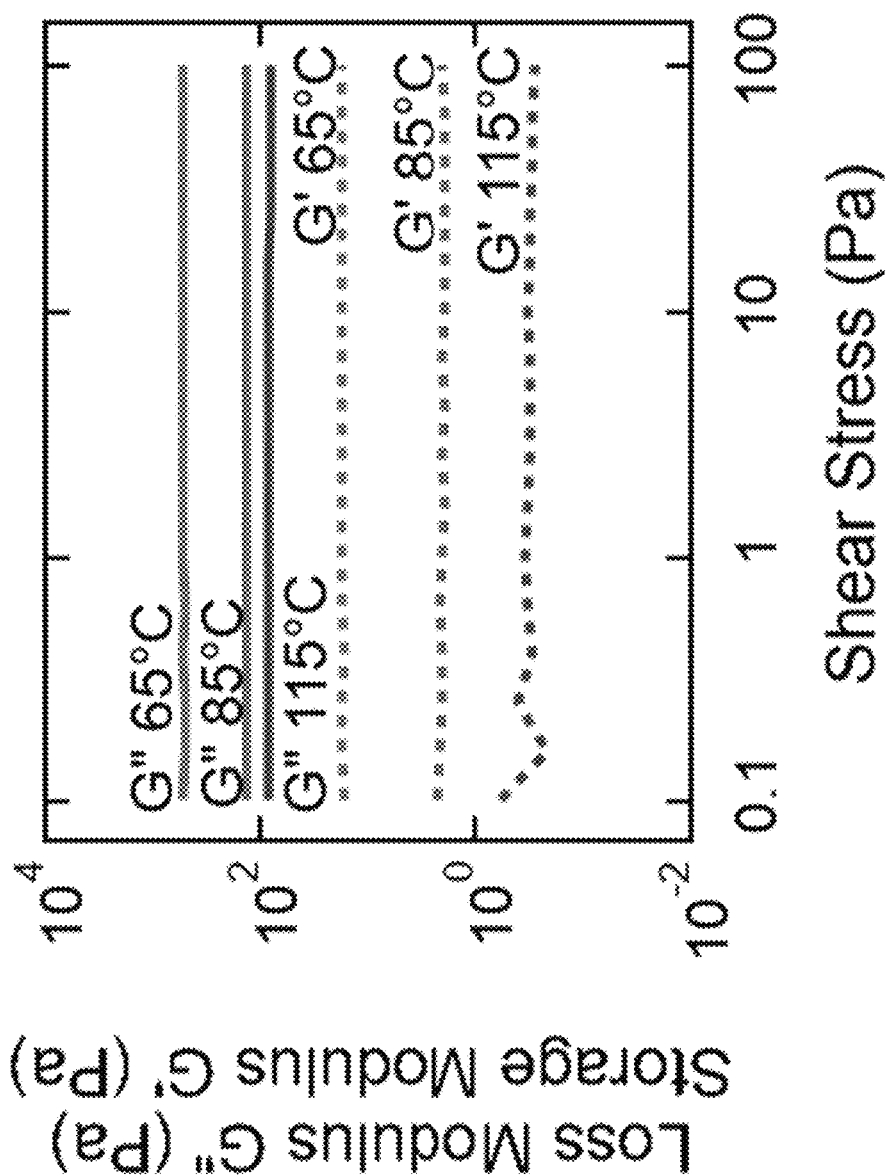
Figure 8:
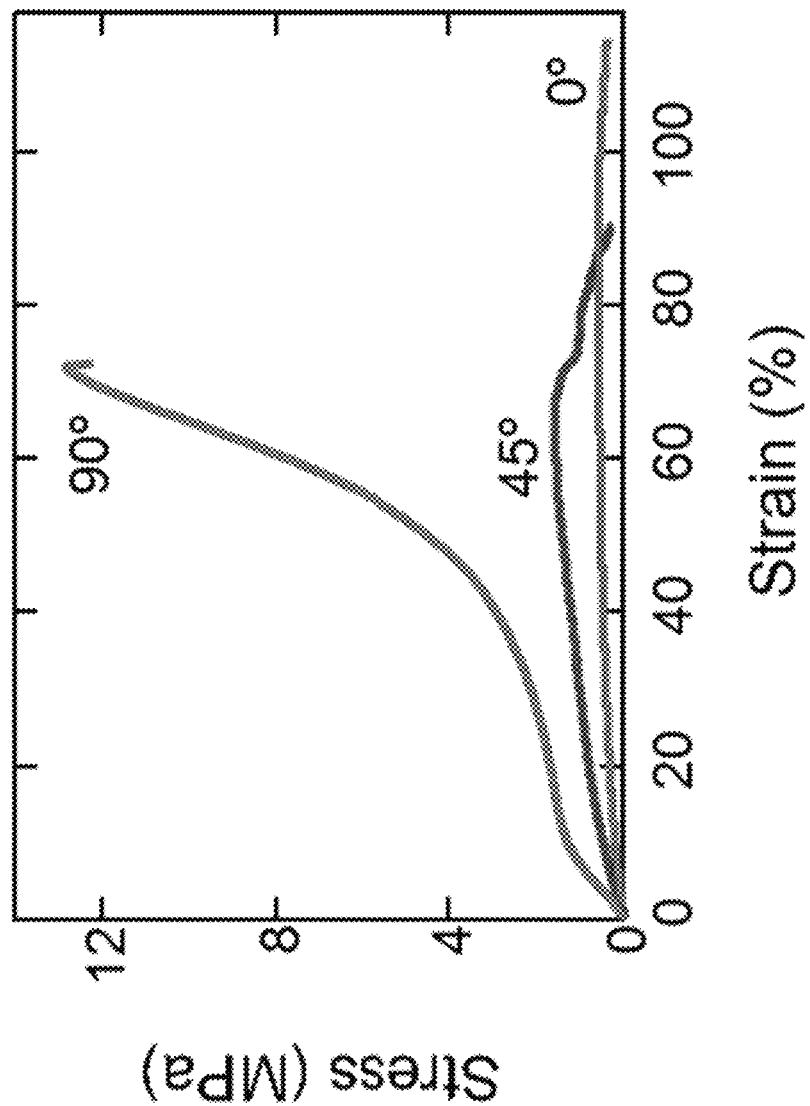
Figure 9:
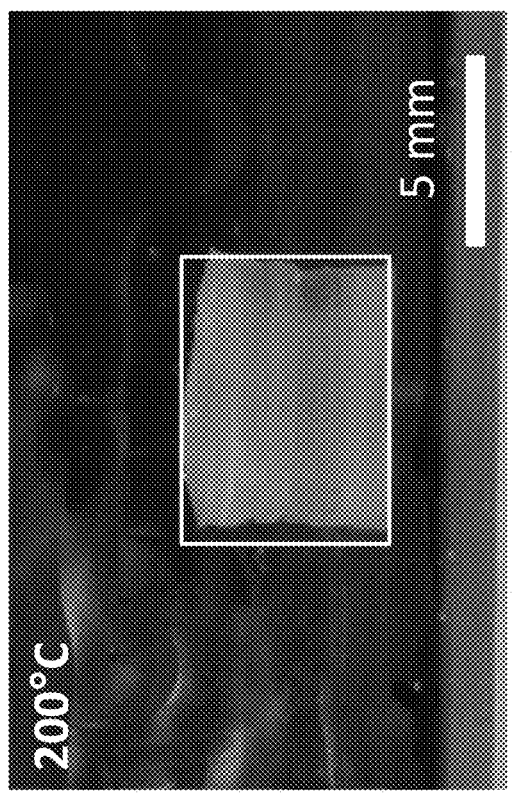
Figure 9:
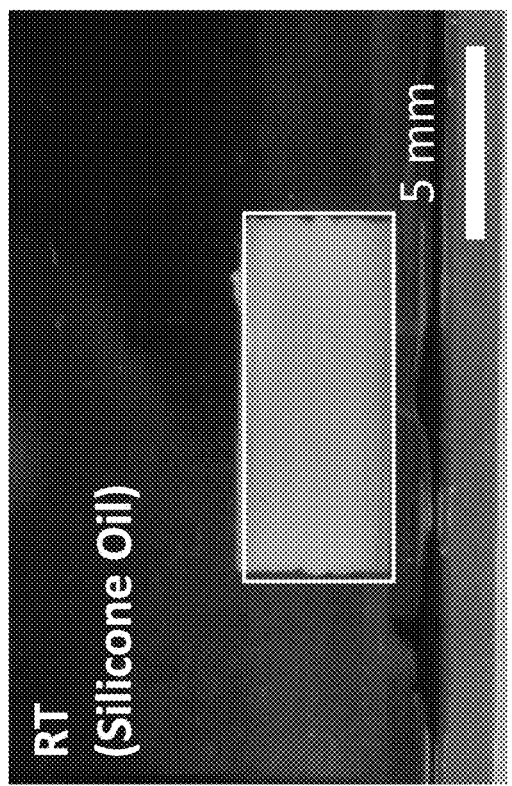
Figure 10:
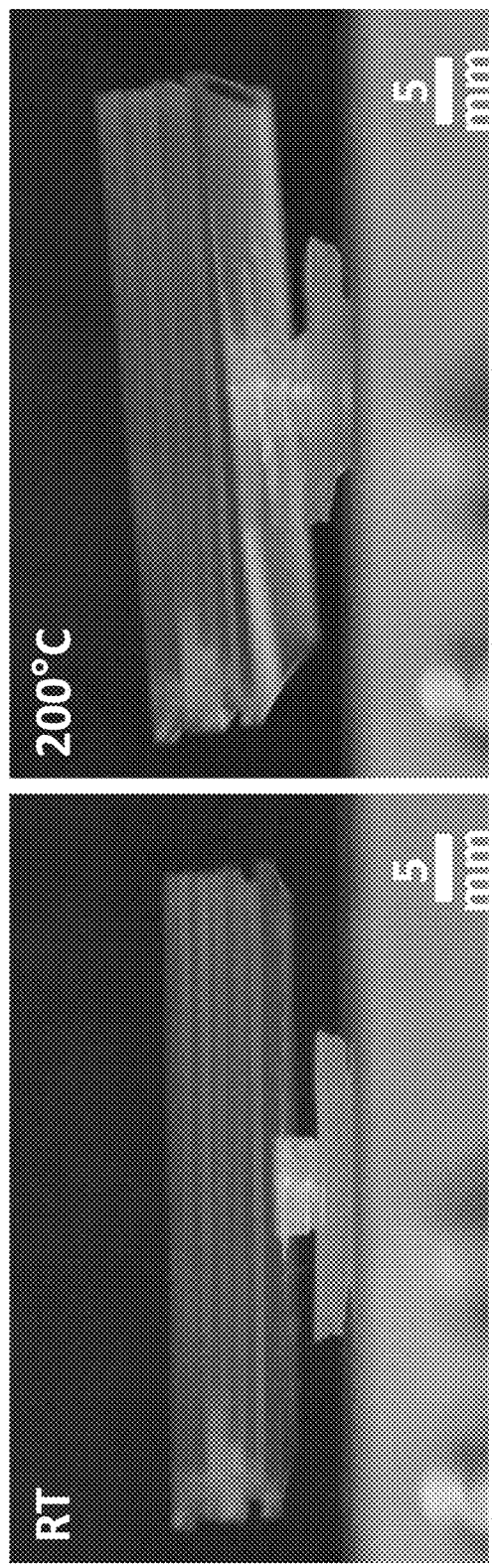
Figure 11A:
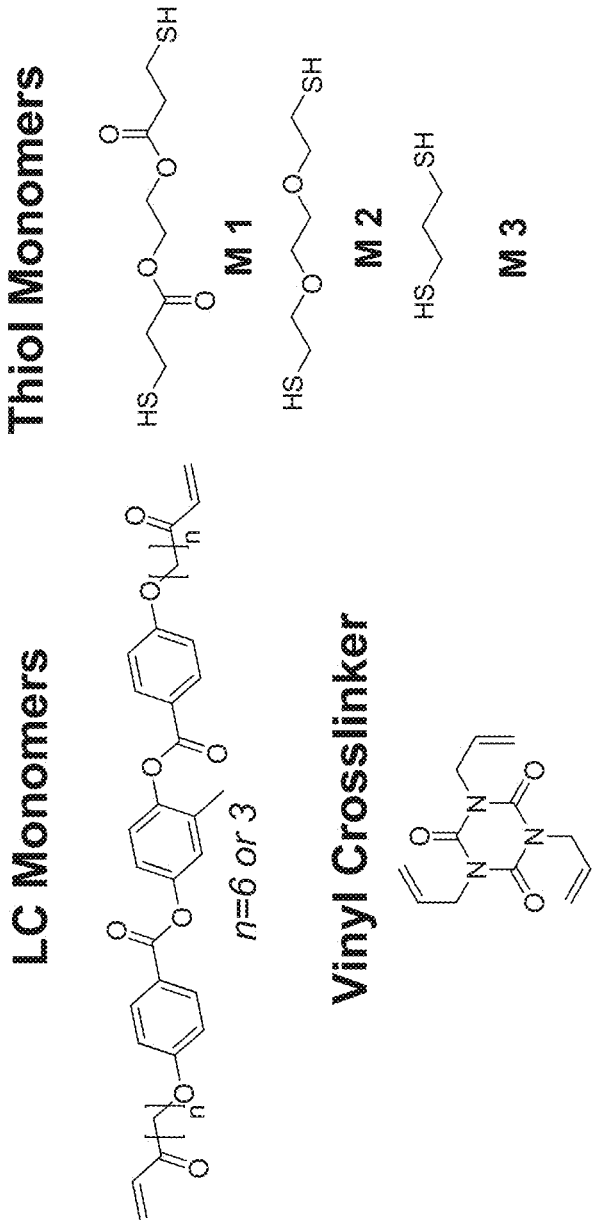
Figure 11B:
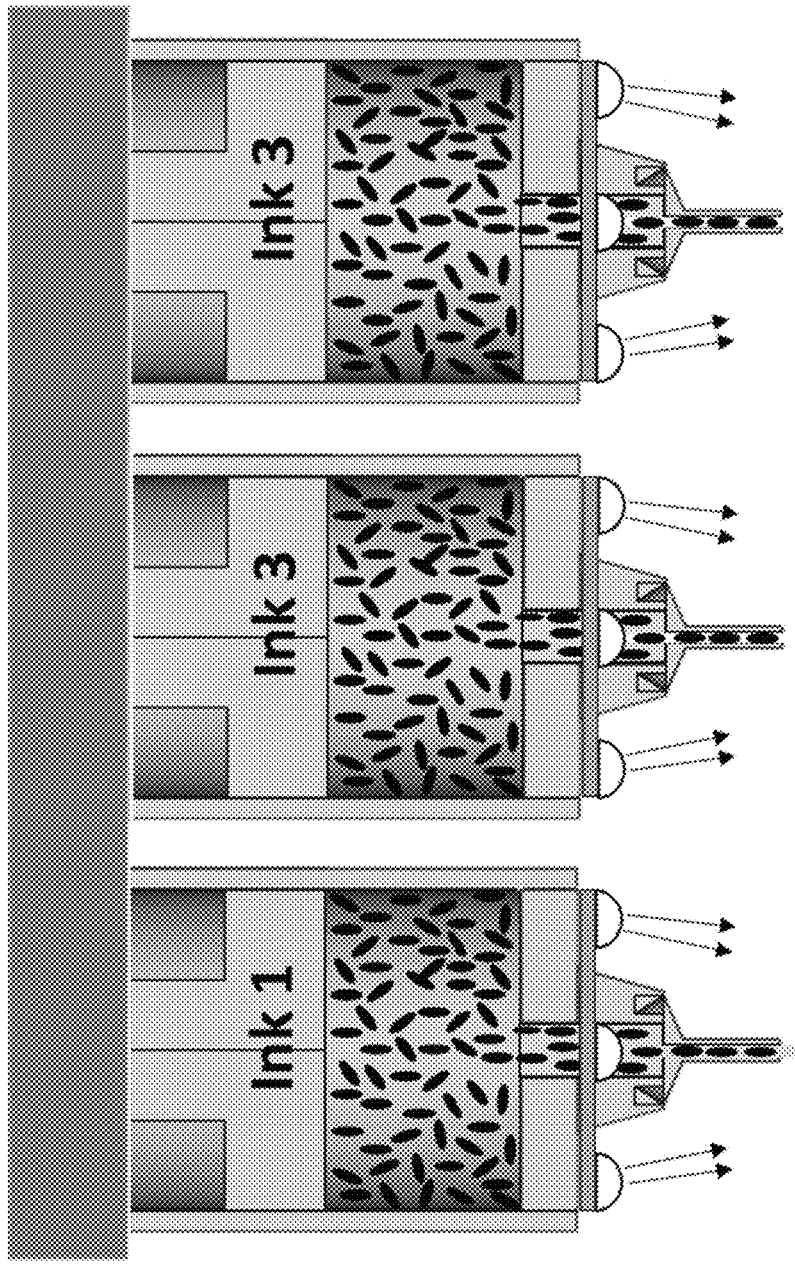
Figure 11C:
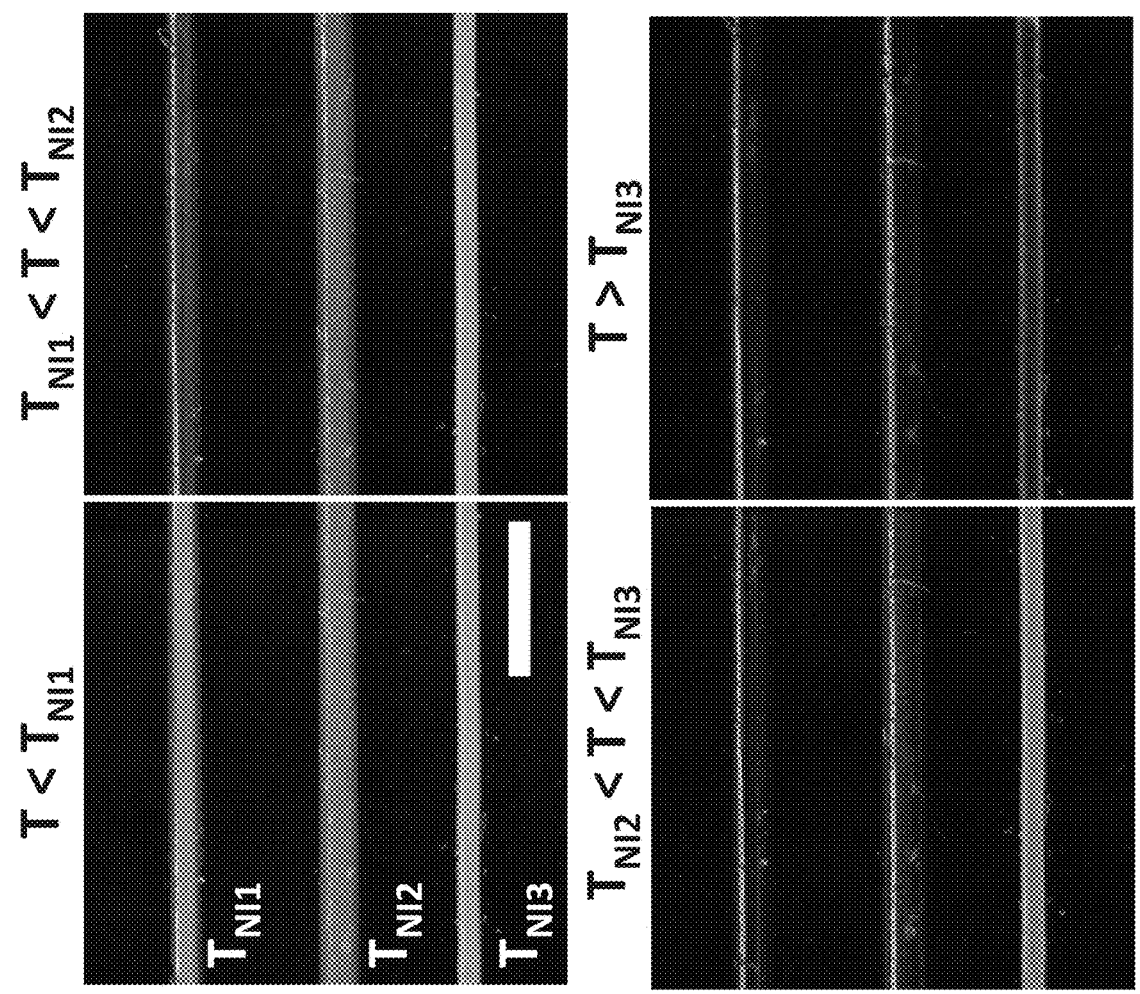
Figure 12A:
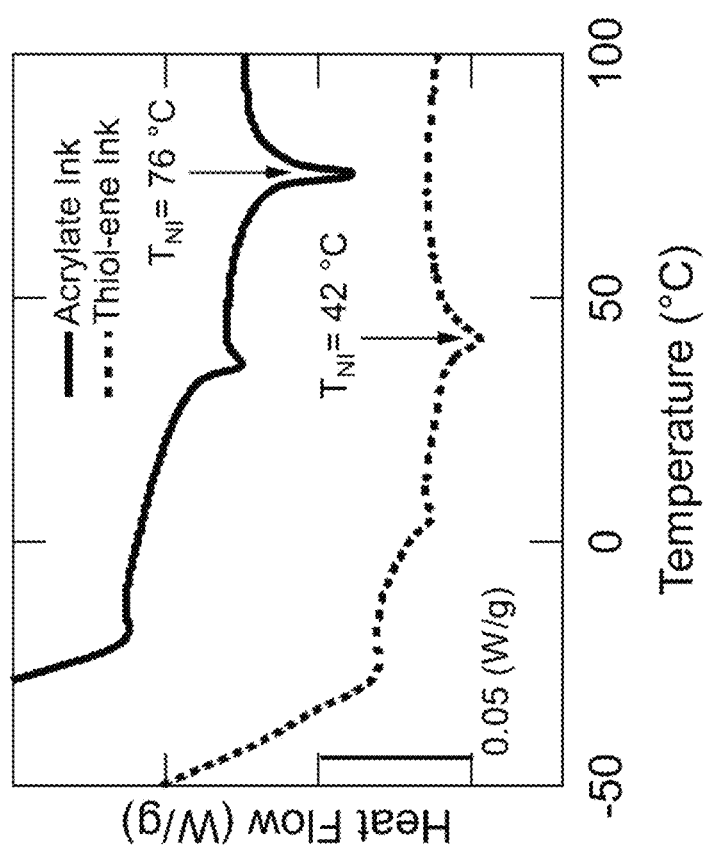
Figure 12B:
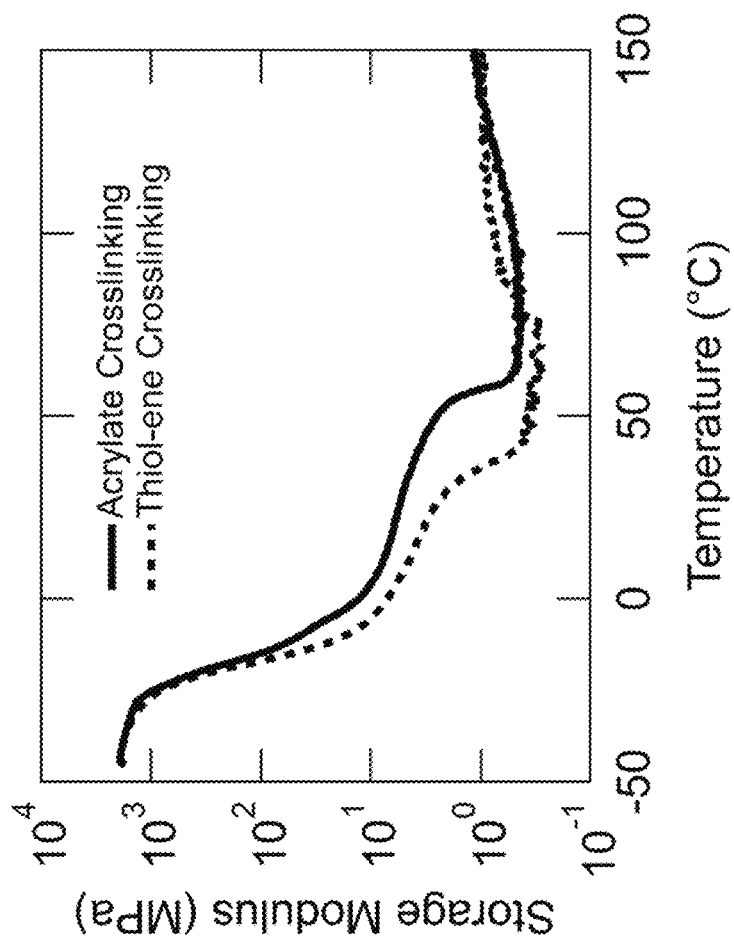
Figure 12C:
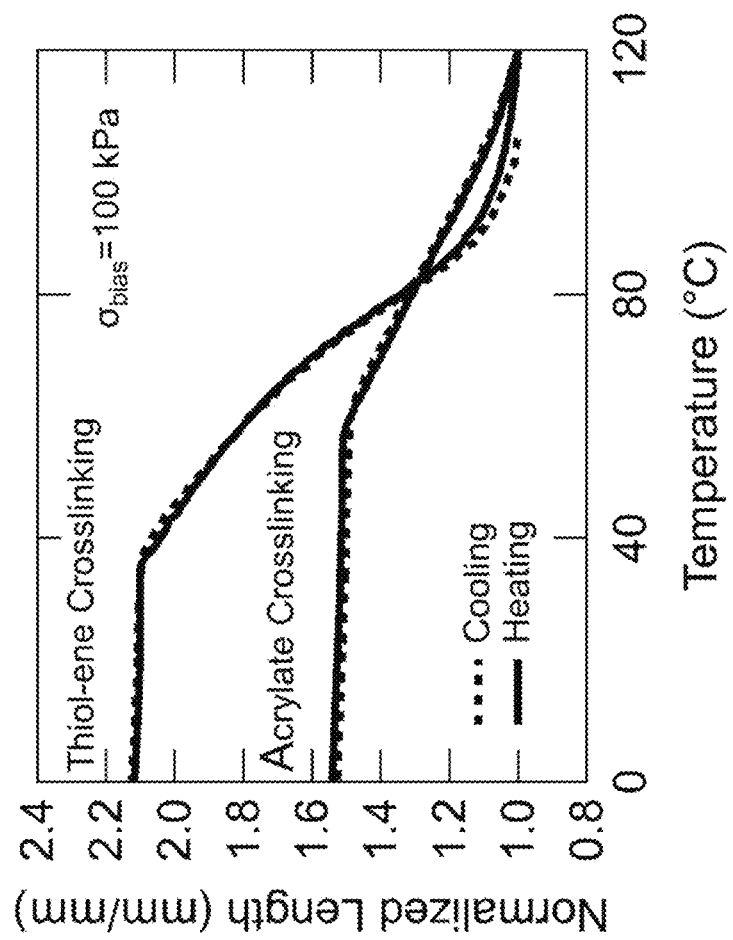
Figure 13A:
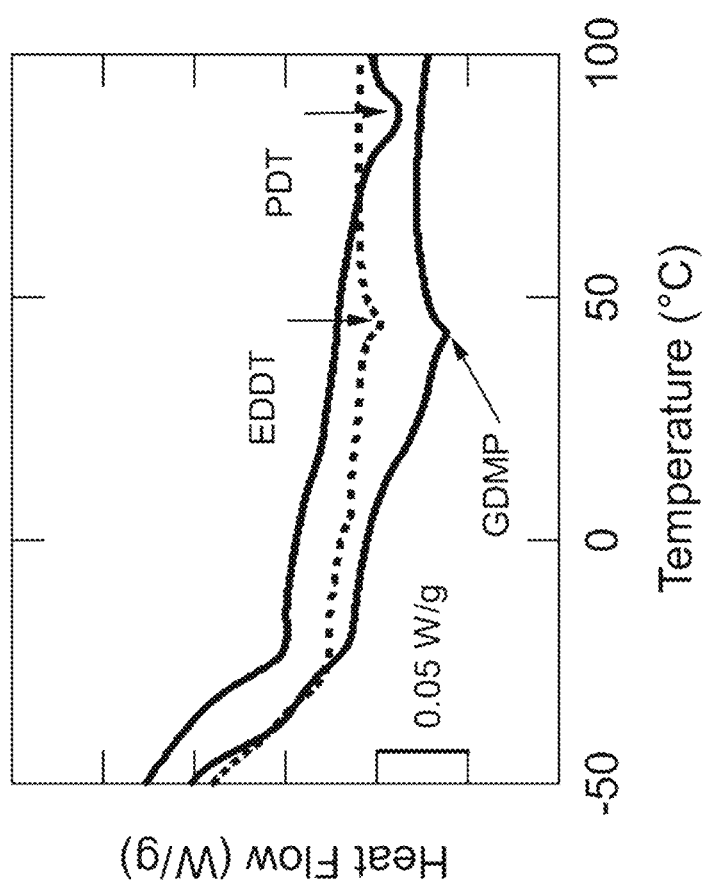
Figure 13B:
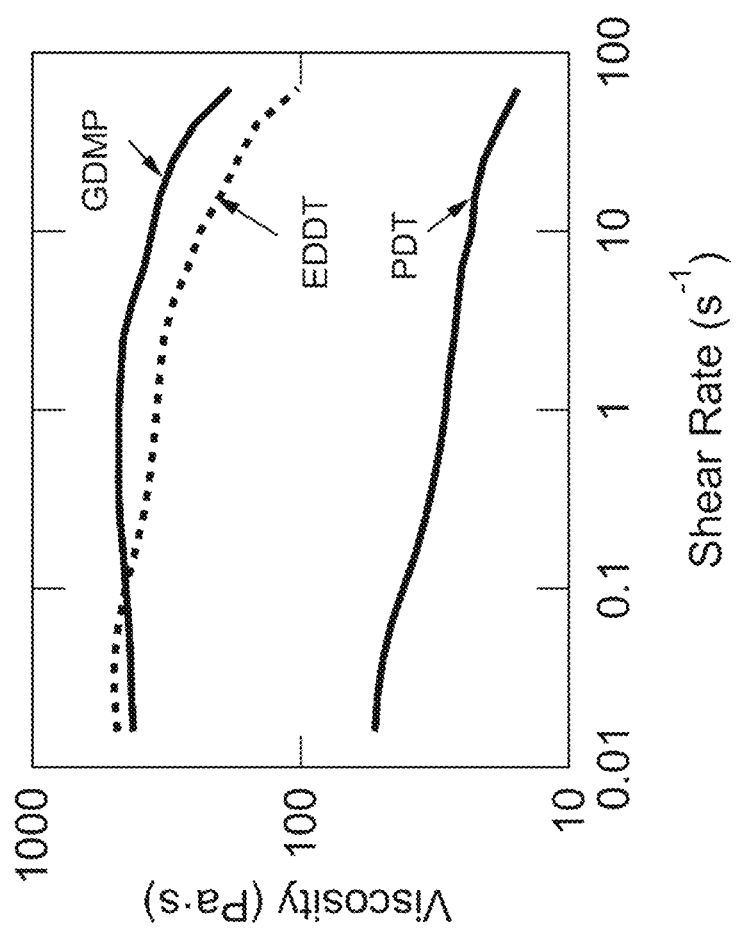
Figure 13C:
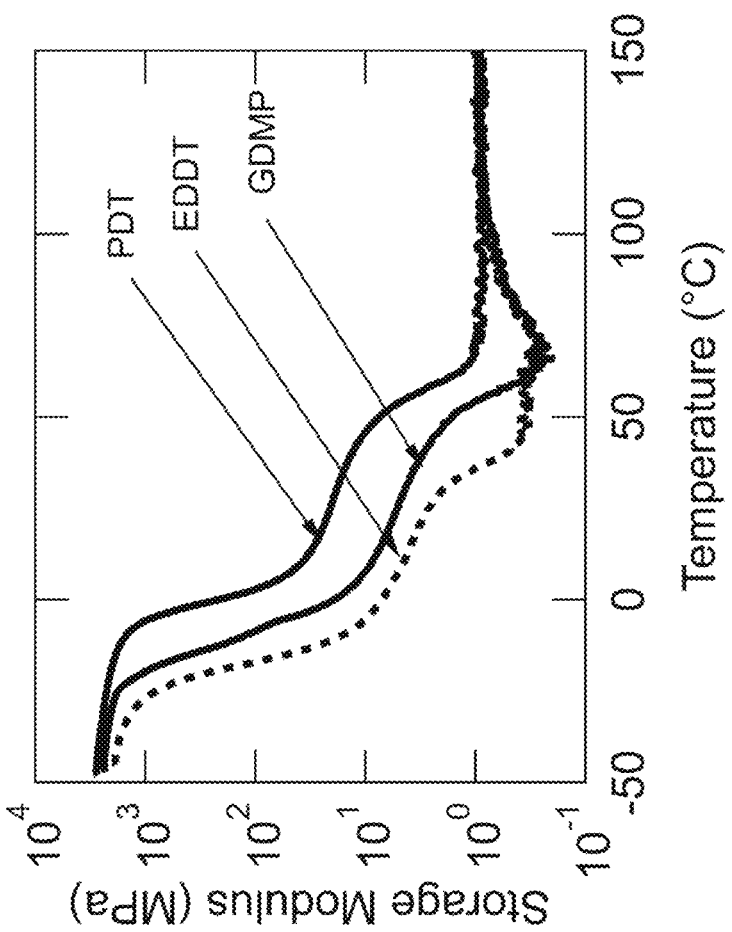
Figure 13D:
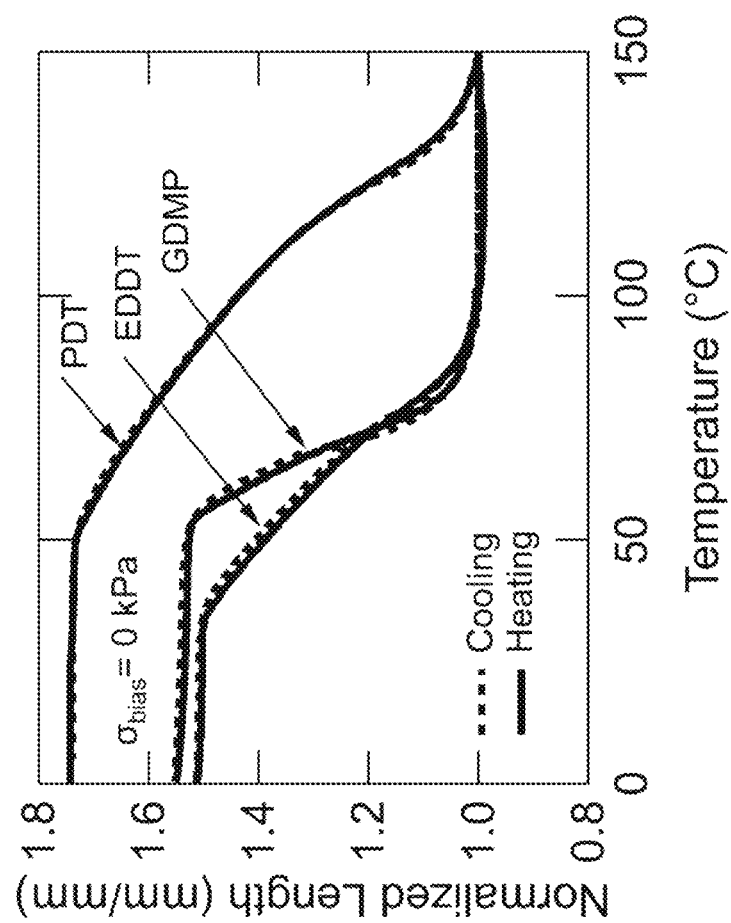
Figure 15A:
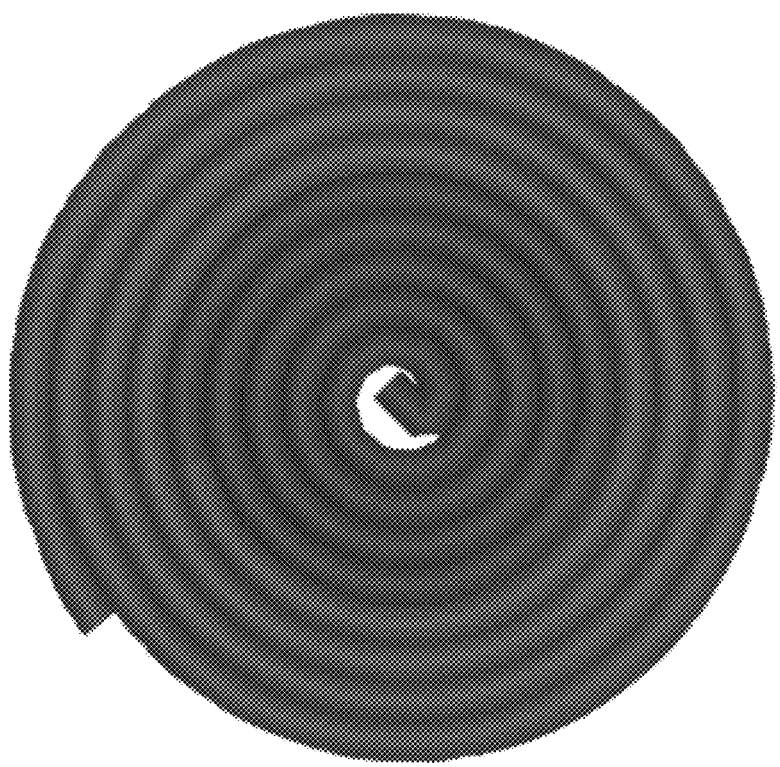
Figure 16A:
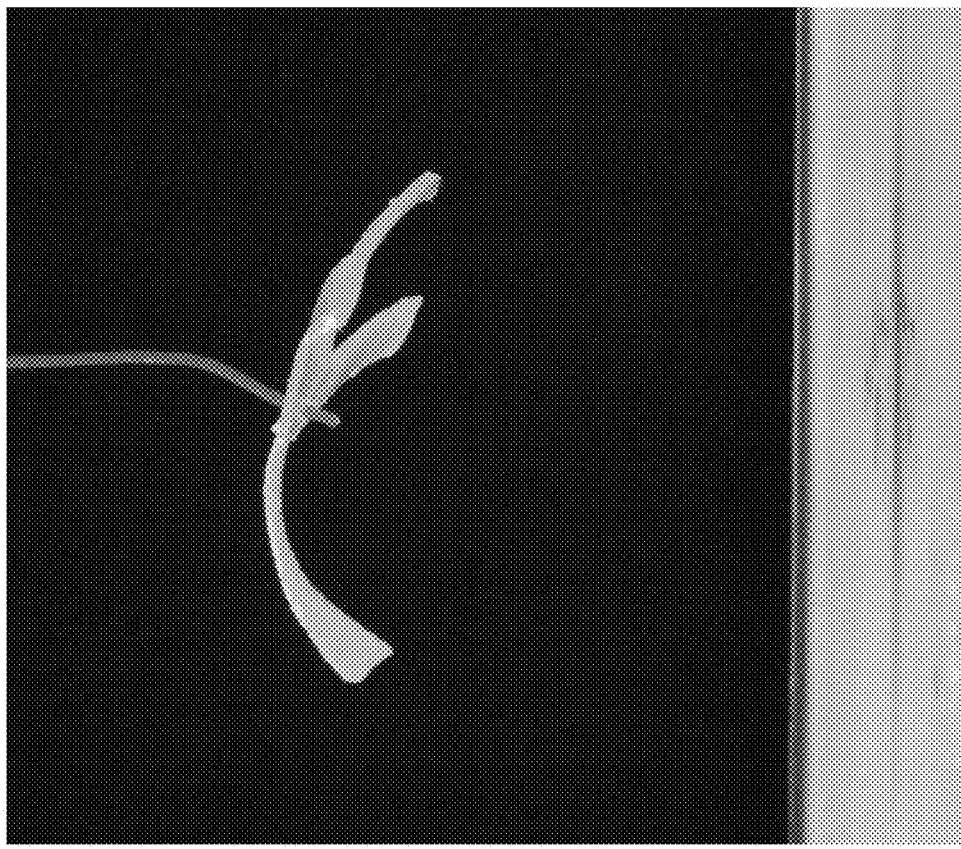
Figure 17A:
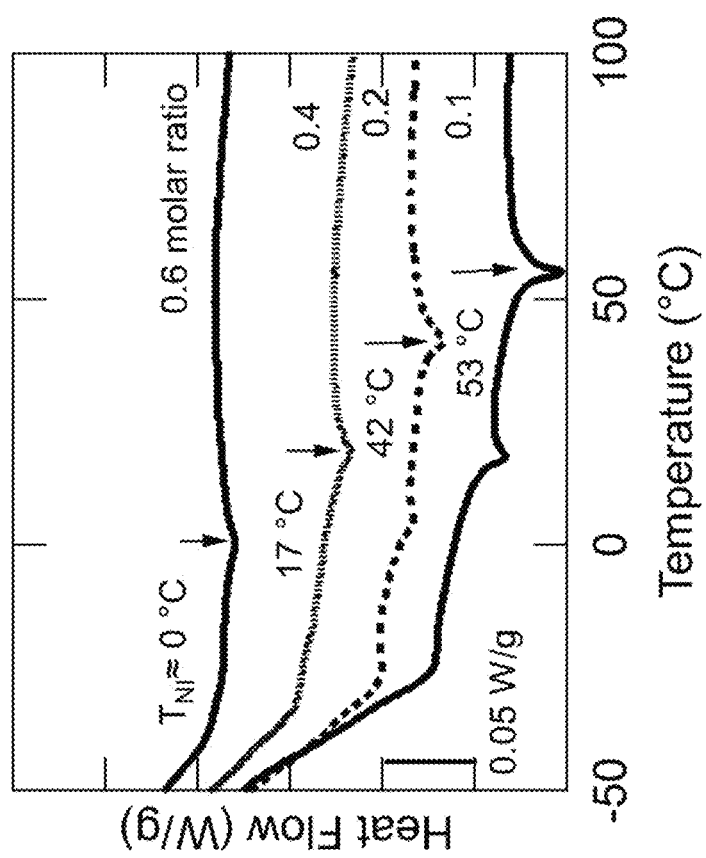
Figure 17B:
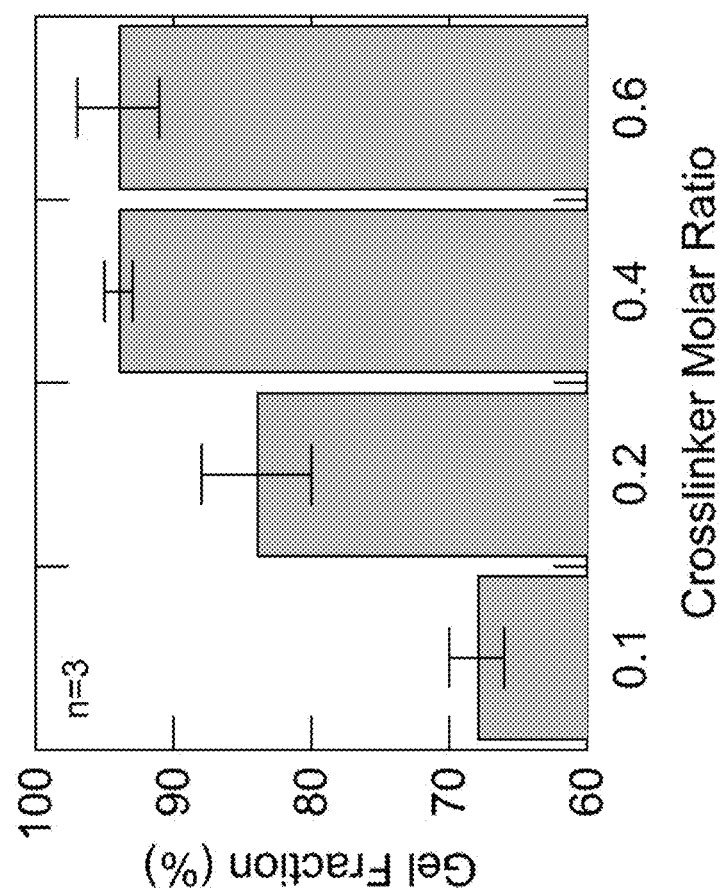
Figure 17C:
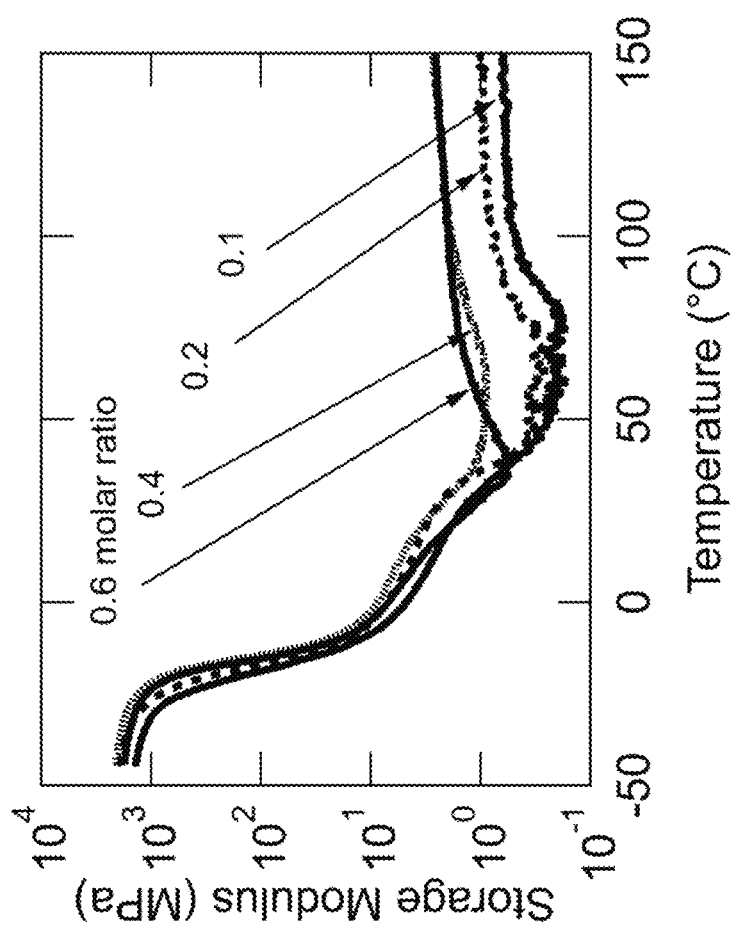
Figure 17D:
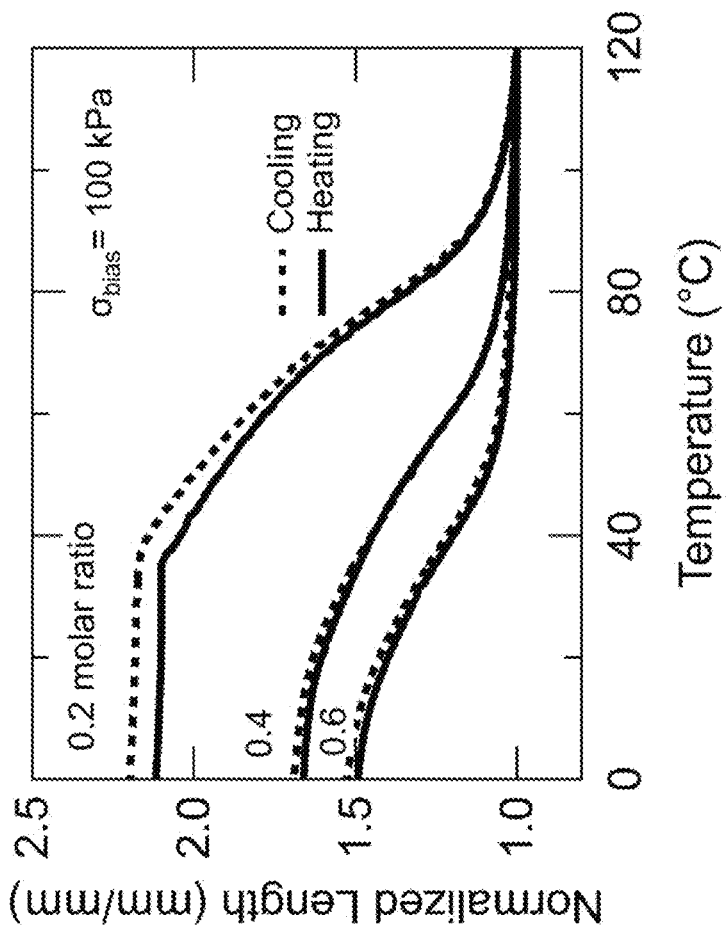
Figure 18:
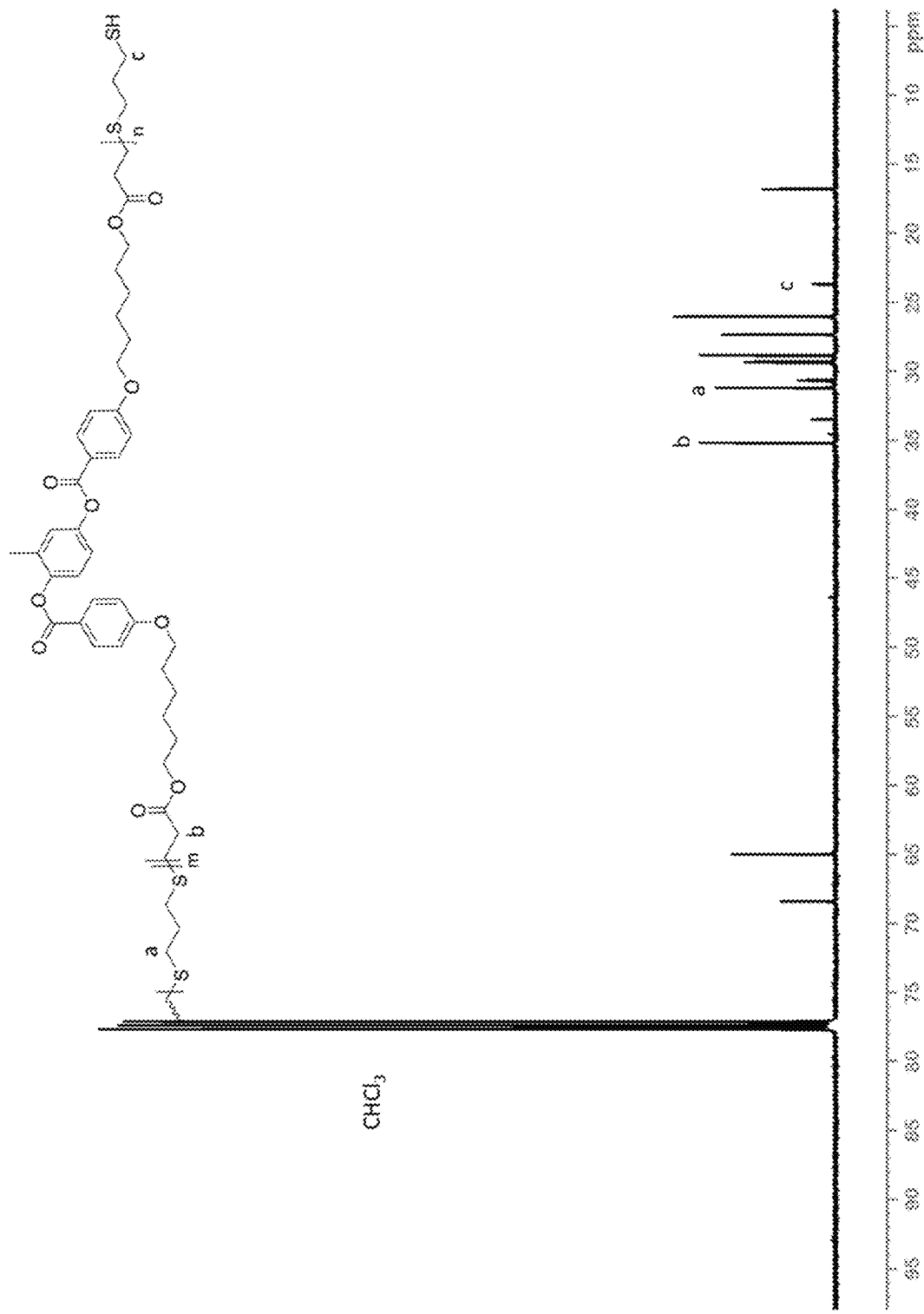
Figure 19:
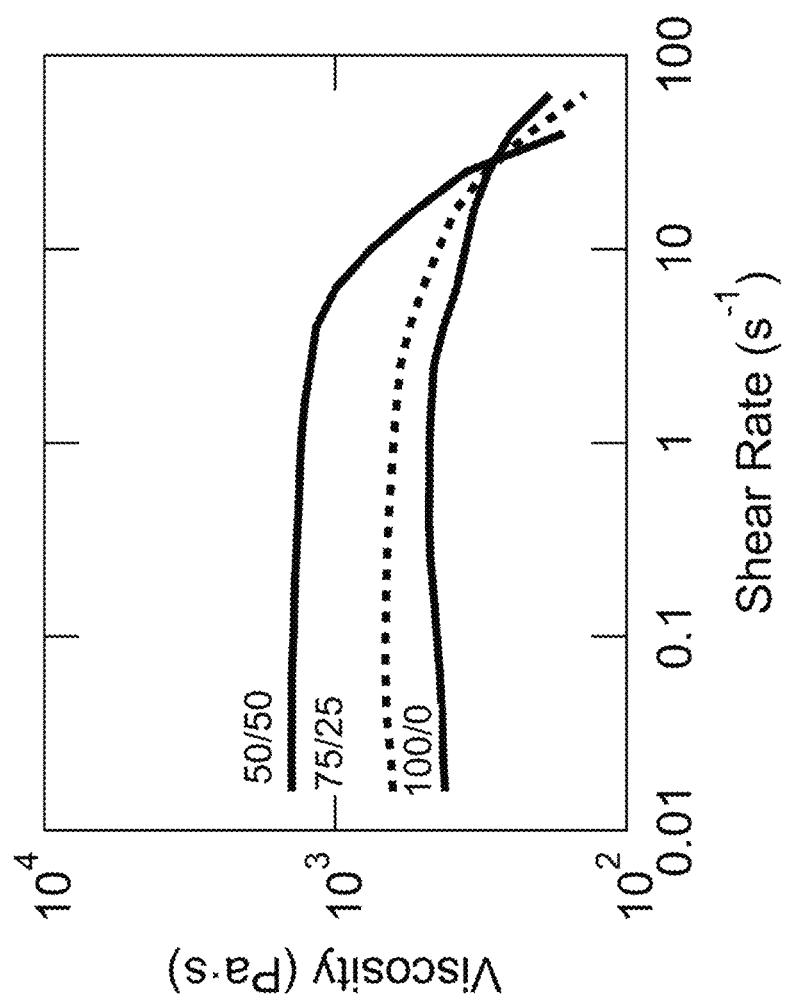
Figure 20:
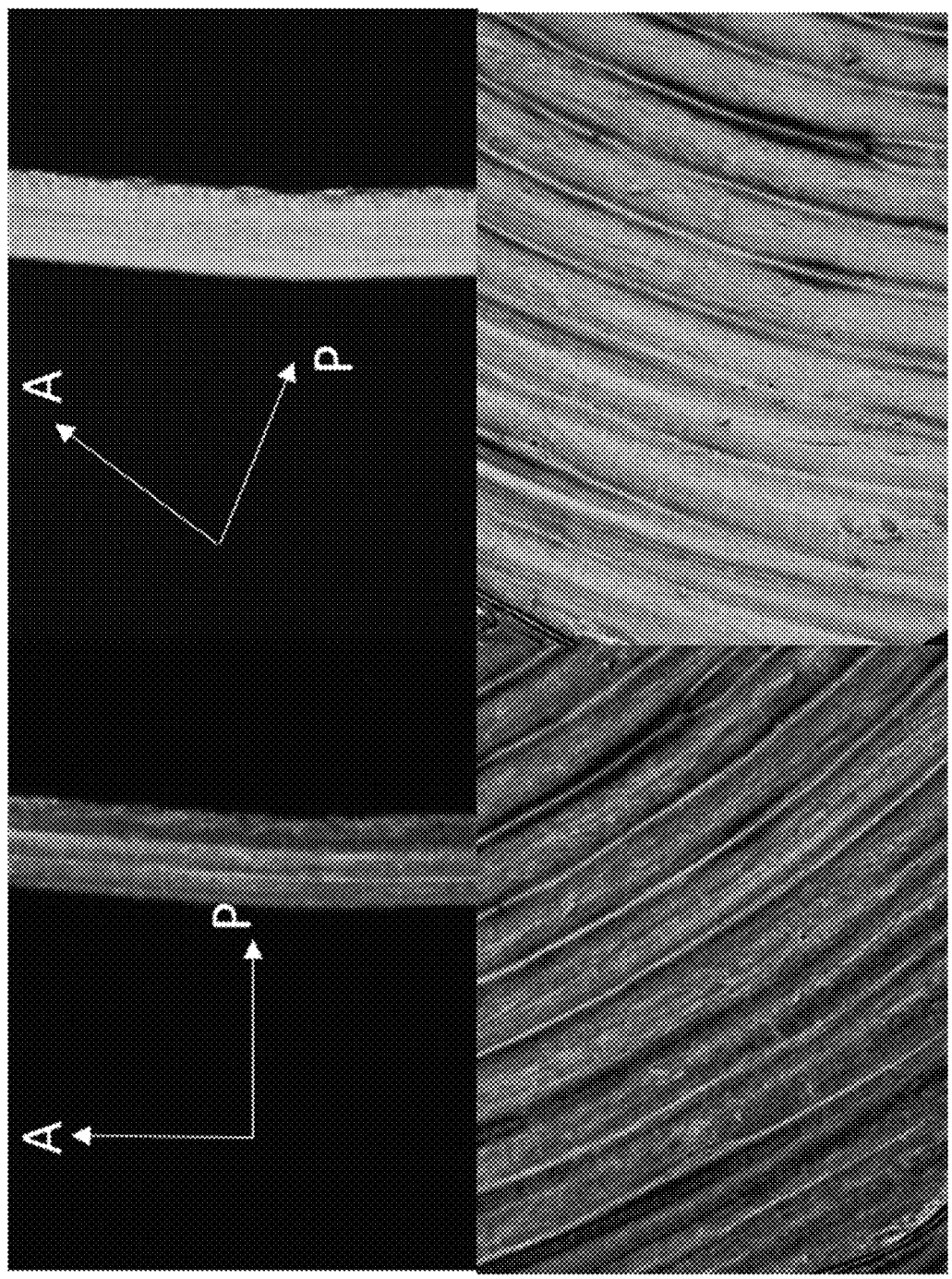
Figure 21A:
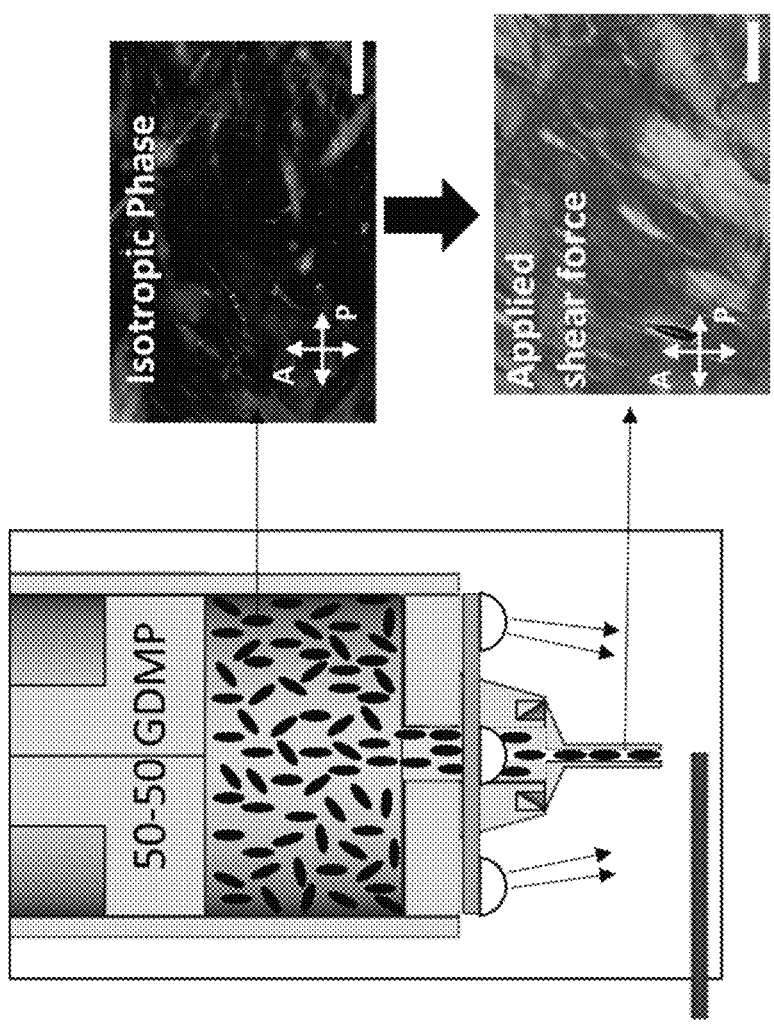
Figure 21B:
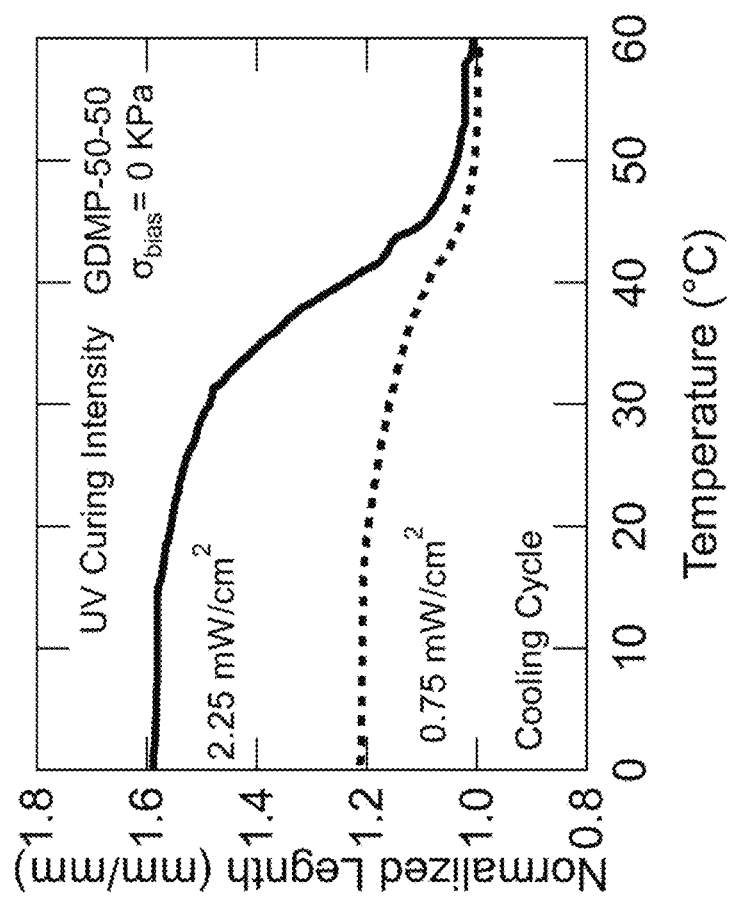

For a more complete understanding of the present disclosure, reference is now made to the following detailed description taken in conjunction with the accompanying FIGUREs, in which:

FIG. 1 presents a flow diagram of example embodiments of a method of ink-extrusion printing an object in accordance with the principles of the present disclosure;

FIG. 2 present a perspective view of ink-extrusion-printed object printed in accordance with an embodiment of the method of manufacturing disclosed in the context of FIG. 1 and further illustrating aspects of measuring the birefringence of a an extrusion-printed film of the object;

FIG. 3A Schematic of an example printing process used to fabricate and align LCE structures in accordance with the disclosure, FIG. 3B The chemical structure of the LC monomer, RM82, and chain extender, n-butylamine, used to synthesize the reactive LCE ink in accordance with the principles of the present disclosure, FIG. 3C Log-log plots of storage and loss modulus as a function of shear stress for the LC ink, FIG. 3D Log-log plots of the LC oligomer viscosity as a function of shear rates at varying printing temperatures, FIG. 3E Scanning electron micrographs of a printed LCE 'log pile' structure, illustrating the presence of micro-ridges, FIG. 3F Polarized optical micrographs showing birefringence of a uniaxially-printed LCE at 0° (dark) and 45θ (bright) to the polarizer, FIG. 3G Representative stress-strain curves of printed LCE films at three different orientations, 0° (where the print direction is perpendicular to the long axis of the film), 45θ (print direction is 450 to the film), and 90θ (parallel print path to the long axis), FIG. 3H Dimension of an uniaxially-aligned LCE fiber as a function of temperature;

FIG. 4A Print path schematic of a 1-layer Archimedean chord print pattern mimicking a +1 topological defect on a circular film, FIG. 4B A 3D printed 20 mm diameter disk with a programed +1 defect (inset), and Side view images of the disk at room temperature and at 160° C. in silicone oil, FIG. 4C A representative curve of normalized height as a function of temperature, FIG. 4D Schematic of a 2-layer rectangular LCE film with the top and bottom layers printed at 900 to each other and ±450 with respect to the long axis of the film, FIG. 4E At room temperature each film is flat and on heating the film morphs into either a helix or helical ribbon, FIG. 4F Normalized twist as a function of temperature for several aspect rations, whereas width of the samples increase, the amount of twists decreases, FIG. 4G Print path schematic of a porous structure comprised of rectilinear print paths alternating 900 with respect to the previous layer at 25% fill density, FIG. 4H The porous structure exhibits an in-plane contraction, FIG. 4I Pore size and volumetric dimensions as a function of temperature;

FIG. 5A A printed LCE cylinder (zero Gaussian curvature) with an azimuthal print path. On heating the cylinder undergoes radial contraction. Radial contraction is dependent by the thickness of the tube's walls, FIG. 5B Printed LCE hemispherical shell (positive Gaussian curvature); on heating the hemisphere undergoes an azimuthal contraction and an axial expansion forming a "peaked" hemisphere; height increases continuously as a function of temperature (red point indicates height), FIG. 5C A printed LCE hemihyperboloid; on heating the hemisphere undergoes an azimuthal contraction and an axial expansion leading to a continuous increase in height;

FIG. 6A A structure with comprised of opposing negative and positive Gaussian curvatures is printed with a print path. An asymmetric snap-through transition occurs on heating during the reorientation of the positive Gaussian curvature, FIG. 6B The snap-through actuation from the combined Gaussian structure is capable of reversible snapping upon continual heating and cooling past $T_{NI}$, FIG. 6C Time lapse images of the printed structure undergoing an asymmetric snap-through transition. The snap transition occurs over 16 ms, but releases enough energy to lift the structure airborne for ~64 ms, FIG. 6D Stroke and specific work for structures loaded with external loads;

FIG. 7 Log-log plots of storage and loss modulus as a function of shear stress for the LC ink; at all printing temperatures, the loss modulus is greater than the storage modulus signifying that the LCE system displays fluid as opposed to gel-like properties;

FIG. 8 Representative stress-strain curves of printed LCE films at three different orientations, 0° (where the print direction is perpendicular to the long axis of the film), 45θ (print direction is 45θ to the film), and 90θ (parallel print path to the long axis);

FIG. 9 Side view images of a printed LCE hollow cylinder with +1 defect pattern through the thickness exhibiting both radial contraction and height expansion;

FIG. 10 Side view images of a printed LCE hollow cylinder with the combined Gaussian curvature LCE and imposed with a high load, s u c h t h at the combined Gaussian curvature LCE no longer exhibits a full snap-through actuation but retains the ability to lift the load a certain distance, but not generate enough energy to produce a snap-through actuation;

FIGS. 11A-11C Example processing schematic of LC materials structures in accordance with the disclosure: FIG. 11A Chemical structure of example LC, thiol, and crosslinker monomers used to generate different liquid crystal elastomer compositions with varying mechanical and thermomechanical properties, FIG. 11B Printing schematic of three LC inks printing 3D filaments, FIG. 11C Optical images of 3D printed filaments showing nematic (opaque) to isotropic (transparent) transition of the three networks as a function of heating, Scale Bar: 2 mm;

FIGS. 12A-12C Example effect of the crosslinking strategy structures in accordance with the disclosure: Direct comparison of the thermomechanical properties of the inks and the networks using two different crosslinking mechanisms (acrylate homopolymerization vs. thiol-ene "click" polymerization), Thiol-acrylate reaction is used to create the oligomer inks (RM 82 as mesogen and EDDT as spacer), FIG. 12A Differential scanning calorimetry (DSC) traces of the inks before crosslinking, FIG. 12B Dynamic mechanical analysis (DMA) traces of the networks (polydomain), FIG. 12C Actuation strain of the networks under constant stress of 100 kPa;

FIGS. 13A-13D Example influence of thiol spacer on thermomechanical properties: FIG. 13A DSC traces of the oligomer inks. FIG. 13B Log-log plots of each oligomer inks' viscosity as a function of shear rate at room temperature for EDDT and GDMP and 65° C. for PDT. FIG. 13C DMA traces of the networks resulting from each ink (polydomain). FIG. 13D Actuation strain of 3D printed, uniaxially oriented samples without applied stress (~0 kPa);

FIGS. 14A-14D Example influence of molecular weight of the mesogen on thermomechanical properties: Compositions have varying weight ratios of two mesogens (RM82/RM257) while keeping the same spacer (GDMP) and crosslinker (TATATO), Five inks are formulated with 100/0, 75/25, 50/50, 25/75, or 0/100 wt % of RM82/RM257, FIG. 14A DSC traces of the inks, FIG. 14B DMA traces of the networks resulting from crosslinking of the inks (polydomain), FIG. 14C Actuation strain of 3D printed, molecularly oriented samples without applied stress of formulations 100/0, 75/25, and 50/50, FIG. 14D Side-view images of a 3D-printed, 20 mm diameter disk printed with a +1 topological defect pattern at room temperature and actuated in hot tap water (45° C.), Scale bar: 5 mm;

FIGS. 15A-15F Example sequential actuation of multimaterial prints: FIG. 15A Printing schematic of a 20 mm disk printed with two materials in a +1 defect print pattern, FIG. 15B Sequential actuation of the disk into a plateaued-cone due to actuation of the GDMP 75/25 component. Further heating yields a full cone after PDT component actuates, FIG. 15C Height profile of the disk's actuation, FIG. 15D Printing schematic of a logpile structure with the horizontal axis printed with GDMP 75/25 composition and vertical axis printed with PDT composition, FIG. 15E Thermal actuation of the structure shows a contraction along with horizontal axis first followed by contraction along the vertical axis at higher temperatures. Outline of the original logpile structure is included to visualize the contraction of each axis, FIG. 15F Actuation strain as function of temperature for each axis (lines are used to guide the eye), Scale bars: 5 mm;

FIGS. 16A-16D Example temperature sensitive gripper: FIG. 16A Temperature sensitive gripper 3D printed with GDMP (75/25) and PDT compositions, FIG. 16B Printing schematic of the gripper. Layers 1 & 2 ($L_1$&$L_2$) are printed with GDMP 75/25-based compositions, and layers 3 & 4 ($L_3$ & $L_4$) are printed with PDT-based compositions, FIG. 16C At 70° C., the gripper will grasp the object and is capable of lifting the object; at this temperature the low-temperature responsive component fully actuates while the high-temperature responsive component stays relatively unactuated resulting in the grasp, FIG. 16D The same gripper is then introduced to a higher temperature environment (140° C.) causing the high-temperature responsive component to actuate overcoming the low-temperature response and inhibits grasping of the object, Scale bars: 10 mm;

FIGS. 17A-17D Example effect of the crosslinker concentration on thermomechanical properties: varying the amount of the crosslinker (TATATO) from 0.1, 0.2, 0.4, or 0.6 molar ratio; the networks formed by crosslinking (TATATO) with thiol-terminated oligomer using thiol-ene photopolymerization; FIG. 17A DSC traces of the oligomer and the crosslinker monomer before crosslinking; FIG. 17B Gel fraction measurement of the crosslinked LCEs; FIG. 17C DMA traces of the elastomeric networks (polydomain); FIG. 17D Actuation strain measurements of polydomain samples under applied stress of 100 kPa;

FIG. 18 Example $^{13}C$ NMR spectrum of RM82-PDT oligomer for the calculation of the molecular weight using end group analysis;

FIG. 19 Example rheology measurements of GDMP-based inks: Compositions are formed by varying weight ratios of two mesogens (RM82/RM257) while keeping the same spacer (GDMP) and crosslinker (TATATO). Log-log plots of each oligomer inks' viscosity as a function of shear rate at room temperature;

FIG. 20 Example shear forces to induce alignment of LC links: polarized optical micrographs showing birefringence of a uniaxially printed LCE at 0° (dark) and 45° (bright) to the polarizer; and FIGS. 21A-21B Example influence of the shear force on the ink's LC behavior and the effect of intensity of UV curing on the actuation strain for 50-50 GDMP-based LCEs: FIG. 21A the shear forces applied into GDMP (50-50) transiently increases its $T_{NI}$, polarized optical micrographs show an isotropic ink of this composition becomes nematic upon applying a shear force at room temperature, FIG. 21B Actuation strain measurements of uniaxially printed 50-50 GDMP-based LCEs under applied stress of 0 kPa: the upper plot for a sample crosslinked at UV intensity of 2.2 mW/cm² and the lower plot for a sample crosslinked at 0.75 mW/cm².

DETAILED DESCRIPTION

As part of the present disclosure we have found that extrusion printing facilitates the manufacture of LCE objects with locally-controlled molecular order within 3D-printed geometries. Shear forces intrinsic to the extrusion printing process can be used to orient LC reactive inks, as disclosed herein, along a print path, and these inks can subsequently be polymerized into stimulus-responsive elastomers. Molecular orientation and geometric architecture can be controlled to design specific shape changes on exposure to various external stimuli such that printed objects that can stretch, twist, and contract can be designed and fabricated as disclosed herein. The printing methods, inks and objects manufactured therefore may be used to manufacture smart devices ranging from low density machines to implantable medical devices.

One embodiment of the disclosure is a method of ink-extrusion printing an object. FIG. 1 presents a flow diagram of example embodiments of a method 100 of ink-extrusion printing an object in accordance with the principles of the present disclosure. FIG. 2 present a perspective view of an ink-extrusion-printed object 200, printed in accordance with any of the embodiments of the method disclosed herein, including any embodiments of the method 100 disclosed in the context of FIG. 1.

With continuing reference to FIGS. 1 and 2 throughout, the method 100 includes providing a mixture 205 including liquid crystal monomers (step 105). The method 100 also includes photo-catalyzing or heating the mixture 205 to produce a liquid crystal ink 210 (step 110). The ink 210 is in a nematic phase.

In some embodiments, the ink 210 has a shear loss modulus (G") to shear storage modulus (G') ratio of greater than about 100:1. For example, some embodiments of the mixture 205 consisting essentially of (e.g., 99 wt % or higher, or 99.1 wt % or higher) the liquid crystal monomers and optional chain extending monomers, photo-initiators, crosslinking catalysts, and/or crosslinking agents, described below, can have such a G": G' ratio. For example, some embodiments of the mixture substantially free of viscosity modifiers (less than 1 wt % or less than 0.1 wt %), can have such a G": G' ratio.

The method 100 further includes extruding the ink 210 through a print-head orifice 215 moving along a print direction 220 to form an extruded film 225 of the object 200 (step 115). The extruded film 225 exhibits birefringence. For example in some embodiments, the extruded film 225 exhibits birefringence along the print direction 220 such that the film 225 is brighter when illuminated with a polarized light 227 when the print direction 220 is about ±45 degrees relative to a source direction 230 of the polarized light 227 as compared to when the film 225 is illuminated with the polarized light 227 with the source direction 230 substantially parallel to the print direction 220.

The term ink-extrusion printing as used herein means extruding a reservoir 235 of ink through an orifice of a print head 222 by applying pressure to the ink 210 in the reservoir 235 such that shear forces are applied to the extruded ink as it passes through the orifice such that the nematic phase of the liquid crystal are substantially aligned in the print direction as evidenced by exhibiting the birefringence. The birefringence along the print direction denotes the substantial orientation of liquid crystal monomers in the print direction, also referred to herein as a nematic director, due to the shear forces experienced by the monomers (or oligomers of these monomers) from the extrusion printing process.

The term brighter as used herein means that for a thin sample (e.g., 1 mm thickness 240) a visible light transmission intensity from the extruded film 225 when the source direction 230 (e.g., the propagation direction) of the polarized light 227 is at about +45 or −45 degrees (e.g., +45±5 degrees or −45±5 degrees), relative to the print direction 220, is at least two times greater (and in some embodiments, at least 10 or 100 times greater) than a visible light transmission intensity from the film 225 when the source direction 230 of the polarized light 227 is substantially parallel to the print direction 220 (e.g., 0±5 degrees).

FIG. 2 further illustrates aspects of an example measurement the birefringence of an extrusion-printed film 225. The film 225 can be positioned such that, two polarizing filters 250, 252 (e.g., crossed polarizer, P, and analyzer, A, respectively), are located above and below the film 225, respectively. The polarized light 227 (e.g., generated from a non-polarized white visible light source 255), produced after passing through the first polarizing filter 250, then through the film 225, and then through the second polarizing filter 252 to a light meter 257 to quantify the birefringent light transmission intensity. One or both of the two polarizing filters 250, 252 can be rotated such the polarized light 227 is ±45 and then 0 degrees, relative to the print direction 220. Alternatively, the film 225 can be rotated (e.g., by rotating a sample stage, not shown for clarity), such the polarized light 227 is ±45 and then 0 degrees, relative to the print direction 220.

One skilled in the pertinent art would appreciate how such measurements could be implemented using commercially available polarized light microscope systems. One skilled in the pertinent art would appreciate how such measurement principles could be adapted to measure the reflected light intensity relative to the print direction instead of transmission intensity.

In some embodiments, providing the mixture 205 (step 105) can include adding one or more different types (e.g., different chemical formula) of liquid crystal monomers and other optional components such as chain extending monomers, photo-initiators, crosslinking catalysts, and/or crosslinking agents together in a container 260 (e.g., a glass vial), while stirring the mixture (e.g., vortexed) until a homogeneous, LC monomer solution is formed. The homogeneous solution can then be transferred from the container 260 to the receptacle 235 (e.g., a print tube) for subsequent formation of the ink 210 in accordance with step 210. Alternatively or additionally, in some embodiments, as part of step 110, the mixture of such components in the container 260 can be heated as part of forming the ink 210 and then the ink 210 or partially formed ink 210 can be transferred to the receptacle 235, to complete forming the ink (e.g., via additional light illumination or heating) in accordance with step 110.

In some embodiments heating (step 110) includes or is heating to a temperature in a range from 40 to 140° C. for 6 to 18 hrs (or 60 to 90° C. for about 10 to 14 hrs, or 75° C. for about 12 hrs in some embodiments). In some embodiments, photo-catalyzing (step 110) includes or is illumination e.g., with UV or VIS light (e.g., with intensity of about 1 mW/cm$^2$) at room temperature for 6 to 18 hrs (intensity X time Y) in the presence of a photo-initiator. In some embodiments, step 110 may include a combination, or sequence, of such heating and photo-catalyzing.

The liquid crystal ink 210 produced in step 110 has the appropriate viscosity to allow extrusion printing, to facilitate the desired shearing (e.g., G"/G'>100) due to extrusion-printing such that the ink 210 has birefringence associated with nematic phase alignment, and, to hold such birefringence (and nematic phase alignment) after printing and during and following the curing of the film 225, as further discussed below. For instance, in some embodiments, the ink 210, at the extrusion-printing temperature, has a viscosity in a range from 5 to 10 Pa·s at 50 s$^{-1}$ (e.g., about 8 Pa·s at 50 s$^{-1}$ in some embodiments). For instance, in some embodiments, extruding the ink through the orifice 215 exposes the ink to a shear rate in a range from 1 to 100 s$^{-1}$. For instance, in some embodiments, extruding the ink through the orifice 215 exposes the ink to a shear rate in a range from 40 to 60 s$^{-1}$ (e.g., about 50 s$^{-1}$ in some embodiments).

To facilitate providing such inks 210, in some embodiments, photo-catalyzing or heating the mixture to produce the ink 210 (step 110) includes forming liquid crystal oligomers of the liquid crystal monomers, the oligomers in the nematic phase (e.g., having the birefringence) and having a molecular weight in a range from about 2 to 25 kD.

To facilitate providing the desired films 225, it is important to ensure that the extrusion of the ink 210 occurs while the ink 210 is in a nematic phase, and thereby has the above-described birefringence, extruding the ink (step 115) through the print-head orifice 215 is carried out at a temperature below the nematic to isotropic transition temperature ($T_{NI}$) of the ink 210. For instance, in some embodiments, the extruding may be carried out a temperature of least 2, 5 or 20° C. less than the $T_{NI}$ of the ink 210.

In some embodiments, the extruded film 225 can be left to cure, the curing including further polymerization of the oligomers or forming of crosslinks between polymer chains of the liquid crystal oligomers, or simply cooling, to solidify over time (e.g., hours or days) at room temperature, or higher sub-melting point temperatures, without further external stimulus to accelerate crosslinking, polymerization or solidification.

For example, the rheology of the extruded film (e.g., exhibits a yield stress) can be such that the film spontaneously cures to form a solid at room temperature (20° C.).

In other embodiments, the method 100 can further include applying an external stimulus to accelerate crosslinking of the extruded film to form a cured film 225 (step 120).

Embodiments of the cured film exhibit the above-described birefringence (step 120). For instance, the cured film can have substantially the same brighter birefringence light transmission intensity when illuminated with the polarized light in the source direction when the print direction is about ±450 versus substantially parallel visible light transmission intensity (e.g., the brighter transmission intensity is within ±10%, and within ±1% for some embodiments), as the extruded film before the crosslinking.

In some embodiments, the external stimulus applied in step 120 can include non-photo-catalyzed crosslinking, e.g., vitrification or crystallization, to accelerate solidification of the extruded film.

In some embodiments, applying the external stimulus (step 120) can include a first sub-step (step 122) of applying a first external stimulus to cause an initial crosslinking of the liquid crystal ink in proximity to the print head 222 as it is moving, and, a second sub-step (step 125) of applying a second external stimulus to post-cure the object after the ink-extrusion printing of the object is complete. In some embodiments, applying the external stimulus of the first sub-step 122 can include applying UV light source (e.g., light sources 285) in proximity to a print-head 290 (e.g. a directed UV LED source attached to the print-head). In some embodiments, applying the external stimulus of the second sub-step 125 can include applying a UV light source capable of illuminating the object as a whole (e.g. a UV lamp).

In some embodiments the cured film 225 can be or include a liquid crystal polymer network including cross-linked copolymers of liquid crystal diacrylate monomers, and can be liquid crystal elastomers. In some embodiments, the cured film 225 can be or include a liquid crystal polymer network having a MW of at least 20 kD, 100 KD, 1000, 10000 KD such that the cured film is a solid at room temperature, 30° C., 40° C. or 50° C.

Another embodiment of the disclosure is a liquid crystal ink (e.g., ink 210, FIG. 2) for ink-extrusion printing (e.g., step 115 FIG. 1). Embodiments of the ink include a mixture including liquid crystal monomers. The mixture when at a target printing temperature is in a nematic phase.

In some embodiments the mixture 205, when at the target printing temperature, the mixture has a shear loss modulus (G") to shear storage modulus (G') ratio of greater than about 100:1 (or at least about 150:1, 200:1, or 300:1, in various embodiments). In some embodiments, as discussed above, the mixture 205 having such a G": G' ratio, consists essentially of the liquid crystal monomers and optional chain extending monomers, photo-initiators, crosslinking catalysts, and/or crosslinking agents. Additionally or alternatively, in some embodiments, the mixture 205 having such a G":G' ratio, is substantially free of viscosity modifiers, can have such a G": G' ratio.

In some embodiments, to facilitate extrusion-printing, the ink, in a desired temperature range, the ink has a nematic to isotropic transition temperature ($T_{NI}$) in a range from about 0 to 150° C. (or from about 0 to 20, 20 to 40, 40 to 60, 60 to 80, 80 to 100 or 100 to 120° C. in various embodiments). As further illustrated in the Experimental Results sections herein, to provide the desired $T_{NI}$, the ink can include or be one or more types of 1,4 (acryloyloxalkyloxy)benzoyloxy 2-methyl benzene liquid crystal molecules.

In some embodiments, at least some of the liquid crystal monomers are part of liquid crystal oligomers of the ink, the liquid crystal oligomers having an average molecular weight (MW) in a range from about 2 kD to 25 kD. As an example, when the liquid crystal monomers are RM257 molecules (1,4-Bis-[4-(3-acryloyloxypropyloxy)benzoyloxy]-2-methylbenzene, CAS 174063-87-7; MW 588 g/mol) then 3 to 30 of RM257 LC monomers polymerized in a sequential polyacrylamide chain of the liquid crystal oligomers would have MWs of about 1.8 kD to 18 kD. Or, for example, when the liquid crystal monomers are RM82 molecules 1,4-Bis-[4-(6-acryloyloxyhexyloxy)benzoyloxy]-2-methylbenzene, CAS 125248-71-7, MW 673 g/mol) then 3 to 30 of RM82 LC monomers (MW=673 g/mol) polymerized in a sequential polyacrylamide chain of the liquid crystal oligomers would have MWs of about 2.0 to 20 kD.

Higher molecular weight oligomers would be present in the ink when the chain extending monomers are also incorporated into the polymerized chain of the liquid crystal monomer. Continuing with the same examples, when the chain extending monomer 1,9-nonanedithiol is included in between some or all of the 3 to 30 RM257 LC monomers and terminates the polymerized chain then the polymerized chain of the liquid crystal oligomer could have MWs of up to about 2.7 kD to 24 kD. When the chain extending monomer 1,9-nonanedithiol is included in between some or all of the 3 to 30 RM82 LC monomers and terminates the polymerized chain then the polymerized chain of the liquid crystal oligomer could have MWs of up to about 3 kD to 26 kD.

Still higher molecular weight oligomers (e.g., 2 or 3 times higher MW) could be present in the ink when one or more crosslinking agents bridge two or more of the polymerized chains of two liquid crystal oligomers together.

Some embodiments of the ink include liquid crystal monomers having one or more di-acrylate end-functionalized liquid crystal monomers (also referred to herein as known as mesogenic monomers or mesogens). Some such di-acrylate end-functionalized liquid crystal monomers can be composed of 1, 4 benzoyloxy-benzene mesogenic cores terminated by di-acrylate end-functionalized acryloyloxyalkyloxy spacer arms of varying lengths.

For example, some embodiments of the liquid crystal monomers include one or more 1,4-bis-[acryloyloxyalkyloxy] benzoyloxy 2, 3, 5, or 6 substituted or unsubstituted benzene molecules having the formula:

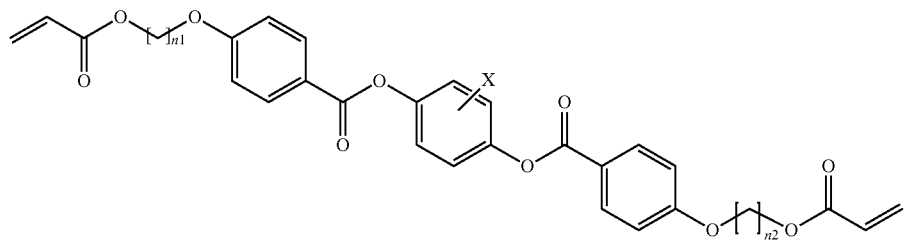

where $n_1$ and $n_2$ are integers in a range from 3 to 6, and X is —H, —CH$_3$ or —F.

As further illustrated in the Experimental Results sections, 2-methyl benzene substituted molecules (X=—CH$_3$) can facilitate controlling the nematic phase behavior of ink so as to offer a broad range of temperature and viscosities where the molecule in the ink can be in a nematic phase which in turn facilitates ink-extrusion printing under a variety of different conditions.

In some such embodiments, the liquid crystal monomers includes molecules (e.g., first molecules) where $n_1=n_2$ and the X is —CH$_3$. For example the liquid crystal monomer can have the formula of:

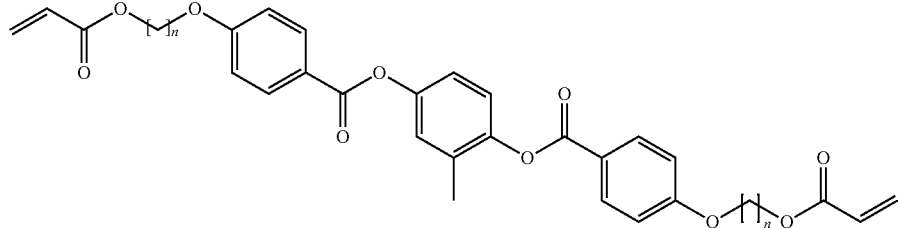

wherein n equals an integer from 3 and 6.

In some such embodiments, the liquid crystal monomers can further includes a second molecule where X is —CH₃ and n₁=n₂ but the n₁ and n₂ of the second molecule is not equal to the n₁ and n₂ of the first molecule. For example the second molecules of the liquid crystal monomer has the formula of:

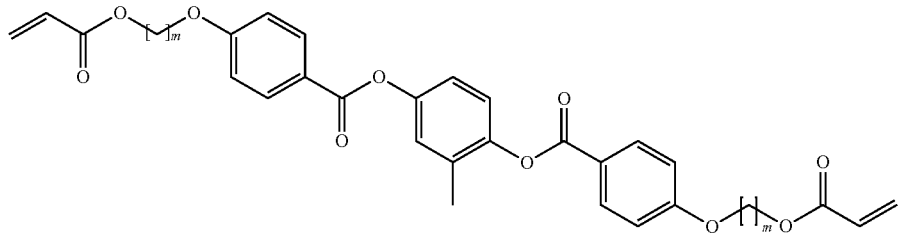

wherein m is also an integer from 3 to 6 but m is not equal to n.

For example, in some such embodiments, for the first molecules, n₁=n₂=6 and X=—CH₃ to provide RM82 molecules, for the second molecules, n₁=n₂=6 and X=—CH₃ to provide RM257 molecules and the molar ratio of the first molecule:second molecule (e.g., RM82:RM257) is in a range from about 25:75 to 75:25.

In some embodiments, to lower the transition temperature ($T_{NI}$), the ink can include chain extending monomers (e.g., as provided in the mixture 205, FIG. 2). Embodiments of the chain extending monomers can include a covalently linked series of three to ten carbon, sulphur, oxygen or nitrogen atoms and two end functional groups capable of reacting with the liquid crystal monomer, e.g., such that the chain extending monomers are incorporated into a backbone of a polymerized chain of the chain extending monomers during the heating or photo-catalyzing step 110. Non-limiting examples include one or more of n-butylamine, 2,2'-(Ethylenedioxy)diethanethiol (EDDT), nonanedithiol (NDT), ethanedithiol (EDT), and hexanedithiol. The primary amine of n-butylamine reacts twice and so provides the equivalent two reactive end functional groups.

In some embodiments, to increase the MW of liquid crystal oligomers and adjust the rheology of the film, the ink can include a crosslinking agent capable of bridging oligomers together, e.g., by covalently bonding one polymerized chain of the liquid crystal monomers to another polymerized chain of the liquid crystal monomer via the crosslinking agent. As non-limiting example crosslinking agent is non-limiting example crosslinking agent includes 1,3,5-triallyl-1,2,5-triazine-2,4,6 (1H,3H,5H)-trione (TATATO) or similar tri-vinyl functionalized crosslinking agents familiar to those skilled in the pertinent art.

Still another embodiment of the disclosure is an ink-extrusion-printed object (e.g., object 200, FIG. 2). The object can be formed by any of the method embodiments, and using any of the ink embodiments discussed in the context of FIGS. 1 and 2.

Embodiments of the object 200 include an extrusion-printed film (e.g., film 225) that include or is a nematic liquid crystal elastomer. The film exhibits birefringence along an extrusion axis of the film (e.g., the axis parallel to print direction 220 also referred to as director) such that the film is brighter when illuminated with a polarized light when the extrusion axis is about ±450 relative to a source direction 230 of the polarized light 227 as compared to when the film is illuminated with the polarized light with the source direction substantially parallel to the extrusion axis.

The term nematic liquid crystal elastomer, as used herein means that the polymer is a viscoelastic polymer, having the above described birefringence and having both viscous and elastic properties familiar to those skilled in the pertinent art. For example, the nematic liquid crystal elastomers of the object have a glass transition temperature, as measured using differential scanning calorimetry by the midpoint of the change in heat capacity, less than about 30° C., and Young's modulus of less than about 200 MPa.

The term film, as used herein refers to filaments, layers or other continuous raised feature shapes that not are necessarily larger in two dimensions than in a third dimension.

In some embodiments, the film 225 has an elastic modulus in a direction parallel to the extrusion axis that is at least 4 times greater than an elastic modulus of the film in a direction perpendicular to the extrusion axis. The some embodiments, the elastic modulus in a direction parallel to the extrusion axis is a value in a range from $10^x$ to $10^y$ Pa where x equal 5 and y equals 9.

As further illustrated in FIG. 2, and the Experimental Results section to follow, in some embodiments, and outer surface (e.g., top surface 261) the film 225 includes ridges (e.g., micro-ridges 262). Each the micro-ridges 262 can have a long axis (e.g., axis 264) substantially parallel to the extrusion axis. In some embodiments, the ridges 262 each can be separated by an average distance 266 (e.g., peak-to-peak distance) in a micron range. In some embodiments, the ridges 262 can have an average depth 268 (e.g., peak-to-valley depth in a range from 1 to 1000 microns. In some embodiments, the ridges can be rectangular shaped while in other embodiments the ridges can be rounded.

While not limiting the scope of the invention by theoretical considerations, it is believed that the micro-ridges result from the extrusion-printing process of the inks disclosed herein and that the micro-ridges have an effect on the mechanical behavior of the film (e.g., the anisotropy in the elastic modulus parallel versus perpendicular to the extrusion axis).

Embodiments of the object can include extrusion-printed films printed (e.g., as a continuous film) in any of three dimensions. For example, as illustrated in FIG. 2, some embodiments of object 200 include a film where the film 227 include at least one bend (or turn) 270 where a direction 272 of the extrusion axis in a first segment 274 of the film 225 before the bend and a direction 276 of the extrusion axis in a second segment 278 of the film are non-parallel. That is the extrusion axis of the first segment 274 and the extrusion axis of the second segment 278 form an angle 280 of at least about 1 degree (e.g., at least about 5 degrees, or acute normal or obtuse angles in various embodiments).

In such embodiments, the above-described birefringence, differences elastic modulus properties in parallel and perpendicular extrusion-directions, the micro-ridges, and anisotropic response are all with respect to a local direction of the extrusion axis, e.g., 1, 10, 100 millimeter or greater lengths of sub-segments of the film 225 that are extrusion-printed in substantially a same parallel direction (e.g., an angle 280 of less than 1 degree).

In some embodiments, the film changes anisotropically to an isotropic external stimulus. For instance, the film can exhibit an anisotopic response to an isotropic external stimulus, where the isotropic external stimulus being one or more of visible light, a change in temperature or exposure an aqueous liquid.

For example, in some embodiments, the film changes by reversibly contracting parallel to the extrusion axis when the external stimulus is an increase in temperature and by reversibly expanding parallel to the extrusion axis when the external stimulus is a decrease in temperature. For example, in some embodiments, the film change with the anisotropic response includes reversible contraction parallel to the extrusion axis and reversible expansion perpendicular to the extrusion axis when the external stimulus is an increase in temperature. That is, the reverse anisotropic response occurs when the external stimulus is a decrease in temperature: expansion parallel to the extrusion axis and contraction perpendicular to the extrusion axis. As a non-limiting example, for some embodiments the film can contract by 40 percent in length along the extrusion axis upon heating from room temperature to 200° C.

For example, in some embodiment, the film change with the anisotropic response includes reversible expansion parallel to the extrusion axis and reversible contraction perpendicular to the extrusion axis when the external stimulus is an exposure to an aqueous solution. In some embodiments the aqueous solution can include or be an inorganic acid. While not limiting the scope of the invention by theoretical considerations, it is believed that the expansion parallel to the extrusion axis occurred because exposure to the aqueous solution causes a downward shift in the transition temperature $T_{NI}$ of the nematic liquid crystal elastomer of the film. As a non-limiting example, for some embodiments the film can contract by 20 percent in length along the extrusion axis upon exposure to water for 24 hrs.

For example, in some embodiment, the film change with the anisotropic response includes reversible contraction parallel to the extrusion axis and reversible expansion perpendicular to the extrusion axis when the external stimulus is exposure to visible light. As a non-limiting example, for some embodiments the film can contract by 50 percent in length along the extrusion axis upon exposure continuous or pulsed light beams from incandescent or laser light sources having an intensity in a range of from 0.050 to 2 W/cm$^2$.

In some embodiments, to refine the extent of such anisotropic responses, a combination of these isotropic external stimuli can be applied to the film. Or, the external stimuli can be applied so as to stimulate only a portion of the object or to differently stimulate different portions of the film.

As further demonstrated in the Experimental Results sections to follow, in some embodiment, to refine the extent of the anisotropic responses, the object can include two or more different extrusion-printed films, where each film is made of different compositions of nematic liquid crystal elastomer, e.g., having different anisotropic responses for a given same external stimulus. For example the second film can be composed of a second nematic liquid crystal elastomer having a different transition temperature $T_{NI}$ (e.g., an about 5, 10, 20, or 30° C. difference) than the transition temperature $T_{NI}$ of the first film. In some such embodiments, the second film can be extrusion printed adjacent and parallel to the film, or, on top of the film, along a second extrusion axis that is substantially parallel to the extrusion axis of the film. That is the first and second films are coincident directors. In other embodiments, the second film can be extrusion printed such that the extrusion of the second film axis is non-parallel directions to the extrusion axis of the first film (e.g., the extrusion axis of the first and second films form a divergence angle of at least 1 degree).

As further demonstrated in the Experimental Result sections to follow, the object can include one or more films extrusion-printed in a variety of complex patterns to form, e.g., an Archimedean chord pattern, a stack of porous planar layers, a hollow cylinder including one or more neutral positive or negative Gaussian curved surfaces or other three-dimensional printed objects. For instance, embodiments of the object can include films extrusion-printed in multiple directions and/or include one or more films composed of different types of nematic liquid crystal elastomers having different $T_{NI}$ temperatures, and/or include multiple adjacent or stacked layers of such films, each film exhibiting birefringence and/or having ridges along the respective extrusion axis of the films. Such objects can be 3D printed to have complex programmed shape formations and/or exhibit reversible shape memory features in response to isotropic external stimulus, as further illustrated below.

Experimental Results 1

Presented are examples, in accordance with the method 100, to extrusion-print liquid crystal elastomers (LCEs) into 3D structures (object s) that undergo reversible changes in shape as a function of temperature. Stimulus responses of the extrusion-print structures can be programmed by locally controlling the molecular order in the 3D object. Molecular orientation can be controlled by shear forces associated with direct-write printing of reactive liquid crystal oligomers. The oligomers aligned along the print direction are subsequently trapped by cross-linking the oligomer into an elastomer. As further discussed below, in some embodiments, each element of the LCE undergoes a 40% contraction along the print direction. Structures with a varied print path within or between layers can facilitate controlled shape change. Some embodiments of porous LCE structures can be designed to undergo a reversible 36% volume reduction on heating. Extrusion printing also facilitates the fabrication of embodiments of 3D morphable objects with Gaussian curvatures. Such curve-containing structures can be designed to undergo rapid, reversible snap-through transitions in a matter of 16 ms. Compared to other 4D printing technologies, direct-write printing of LCEs as disclosed herein facilitates the fabrications functional polymeric components capable of large, reversible deformations and operation in a wide variety of environments.

While not limiting the scope of the invention by theoretical considerations, we propose that shear force imposed on LCE precursors by direct-write printing can be used to simultaneously deposit and align LCE filaments, where molecular alignment lies along the print path (FIG. 3*a*). The LC oligomer ink aligns as it is extruded through the print head nozzle. Alignment of molecular orientation is locked through UV photopolymerization, while or following the object's printing.

By controlling the print path, 3D structures with locally-controlled and reversible stimulus response can be fabricated to enable aligned LCE object geometries not achievable with current processing methods, to our knowledge.

Examples presented herein demonstrate how the control of geometry and stimulus response can be used to yield structures that can undergo negative coefficient of thermal expansion or rapid, reversible snap-through deformations.

Examples of ink for ink-extrusion printing presented herein that can exhibit moderate viscosity in the nematic phase and can be rapidly polymerized into a lightly cross-linked elastomer. We synthesized such inks from commercially-available precursors by modifying previously described chemistry to polymerize LCEs[p1-28]. For example, we synthesized a nematic diacrylate macromer by Michael addition of a 1.1:1 molar ratio of the nematic liquid crystal monomer, 1,4-bis-[4-(6-acryloyloxhexyloxy)benzoyloxy]-2-methylbenzene (RM82), and chain extender, n-butylamine, mixed with 1.5 wt % of photoinitiator I-369 (FIG. 3b). This mixture of small molecules was loaded into the print head where it underwent oligomerization over 12 h at 75° C., resulting in an acrylate-terminated LC ink that exhibits a nematic to isotropic transition temperature ($T_{NI}$) of 110° C. Some embodiments of the ink can be a mixture of nematic macromers of varying lengths and a small amount of photoinitiator. These nematic macromers (or oligomers) can be produced by a slow chain extension which takes place when the n-butylamine undergoes two Michael addition reactions, forming N—C bonds with two RM-82 units and converting the primary amine to a tertiary amine. The rheological behavior of these LC oligomer inks are advantageous for extrusion printing. The ink behaves as a viscous liquid during the extrusion process, as indicated in some embodiments by ~2 orders of magnitude lower shear storage modulus (G') than shear loss modulus (G") (FIG. 3c). At all printing temperatures, the loss modulus is greater than the storage modulus signifying that the LC oligomer displayed fluid as opposed to gel-like properties. Within the nematic phase (65° C. and 85° C.), the LC oligomer is shear-thinning at shear rates corresponding with 3D[p1-14], ~50 s$^{-1}$ (FIG. 3d), indicating the melt undergoes orientation characteristic of LC linear polymers[p1-29]. Above $T_{NI}$ (T=115° C.), the ink exhibits Newtonian behavior at moderate shear rates, as seen in typical isotropic polymer melts[p1-30]. As it is desirable that the extrusion of the oligomer ink occur in the nematic phase and at sufficiently low viscosities, ~8 Pa·s at 50 s$^{-1}$, similar to honey or molasses, we identified 85° C. as an acceptable printing temperature for this particular ink. After extrusion, maintaining the geometric integrity of the extrusion printed LCE film is important. As part of the method 100 we believe that three factors combine to stabilize the printed structure: the shear thinning behavior drives an increase in viscosity at low shear rates, cooling from the print temperature to room temperature leads to an increase in viscosity, and, photopolymerization of the LC filament cross-links the material. As a result, the modulus of the printed object becomes stiff enough to enable print paths that span gaps within the structure (FIG. 3e). Thus, the print-extruded LCE objects c a n retains structural integrity in the absence of direct supporting materials.

Molecular orientation within additively manufactured LCEs can be programmed in a controllable manner leading to anisotropic optical properties, elastic modulus, and stimulus response. Birefringence associated with uniaxially-oriented nematic LCEs is evident when single-layer LCEs extrusion printed using the aforementioned technique are observed between cross polarizers. The printed LCE films are dark when the direction of print extrusion (i.e., the direction of molecular orientation) is parallel to the polarizer or analyzer, and the films are bright when the print extrusion direction is 450 to the polarizer (FIG. 3f). This confirms that extrusion from the print head aligns the LC molecules in a uniaxial direction parallel to the computer-generated print path and that orientation is retained by crosslinking. Anisotropic and nonlinear mechanical properties associated with LCE films[p1-23] are also present in 3D printed LCEs (FIG. 3g). These materials have an elastic modulus of 18 MPa along the extrusion direction and modulus of 4 MPa normal to the extrusion direction. The mechanical anisotropy of a single printed layer is similar to the anisotropy observed in uniaxially aligned films[p1-31,p-132]. We believe that some of the differences in mechanical behavior may be attributed to non-uniform microstructure (e.g., micro-ridges FIG. 2, FIG. 3f) resulting from extrusion printing. Some embodiments of the extrusion printed LCE film are capable of shape change in response to temperature. For example, a reversible 40% contraction along the director was observed on heating from room temperature to 200° C. (FIG. 3h). This uniaxial actuator demonstrates that the direction of contraction can be controlled through extrusion printing.

Printing LCEs with non-uniaxial print paths within the plane or through the thickness can produce objects that undergo complex deformations on heating. For example, directing the printer to extrude the LC ink in an Archimedean chord pattern results in an LCE film programmed with a +1 topological defect (FIG. 4a-b). As first predicted by Modes et al[p1-33] and later realized experimentally in surface aligned LC polymer networks[p1-21], the printed LCE morphs from flat (thicknesses of ~80 μm) into a cone on heating, (FIG. 4b) with the height of the cone reaching up to 10 times the original film thickness (FIG. 4c). Out-of-plane deformation can also be programmed by varying the molecular orientation through the thickness of printed LCEs. By printing structures 2 layers thick, active bilayers can be fabricated (FIG. 4d). In rectangular structures with a 90θ difference in the orientation between the top and bottom layer, heating causes incompatible strains and results in out-of-plane deformation. If the print directions are offset by 450 to the long axis, twisting is observed upon heating (FIG. 4e). The nature and degree of twist is dependent upon the aspect ratio of the printed material, as previously described[p1-34]. Films with widths above 4 mm transform from flat to helical ribbons. As width decreases, the film's geometry transitions to form a more tightly wound helix. Films with 2 mm widths exhibit on average 45°/mm of twist, while 5 mm width exhibit 30°/mm (FIG. 4f). This behavior qualitatively mimics results seen in twisted nematic LCEs. Along with films, additive manufacturing enables 3D structures that cannot be fabricated with using alignment cells or mechanical loading.

Highly porous, thick LCEs with locally controlled molecular orientation can be fabricated by direct-write printing. For example, a 10 mm×10 mm×5 mm, porous object with 16 printed layers was fabricated in accordance with the method 100 (FIG. 4g). Each layer was oriented at 90° to the underlying layer, and the overall structure exhibits a relative fill density of 25%. In this thick structure, bending is suppressed and the deformation in the X-Y plane is isotropic. The pores undergo a 45% contraction in area, leading to an in-plane isotropic contraction and an expansion in thickness on heating (FIG. 4h). The contraction in-plane is greater than the increase in thickness, causing the structure to exhibit a 36% volumetric contraction (FIG. 4i). It should be noted that the intrinsic deformation of the LCE is isochoric and that this observed volumetric contraction is a structural effect enabled by direct-write printing.

Figure 5B:
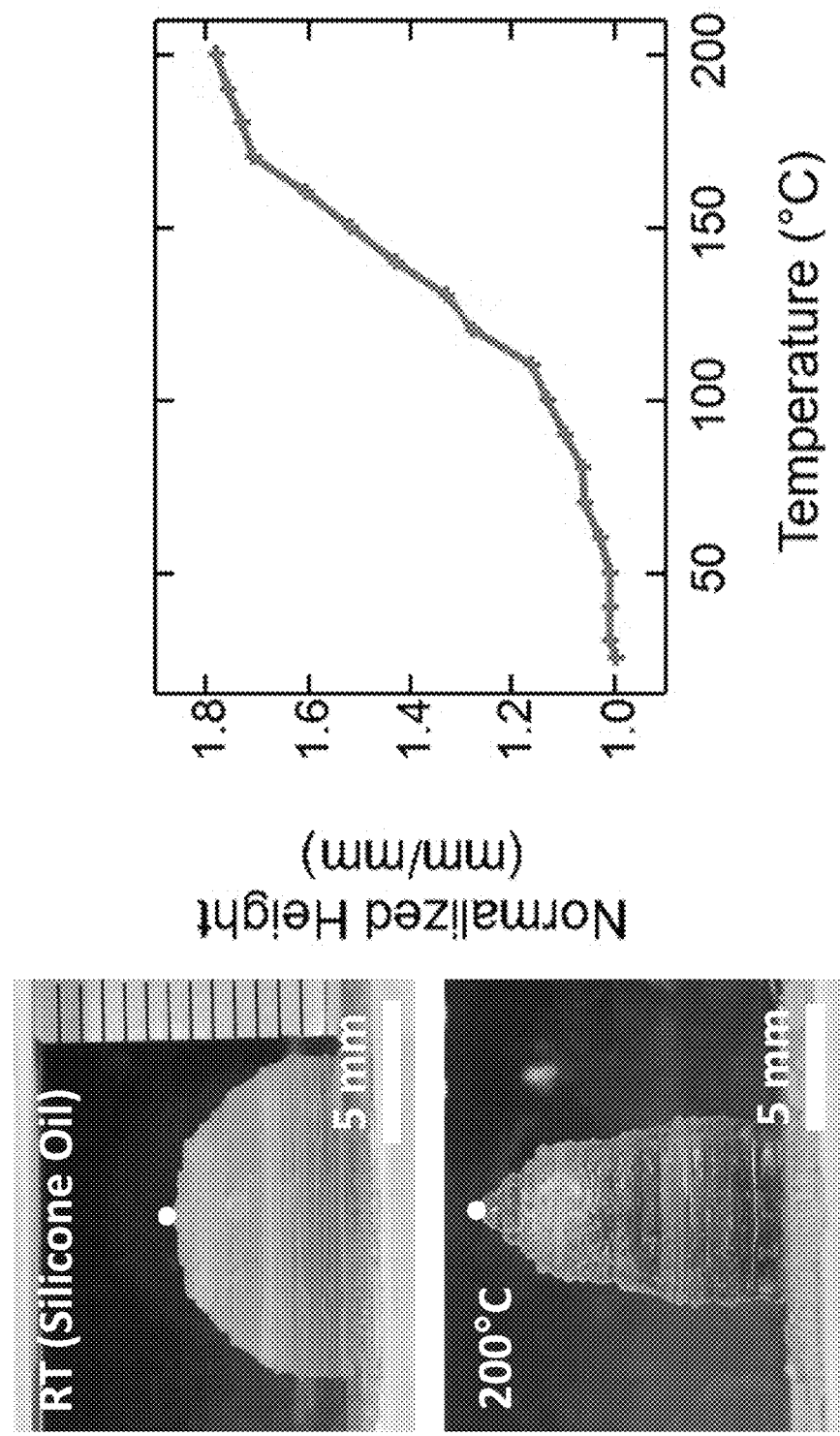
Figure 5C:
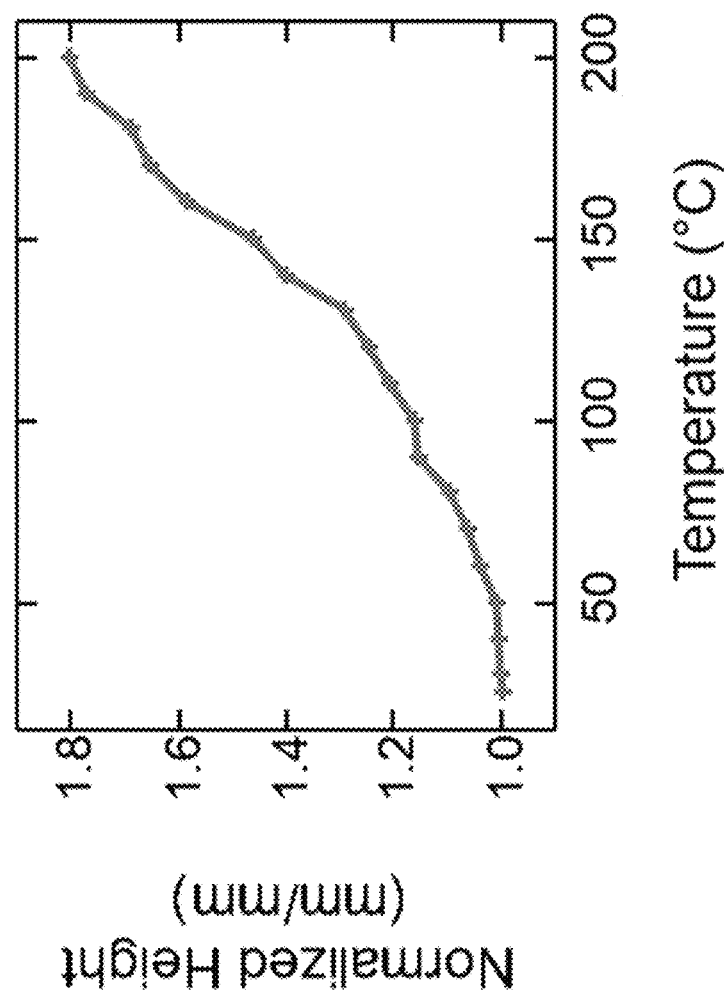
Figure 5C:
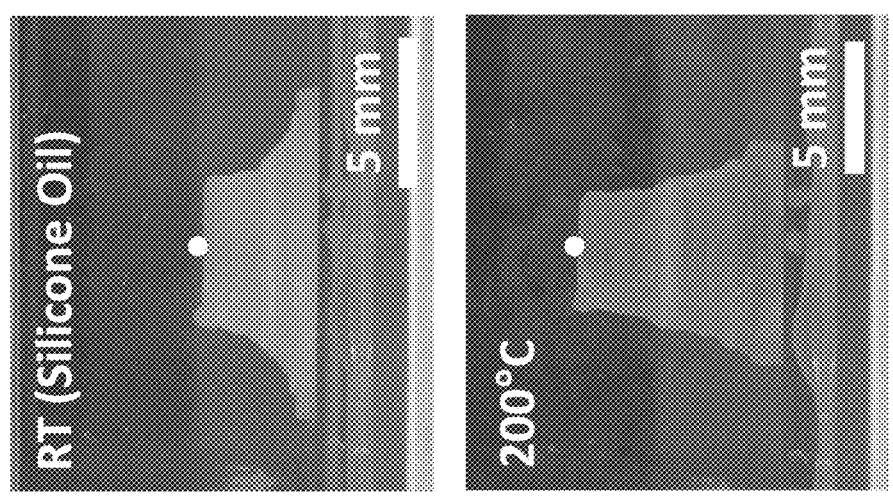

Local molecular orientation can also be programmed to produce 3D curved extrusion printed objects. For example the method 100 was used to print hollow cylinders 10 mm in diameter and 4 mm tall. The cylinder was printed with an azimuthal print path (FIG. 5a). As predicted by Modes et al.[P1-35], azimuthally-aligned LCE cylinders contract radially and expand axially (FIG. 7). Varying the wall thickness of the cylinder allows the degree of azimuthal contraction to be tuned with thinner-walled cylinders producing larger degrees of contraction up to 30% (FIG. 5a). Along with extrusion printing LCE objects with zero Gaussian curvature, LCEs with positive or negative Gaussian curvature were extrusion printed in accordance with the method 100. To our knowledge, LCEs with this combination of alignment and geometry are impossible to fabricate using previous methods. For example, a hollow LCE hemisphere programmed with a +1 defect pattern can be fabricated layer by layer (FIG. 5b). Following theoretical predictions of spherical shells imposed with +1 defect patterning, the dome experiences an azimuthal contraction and expansion in the axes orthogonal to the contraction[P1-35], morphing into a "peaked" hemisphere. The "peaked" portion of the dome is a resulting deformation of the object and a retention of the existing positive Gaussian curvature. This deformation results in a doubling of height of the hemisphere. LCE structures with negative Gaussian curvatures can be printed with the same topological pattern of molecular alignment (FIG. 5c). In response to thermal stimulus, the negative Gaussian curvature LCE also maintains its curvature while undergoing azimuthal contraction and orthogonal expansion.

Figure 6B:
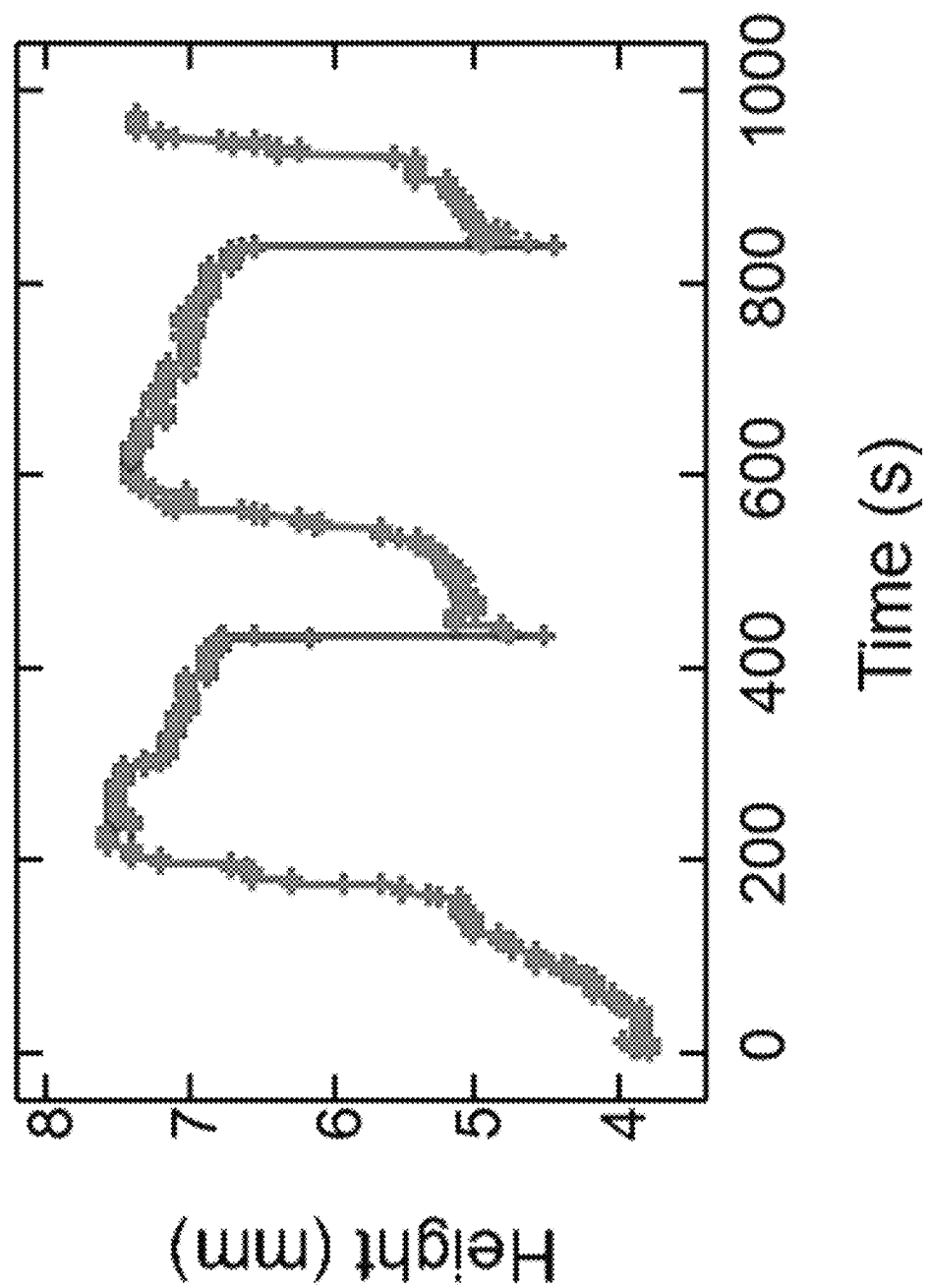
Figure 6C:
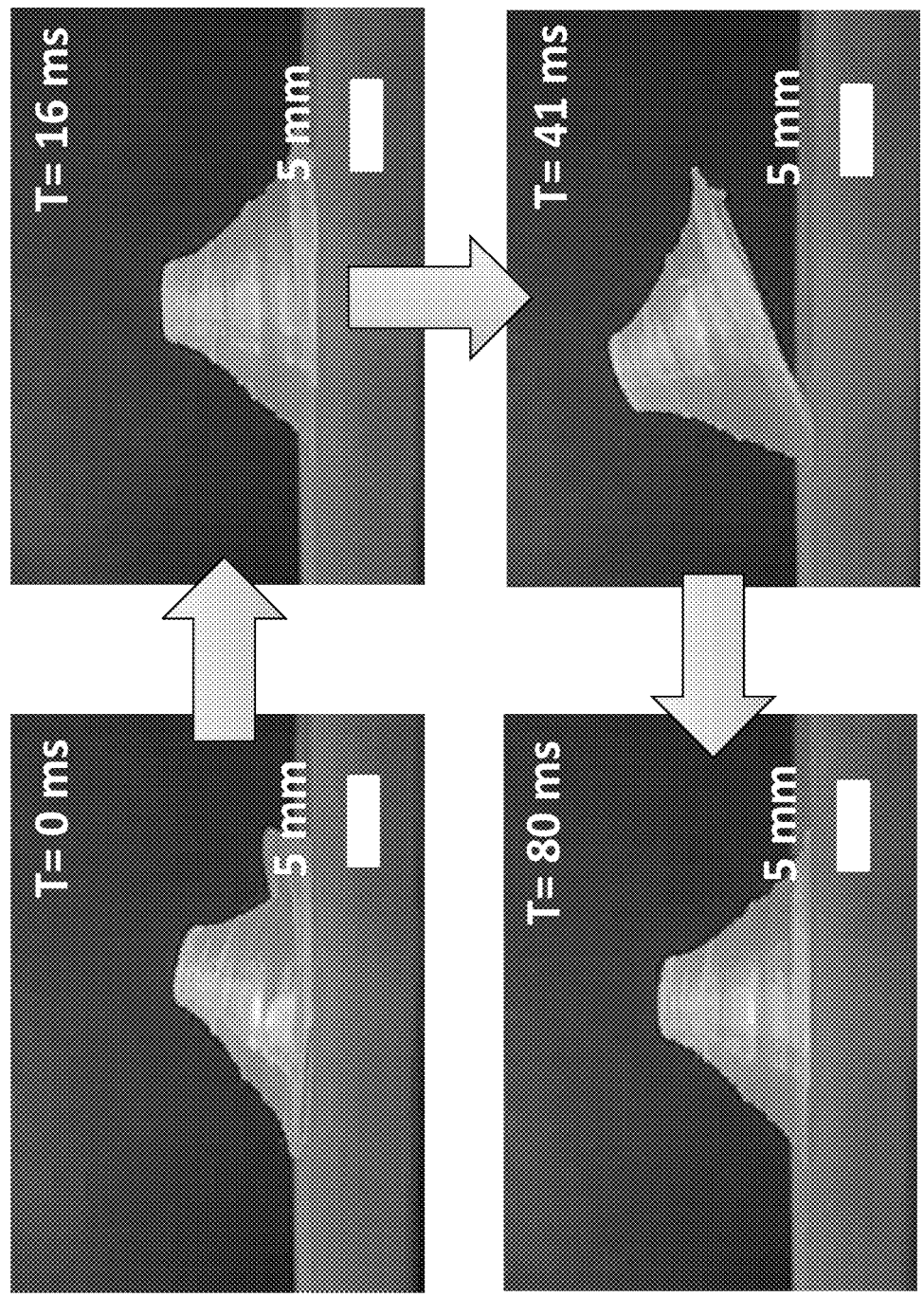
Figure 6D:
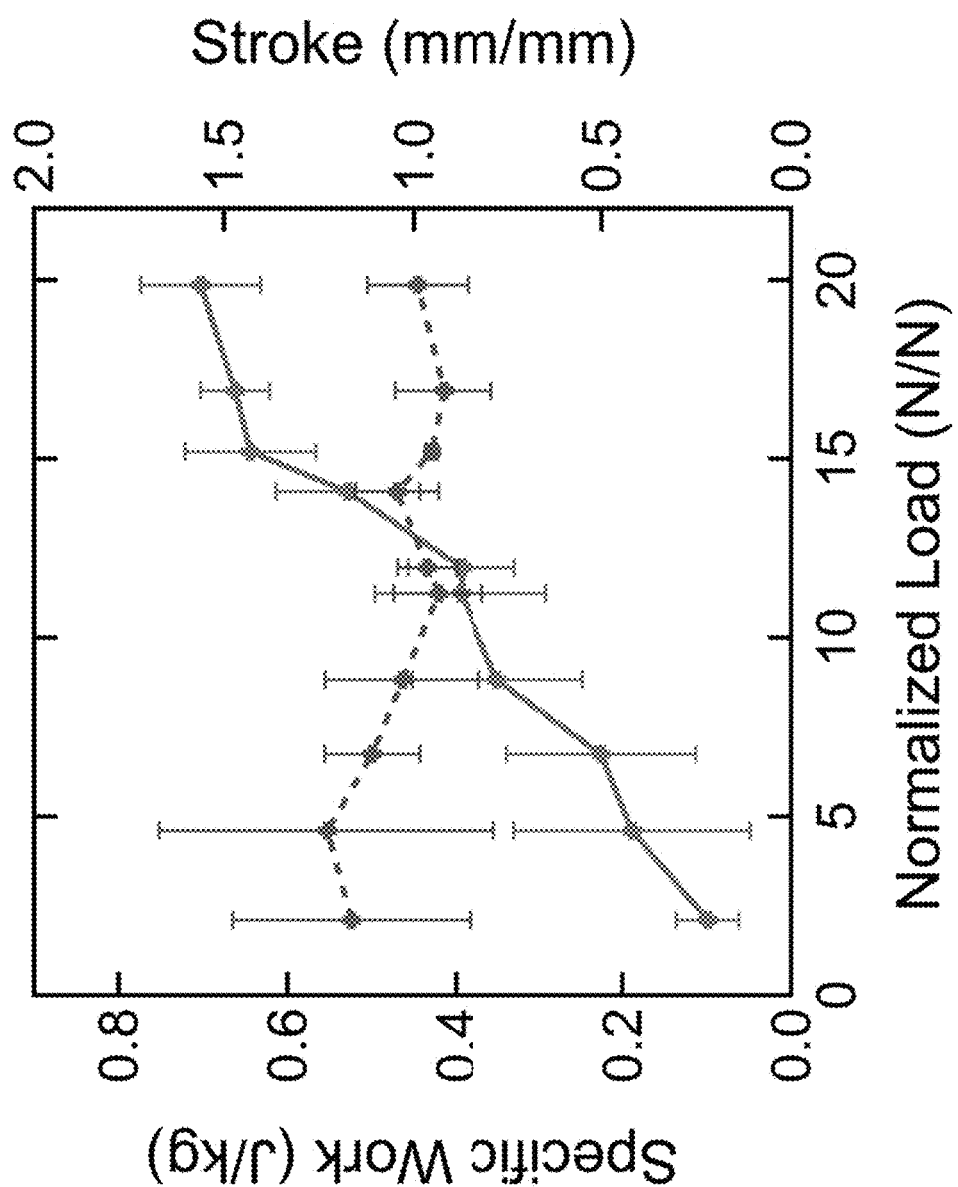

Extrusion printing LCE objects containing regions of opposing Gaussian curvatures with the same +1 topological alignment patterns can induce reversible and rapid deformations. We Extrusion printed objects that exhibit a snap-through transition by printing a modified hemi-toroidal shell. This geometry contains a region of positive Gaussian curvature that is oriented oppositely to a region of negative Gaussian curvature (FIG. 6a). When placed on a heated surface, the structure approaches an elastic instability at the region of oppositely oriented regions of Gaussian curvature. When enough energy is stored to overcome the instability, a snap-through actuation occurs releasing the energy and resulting in the reorientation of the positive Gaussian curvature portion of the structure (FIG. 6a). This reorientation of curvatures is reminiscent of 'toy poppers', but notably, occurs without requiring an externally applied mechanical deformation. Snap-through actuation can be induced by fabrication of unique geometries[P1-36-39]. A characteristic of an extrusion-printed LCE object, is that the object is capable of reversible shape change into its original geometry on cooling (FIG. 6b & FIG. 8). This snapping event can be asymmetric. As the LCE object undergoes the transition from partially inverted to fully inverted over ~16 ms, the entire structure is lifted airborne for ~64 ms before landing (FIG. 6c). This snap-through actuation is capable of lifting external loads and therefore performing useful work. At low external loads, the LCE object can catapult the loaded mass (FIG. 9). Under moderate loads from 2 N/N to 20 N/N (when normalized to the weight of the actuator), the opposing Gaussian curved-containing object exhibits a roughly constant stroke of 1 mm/mm (FIG. 6d). As such, specific work done by the structure in a range from about 0.1 to 0.7 J/kg in a continuous manner as load increases (FIG. 6d). During the snapping transition, a peak power of 15.5 W/kg is exhibited at a normalized load 5 times heavier than the actuator. Under loads greater than 40 times the mass of the actuator, the snap-through actuation is no longer observed (FIG. 10). This snap-through actuation behavior arises from the unique combination of complex shape change in Gaussian curved structures enabled by direct-write printing of LCEs.

Some embodiments of the opposing Gaussian curved-containing object are capable of reversible snap-through actuation when exposed to temperatures above and below its $T_{NI}$. As the extrusion printed object is exposed to heating conditions (T=180° C. via a hot plate), the object undergoes an inversion of the positive Gaussian curvature asymmetric snapping on one end of the structure and then exhibits a second, stronger snap-through transition seconds later. Upon cooling, or turning the hot plate off, the object snaps back into its original geometry demonstrating capability of reversible snap-through actuations.

Some embodiments of the opposing Gaussian curved-containing object are capable of producing enough work to throw a mass (~500 mg) over a certain distance. Masses with very low loads can not only be lifted, but thrown off the structure as it goes through its snap-through transition. The source of heat was a heat lamp with approximate temperature of 170° C.

Materials: The liquid crystal monomer, 1,4-bis-[4-(6-acryloyloxhexyloxy)benzoyloxy]-2-methylbenzene (RM82), was purchased from Synthon Chemicals. The n-butylamine, which serves as a chain extender, was purchased from Sigma Aldrich. Photoinitiator, Irgacure I-369, was donated from BASF Corporation.

Synthesis of Liquid Crystal Ink: The LC oligomer ink is prepared by mixing 1.1:1 molar ratio of RM82 and n-butylamine with 1.5 wt % of photoinitiator, I-369, in a glass vial. Heat and vortex are applied to the monomeric precursors until a homogeneous, LC monomer solution is created. The LC solution is transferred into the print tube to oligomerize for 12 h at 75° C. for printing.

Ink Rheology: The rheological behavior of the LC oligomer ink was characterized using a Discovery HR-3 Hybrid Rheometer (TA Instruments, New Castle, Del.) with a 40 mm, 2.029° cone plate geometry. All rheological experiments are tested at a gap of 900 μm at three temperatures, 65° C., 85° C., and 115° C. Before each test, the LC ink was allowed allow to thermally equilibrate for 5 minutes. Flow tests were conducted through logarithmic sweeps of shear rates from 0.1 to 100 $s^{-1}$. Oscillation sweep tests were conducted at a fixed frequency of 1 Hz and a sweep stress from 0.1 to 100 Pa.

3D Printing: The oligomerized LC within the print tube was loaded into the KCD-15 Extruder print head (Hyrel 3D, Norcross, Ga.), an attachment of the System 30M 3D printer (Hyrel 3D, Norcross, Ga.). The print head is then heated to printing temperature 85° C. and equilibrated for 30 min. G-code directs the print path of each layer to create the desired structure. The LCE structure is printed onto glass slides at printing speeds of 1.5 m·$s^{-1}$ and initially cross-linked under 365 nm LEDs with a 10% duty cycle of 3 W power during the fabrication process. The 3D printed LCE is then post-cured under 365 nm UV lamp with 250 mW/$cm^2$ intensity to cross-link remaining acrylate groups.

Mechanical Characterization: Static tensile testing of 3D printed rectangular samples was conducted at room temperature using a RSA-G2 Dynamic Analyzer (TA Instruments, New Castle, Del.). Samples were printed in 15 mm×5 mm×1 mm. The sample was then loaded in a uniaxial direction with a deformation rate of 1 mm/min until failure. Structures with regions of opposing Gaussian curvature were compressed to 25% strain between two fixed platens at a deformation rate of 6 mm/min at either 140 C or 165 C.

Actuation Characterization: Thermal actuation was characterized by image analysis (ImageJ) of the printed LCE structures from room temperature to 160 or 200° C. Each structure was immersed in a silicone oil bath on a hot plate. The hot place was allowed to reach the desired temperature, equilibrate for 5 minutes, and then the sample was photographed for image analysis. The snap-through actuation occurs in the presence of thermal gradient by placing the structure of opposed Gaussian curvature directly on a hot plate. Reported values represent an average of at least three samples. It is to be noted that the LCE structures undergo oxidation if left at high temperatures for long periods of time.

Microscopy: Polarized optical micrographs were taken with an Olympus BX51 microscope with Olympus UC color camera attachment. Scanning electron micrographs were acquired using Zeiss SUPRA 40 SEM on gold sputtered samples.

Image/Video analysis: Macroscopic images and videos were taken at 60 fps Nikon DSLR camera or at 240 fps using Apple iPhone 6. Dimensional changes of the printed LCE structures were measured in ImageJ.

Specific Work/Stroke Characterization: Specific work and stroke of the opposing Gaussian curvature were determined through image analysis of the pre-snap and post-snap actuation geometries imposed by heating past 150° C. Specific work was determined by multiplying the displacement of the center of mass of the external load by the weight of the external load. Stroke is calculated by measuring the displacement of the top of the LCE structure. Reported values represent an average of three samples.

REFERENCES p1-1. Ge, Q. et al. Multimaterial 4D Printing with Tailorable Shape Memory Polymers. Sci. Rep. 6, 31110 (2016).

p1-2. Mao, Y. et al. 3D printed reversible shape changing components with stimuli responsive materials. Sci. Rep. 6, (2016).

p1-3. Sydney Gladman, A., Matsumoto, E. A., Nuzzo, R. G., Mahadevan, L. & Lewis, J. A. Biomimetic 4D printing. Nat. Mater. 15, 413-8 (2016).

p1-4. Patel, D. K. et al. Highly Stretchable and UV Curable Elastomers for Digital Light Processing Based 3D Printing. Adv. Mater. 29, (2017).

p1-5. Rossiter, J., Walters, P. & Stoimenov, B. Printing 3D dielectric elastomer actuators for soft robotics. in SPIE Smart Structures and Materials+ Nondestructive Evaluation and Health Monitoring 72870H-72870H (International Society for Optics and Photonics, 2009).

p1-6. Felton, S., Tolley, M., Demaine, E., Rus, D. & Wood, R. A method for building self-folding machines. Science (80-.). 345, 644-646 (2014).

p1-7. Morrison, R. J. et al. Mitigation of tracheobronchomalacia with 3D-printed personalized medical devices in pediatric patients. Sci. Transl. Med. 7, 285ra64-285ra64 (2015).

p1-8. Villar, G., Graham, A. D. & Bayley, H. A tissue-like printed material. Science (80-.). 340,48-52 (2013).

p1-9. Zarek, M., Mansour, N., Shapira, S. & Cohn, D. 4D Printing of Shape Memory-Based Personalized Endoluminal Medical Devices. Macromol. Rapid Commun. (2016).

p1-10. Ge, Q., Dunn, C. K., Qi, H. J. & Dunn, M. L. Active origami by 4D printing. Smart Mater. Struct. 23, 94007 (2014).

p1-11. Rodriguez, J. N. et al. Shape-morphing composites with designed micro-architectures. Sci. Rep. 6, (2016).

p1-12. Yu, K., Ritchie, A., Mao, Y., Dunn, M. L. & Qi, H. J. Controlled sequential shape changing components by 3D printing of shape memory polymer multimaterials. Procedia IUTAM 12, 193-203 (2015).

p1-13. Huang, L. et al. Ultrafast Digital Printing toward 4D Shape Changing Materials. Adv. Mater. (2016).

p1-14. Compton, B. G. & Lewis, J. A. 3D-printing of lightweight cellular composites. Adv. Mater. 26, 5930-5935 (2014).

p1-15. Morales, D., Bharti, B., Dickey, M. D. & Velev, O. D. Bending of Responsive Hydrogel Sheets Guided by Field-Assembled Microparticle Endoskeleton Structures. Small 12,2283-2290 (2016).

p1-16. Raviv, D. et al. Active printed materials for complex self-evolving deformations. Sci. Rep. 4, 7422 (2014).

p1-17. Wermter, H. & Finkelmann, H. Liquid crystalline elastomers as artificial muscles. e-Polymers 1, 111-123 (2001).

p1-18. Pei, Z. et al. Mouldable liquid-crystalline elastomer actuators with exchangeable covalent bonds. Nat. Mater. 13, 36-41 (2014).

p1-19. Yakacki, C. M. et al. Tailorable and programmable liquid-crystalline elastomers using a two-stage thiol-acrylate reaction. RSC Adv. 5, 18997-19001 (2015).

p1-20. Tajbakhsh, A. R. & Terentjev, E. M. Spontaneous thermal expansion of nematic elastomers. Eur. Phys. J. E 6, 181-188(2001).

p1-21. de Haan, L. T., Sinchez-Somolinos, C., Bastiaansen, C. M. W., Schenning, A. P. H. J. & Broer, D. J. Engineering of complex order and the macroscopic deformation of liquid crystal polymer networks. Angew. Chemie Int. Ed. 51, 12469-12472 (2012).

p1-22. Liu, D. & Broer, D. J. Liquid crystal polymer networks: preparation, properties, and applications of films with patterned molecular alignment. Langmuir 30, 13499-13509 (2014).

p1-23. Ware, T. H., Perry, Z. P., Middleton, C. M., Iacono, S. T. & White, T. J. Programmable Liquid Crystal Elastomers Prepared by Thiol-Ene Photopolymerization. ACS Macro Lett. 4, 942-946 (2015).

p1-24. Taylor, J. E., Romo-Uribe, A. & Libera, M. R. Bimodal orientation defects in main-chain thermotropic liquid crystalline polymer fibers. Macromolecules 35, 1751-1756 (2002).

p1-25. Krause, S., Dersch, R., Wendorff, J. H. & Finkelmann, H. Photocrosslinkable Liquid Crystal Main-Chain Polymers: Thin Films and Electrospinning. Macromol. Rapid Commun. 28, 2062-2068 (2007).

p1-26. Naciri, J. et al. Nematic elastomer fiber actuator. Macromolecules 36, 8499-8505 (2003).

p1-27. Ohm, C., Serra, C. & Zentel, R. A Continuous Flow Synthesis of Micrometer-Sized Actuators from Liquid Crystalline Elastomers. Adv. Mater. 21, 4859-4862 (2009).

p1-28. Ware, T. H., McConney, M. E., Wie, J. J., Tondiglia, V. P. & White, T. J. Voxelated liquid crystal elastomers. Science (80-.). 347, 982-984 (2015).

p1-29. Brostow, W., Sterzynski, T. & Triouleyre, S. Rheological properties and morphology of binary blends of a longitudinal polymer liquid crystal with engineering polymers. Polymer (Guildf). 37, 1561-1574 (1996).

p1-30. Wissbrun, K. F. & Griffin, A. C. Rheology of a thermotropic polyester in the nematic and isotropic states. J. Polym. Sci. Polym. Phys. Ed. 20, 1835-1845 (1982).

p1-31. Bladon, P., Terentjev, E. M. & Warner, M. Transitions and instabilities in liquid crystal elastomers. Phys. Rev. E 47, R3838 (1993).

p1-32. Ware, T. H., Biggins, J. S., Shick, A. F., Warner, M. & White, T. J. Localized soft elasticity in liquid crystal elastomers. Nat. Commun. 7, 10781 (2016).

p1-33. Modes, C. D., Bhattacharya, K. & Warner, M. Gaussian curvature from flat elastica sheets. in Proceedings of the Royal Society of London A: Mathematical, Physical and Engineering Sciences 467, 1121-1140 (The Royal Society, 2011).

p1-34. Sawa, Y. et al. Shape selection of twist-nematic-elastomer ribbons. Proc. Natl. Acad. Sci. 108, 6364-6368 (2011).

p1-35. Modes, C. D. & Warner, M. Responsive nematic solid shells: Topology, compatibility, and shape. EPL (Europhysics Lett. 97, 36007 (2012).

p1-36. Bende, N. P. et al. Geometrically controlled snapping transitions in shells with curved creases. Proc. Natl. Acad. Sci. 112, 11175-11180 (2015).

p1-37. Shankar, M. R. et al. Contactless, photoinitiated snap-through in azobenzene-functionalized polymers. Proc. Natl. Acad. Sci. 110, 18792-18797 (2013).

p1-38. Lee, H., Xia, C. & Fang, N. X. First jump of microgel; actuation speed enhancement by elastic instability. Soft Matter 6, 4342-4345 (2010).

p1-39. Keplinger, C., Li, T., Baumgartner, R., Suo, Z. & Bauer, S. Harnessing snap-through instability in soft dielectrics to achieve giant voltage-triggered deformation. Soft Matter 8, 285-288 (2012).

Experimental Results 2

We employ the use of a two-stage, one-pot thiol-acrylate/thiol-ene "click" reaction to formulate materials with controllable thermomechanical proprieties and processability. Through controlling the phase transition temperature of polymerizable LC inks and the crosslinking strategy, morphing 3D structures with tunable actuation temperature are fabricated, ranging from 12±2° C. to 54±1° C. Finally, we 3D print multiple LC inks in one structure to allow for the production of 3D objects that sequentially and reversible undergo multiple shape changes on heating.

We use a two-step thiol-ene reaction scheme. We first formulate main-chain, nematic inks via the self-limiting thiol-acrylate Michael addition between a nematic diacrylate and an isotropic dithiol. By controlling the ratio of thiol to acrylate, thiol-terminated oligomers with tunable transition temperatures can be synthesized (FIG. 11a). Through DIW, these thiol-terminated nematic inks can be printed using DIW, and the printing process locally programs the molecular order along the direction of the print path (FIG. 11b). While printing, the ink is photocrosslinked by radical reaction of the thiol-terminated oligomers with a trifunctional vinyl crosslinker (e.g., TATATO). This synthetic approach is inspired by several prior approaches that utilize thiol-ene reactions to synthesize LCEs.[p2-35][p2-38][p2-39][p2-40] Nonetheless, this approach is distinct in that it is designed specifically to be compatible with 3D printing and in that the thiol-ene reaction is used for both chain extension and crosslinking which allows for the generation of LC inks with highly tunable physical properties.[p2-41] Taking advantage of DIW printing processes, different designs with multiple LC compositions can be fabricated, for example 3 LC inks with varying nematic to isotropic transition temperatures can be used to fabricate structures which may enable large, reversible, and sequential actuation or structures with intrinsic sensing capabilities (FIG. 11c).

The nature of the crosslinking reaction used strongly affects the shape changing behavior of the LCE. To demonstrate the effects of thiol-ene photocrosslinking compared to acrylate photocrosslinking (Experimental Results 1), we formulated two LCE systems with nearly identical chemistry and crosslink densities. One ink is composed of equimolar mixture of thiol-terminated oligomer and trifunctional vinyl crosslinker (1:1 molar ratio) and the other ink is composed of solely an acrylate-terminated oligomer, similar to what was previously reported for printable LCEs. It is important to note that we used the same mesogen (RM82) and thiol spacer (EDDT) to synthesize both oligomers. Differential scanning calorimetry (DSC) is initially used to determine LC phase transitions temperatures for both inks (FIG. 12a). The thiol-ene ink displays significantly lower nematic-to-isotropic transition ($T_{NI}$), (43±3° C.) compared to acrylate ink (72±4° C.) due to the lower overall weight fraction of mesogen within the thiol-ene ink (72.5%) as compared to the acrylate ink (80%). Below the nematic-isotropic transition temperature, a second mesophase transition is observed for both LC inks. This transition was identified as a mesophase transition as the enthalpy (0.4 J/g) and hysteresis (3° C.) of the transition are smaller than what would be expected for a transition crystallization. Similar behavior has been observed in other thiol-ene LCEs, where this transition is identified as the smectic-to-nematic transition temperature.[p2-42] The second transition temperature occurs at (3±2° C.) for thiol-ene ink and (32±2° C.) for acrylate ink. Both LC transition temperatures dictate the thermomechanical and actuation behavior of the elastomers that result from the crosslinking of the inks. We note that the rubbery modulus ($E_r$) and the glass transition temperature ($T_g$) are shown to be equal (FIG. 12b) and that both networks demonstrate high gel fraction with slightly higher gel fraction value of acrylate-based crosslinked LCE (92±2%) compared to thiol-ene-based LCE (85±4%). Both materials exhibit glass transition temperatures below 0° C. and have a second drop in modulus that is associated with the lower temperature LC transition (FIG. 12b). However, the mesophase transition temperatures are quite different for the two materials, which controls the shape changing behavior of each material. The shape change of the two LCE networks as a function of temperature is shown in FIG. 12c. After passing nematic-to-isotropic transition temperature ($T_{NI}$) on cooling, both samples elongate along the loading axis. By comparison, thiol-ene crosslinked LCEs exhibits two-fold higher actuation strain and a sharper transition compared to acrylate crosslinked LCEs. It is expected that these differences can be attributed to the highly constrained and heterogeneous nature of acrylate-crosslinked networks. On cooling below the second transition temperature, the length plateaus for both LCEs as the modulus is abruptly increased due to the increase in the polymer chain ordering and reduction in chain mobility. This higher order transition serves to provide a sharp onset for actuation (on heating), perhaps providing a way to further narrow the shape change exhibited by LCEs. This behavior is completely reversible on heating.

Control of LCE properties such as transition temperatures and actuation strain can be achieved by varying the thiol chain extender, crosslinker, and/or mesogen concentration.[p2-40][p2-43][p2-44] We first varied the crosslinker concentration within the inks (0.1, 0.2, 0.4, 0.6 molar ratio) while maintaining EDDT as the chain extender and RM82 as the mesogen. $T_{NI}$ of the inks decreases from 53±2 to 0±1° C.

to with increased crosslinker concentration (FIG. 17a). The reduction of $T_{NI}$ is attributed to the increase in the isotropic monomers in the inks. Upon crosslinking, $T_{NI}$ of these LCEs increased by ~30° C. (Table 1). As expected, the conventional physical properties of elastomers increased with increasing crosslinker concentration. For example, the gel fraction and rubbery modulus ($E_r$) are increased from 68±2 to 94±3% and 0.7±0.20 to 2.3±0.35 Mpa, respectively (FIG. 17b,c). While there is no substantial change in $T_g$, the actuation strain increases from 60±3 to 130±4% with decreasing the amount of the crosslinker from 0.6 to 0.2 molar ratio. (FIG. 17d). A 1.2:1 thiol:acrylate molar ratio is selected for this investigation due to the formation of robust LCE networks with high actuation strains (FIG. 17).

The oligomer is synthesized via the self-limiting thiol-acrylate Michael addition between a nematic diacrylate and an isotropic dithiol with molar ratio of 0.8:1.0 (acrylate:thiol, respectively). End-group analysis by $^{13}$C Nuclear Magnetic Resonance (NMR) spectroscopy is used to determine the molecular weight of the thiol-terminated oligomers. Carbon-13 nuclear magnetic resonance ($^{13}$C) spectra were recorded in CDCl3 on a Bruker AVANCE III™ 500 spectrometer (Bruker, Billerica, Mass.) (500 MHz) at ambient temperature. The spectrum for each oligomer sample were taken using 0.40 mL of deuterated chloroform. The number of repeating units of the oligomer was determined from its $^{13}$C NMR by comparing the relative carbon peak intensity of the end group containing the thiol (—SH) group to the repeating unit of the thiol spacer (m) and the RM 82 (n). For example, to calculate the repeat units of the oligomer RM82-PDT, the peak areas of the end group —CH$_2$SH (c at 23.7 ppm), —CH$_2$S spacer (a at 31.2 ppm) and terminal —CH$_2$COO of RM (b at 35.2 ppm) were obtained from the spectrum (FIG. 18). The repeat units were obtained through the following formula:

$$m \text{ or } n = \frac{a_x/n_x}{a_{end}/n_{end}}$$

where $a_x$ is the area or intensity of the $^{13}$C NMR peak of thiol spacer or acrylate; $n_x$ is the number of repeating units of thiol spacer or acrylate; $a_{end}$ is the peak area of the —CH$_2$SH end-group; and $n_{end}$ is the number of repeating units of —CH$_2$SH end-group.

The molecular weights of the example thiol-terminated oligomers are summarized in Table 1.

TABLE 1

Summary of the molecular weight of the thiol-terminated oligomers

| Oligomer | Molecular Weight (g/mol) |
|---|---|
| PDT-based | 5956 |
| EDDT-based | 4026 |
| GDMP-based | 4336 |

Varying the spacing between the mesogens can be used to tune the transition temperature of the LCE.[p2-42] The phase behavior of three representative inks is shown in FIG. 13a. By increasing the molecular weight of thiol spacer, $T_{NI}$ decreases from 81±8 to 41±2° C. The reduction of $T_{NI}$ is attributed to the declining mesogen concentration in the LC ink. It is important to note, the LC ink compositions are fully miscible and no phase separation is observed. Each of these inks can be printed using DIW, where the material extrusion simultaneously deposits and aligns the LC ink. The form and alignment is then trapped by photocrosslinking of the thiol-ene ink using UV LEDs on the print head. To ensure molecular alignment results from the extrusion process, each ink is processed via DIW in the nematic phase (~$T_{NI}$–20° C.). The ink compositions are designed to have low Tg (~45° C.), $T_{NI}$ above room temperature, and no crystallization behavior to ensure printability. EDDT and GDMP-based inks have a relatively low $T_{NI}$ (41±2° C.); therefore, room temperature is chosen for printing. The PDT-based ink is processed at 60° C. because it has higher $T_{NI}$ (81±6° C.). The rheological behaviors of the inks are tested at their printing temperature (FIG. 13b). The three inks behave as viscous liquids capable of being extruded during the printing process and exhibit shear thinning between ~5 to 60 s$^{-1}$. The viscosity of PDT-based ink is one order of magnitude lower than the viscosities of EDDT and GDMP-based inks, due to testing at an elevated temperature (60° C.). However, all of the LC inks show shear thinning properties associated with alignment of the mesogens in the nematic phase.[p2-45] After printing, the filaments are crosslinked via UV to permanently lock the alignment and form into elastomeric networks. When printed into a rectangular bar, with uniaxial alignment, each of the materials undergoes reversible actuation strain along the primary print direction under no bias stress. The magnitude of the actuation varies slightly depending on the thiol chain extender used, ranging from 1.55 mm/mm to 1.78 mm/mm for GDMP and PDT-based LCE, respectively. Here we quantify actuation by the length of the LCE at room temperature normalized to the length of the LCE above all observed thermal transitions. However, the temperature at which this shape change occurs is distinct for each material (FIG. 13d). The actuation temperature can be defined as the temperature that corresponds to the onset of the actuation strain on cooling and ranges from ~ 35±1° C. (EDDT-based LCE) to 54±2° C. (PDT-based LCE). It should be noted, the magnitude of the actuation strain for PDT-based LCE is twofold greater than previously reported 3D LCE actuators in the absence of external load.[p2-32]

Figure 14A:
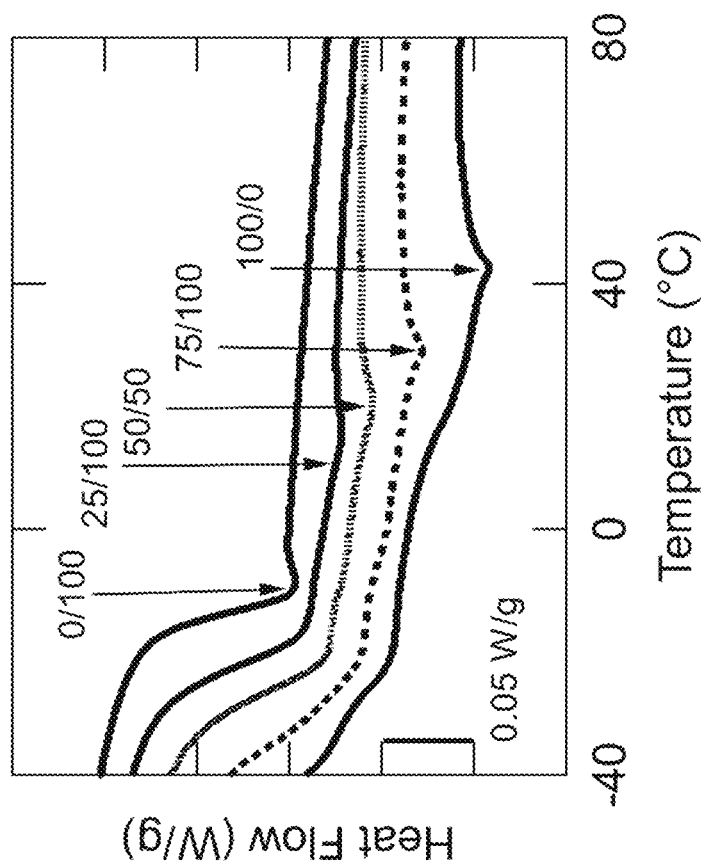
Figure 14B:
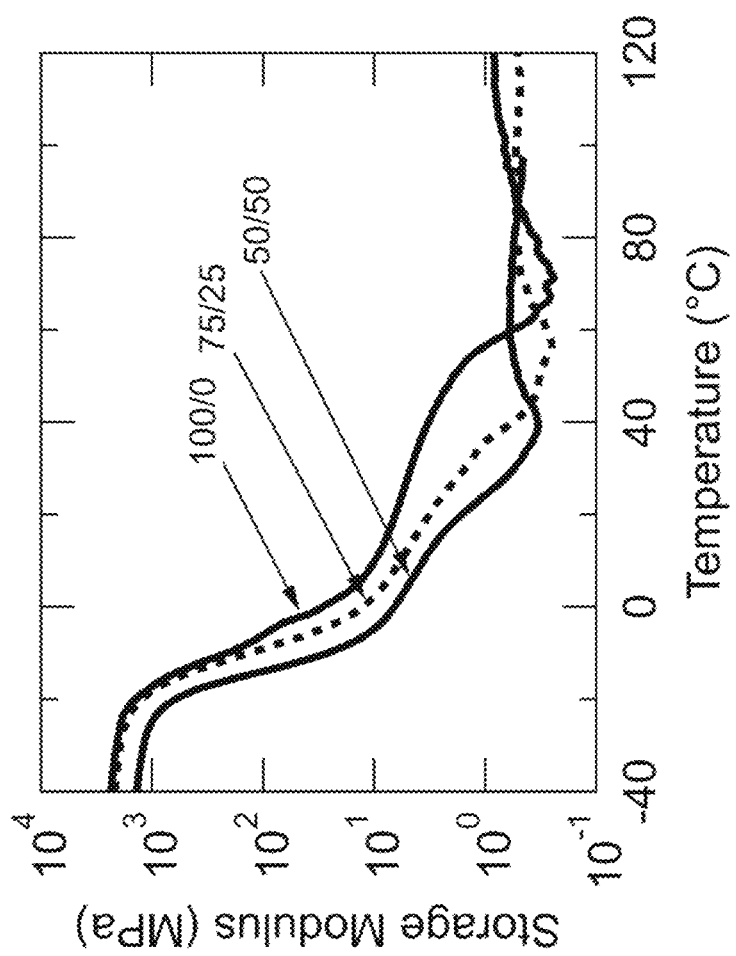
Figure 14C:
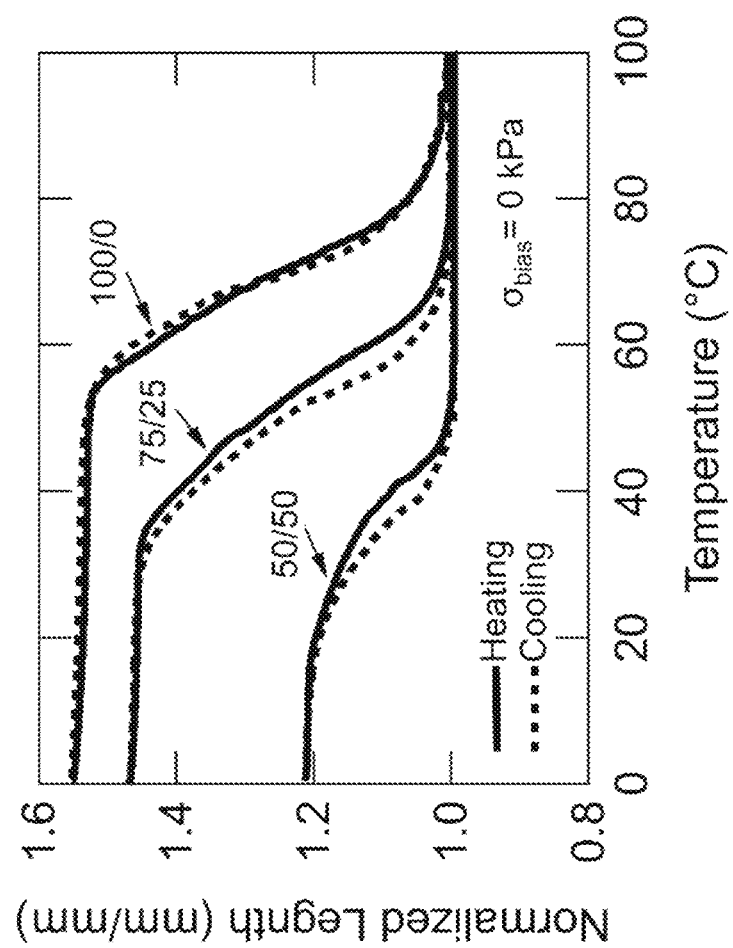
Figure 14D:
Figure 14D:
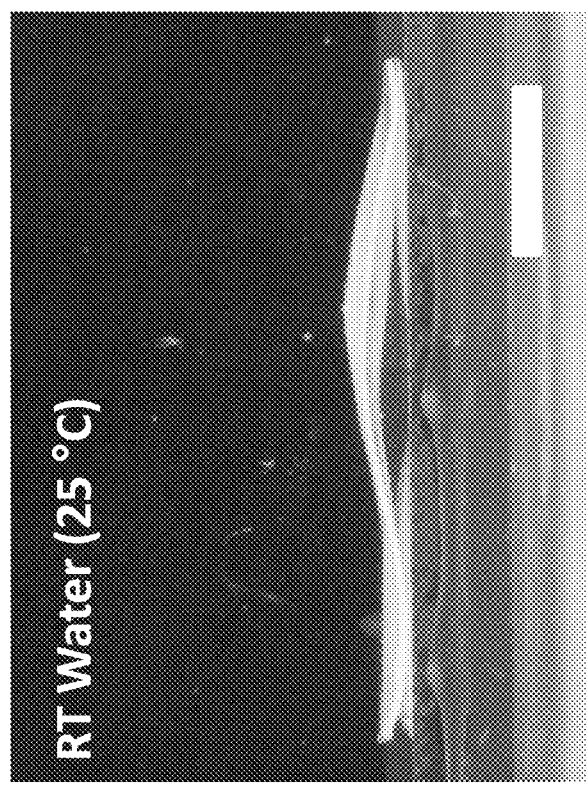

The actuation of the printable LCE can be further tuned by selecting the mesogenic monomer that is used to formulate the ink. Herein, we formulate four reactive LC inks by varying the weight ratio of two mesogens (RM82 and RM257) while keeping the same spacer (GDMP). $T_{NI}$ of the ink compositions decreases (41±2, 29±1, 17±2, 12±3° C.) with decreasing the weight ratio of RM82 to Rm257 (100-0, 75-25, 50-50, 25-75 wt %). In case of replacing all of RM82 in the system with Rm257, the ink (0-100) becomes an isotropic liquid (FIG. 14a). RM257 has a lower molecular weight compared to RM82, and as a result inks with RM257 have a larger weight fraction of isotropic monomers. These compositions exhibit largely Newtonian behavior over low to moderate shear rates, but exhibit shear thinning when approaching higher shear rates normally associated with DIW printing.[p2-47] Overall, an increasing trend in viscosity is exhibited as more RM257 is incorporated into the sample. In other words, at room temperature, isotropic ink compositions exhibit significantly higher viscosity compared to nematic ink compositions (FIG. 19). It is critical that the extrusion of the LC inks must occur in the nematic phase to enable alignment of the ink during printing. Printing isotropic ink at room temperature results in polydomain LCEs with no controlled molecular alignment. Therefore, we only utilize inks that exhibit nematic phases above room temperature. For example, GDMP (100-0) and GDMP (75-25)

show a clear nematic behavior at room temperature, while GDMP (50-50), GDMP (25-75), and GDMP (0-100) exhibit isotropic phase at room temperature. We also note that the shear forces applied into GDMP (50-50) transiently increases its $T_{NI}$ (FIG. 20) during printing. FIG. 20 shows an isotropic ink of this composition becomes nematic upon applying a shear force at room temperature. Therefore, the shear forces imposed into this ink during the printing process can be used to both increase $T_{NI}$ to above room temperature and print structures with molecular alignment. Shear-induced phase transformations have been widely reported previously.[p2-48] GDMP (25-75) and GDMP (0-100) do not exhibit nematic phase at room temperature even if shear force is applied. Therefore, these compositions will not be used for further investigation. The DMA behavior of the selected nematic LCE networks GDMP (100-0), GDMP (75-25), and GDMP (50-50) is shown in (FIG. 14b). In general, the DMA behavior of these LCEs exhibits a behavior similar to the one shown in FIG. 13b. At higher temperatures (above 100° C.) all the networks exhibit the same value of the E' (~ 0.9 MPa) due to the similar amount of crosslinking in the network. The actuation performance of 3D printed films with a uniaxial alignment of these networks is shown in FIG. 14c. The actuation temperature is shown to be dictated by the amount of the RM257 in the networks. For GDMP (75-25), and GDMP (50-50), show interesting actuation behavior, where the actuation occurs over a low and narrow temperature range (20 to 45° C.). The vast majority of molecularly aligned LCEs exhibit actuation temperature above 60° C. and actuation occurs over a much broader temperature range.[p2-10] To our knowledge, this is the lowest reported actuation temperature for LCEs with alignment programmed prior to crosslinking. To demonstrate the highly responsive nature of these materials, a disk with a +1 defect pattern is printed from the GDMP (75-25) material. This disk actuates into a cone on heating to 45° C., which is readily attainable from warm tap water (FIG. 14d). Importantly, these temperatures are below the pain threshold and may even be tolerable inside the human body for short periods of time.[p2-49] We note for GDMP (50-50), the actuation strain is highly sensitive to the photo-curing after the extrusion process. Inefficient or slow curing will likely cause a loss of alignment. The intensity of the UV curing and posturing process are studied in the supporting information (FIG. 20). 3D printable LCEs that respond to the ambient temperature or near body temperature may open the door for a broad range of applications especially in the biomedical fields, smart windows, and smart clothing.

Figure 15B:
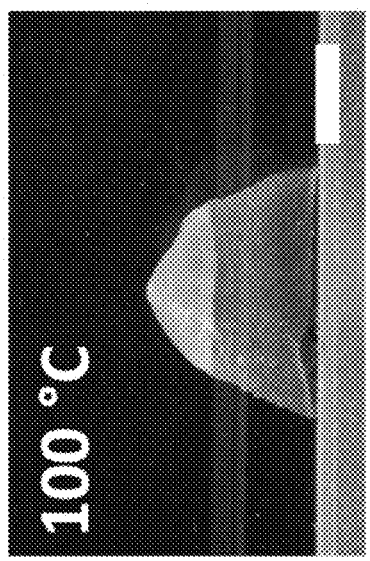
Figure 15B:
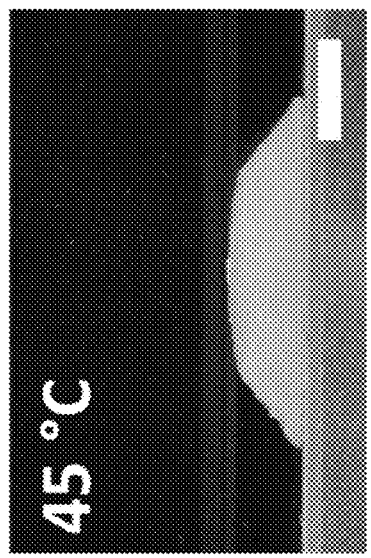
Figure 15B:
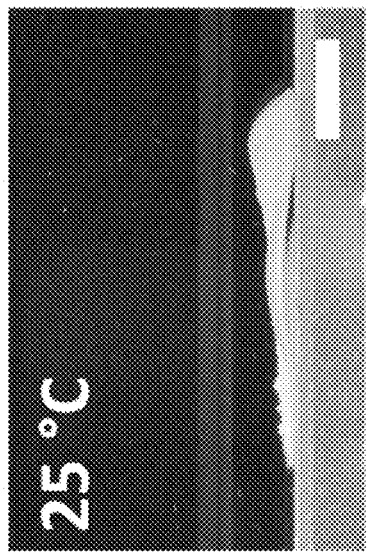
Figure 15C:
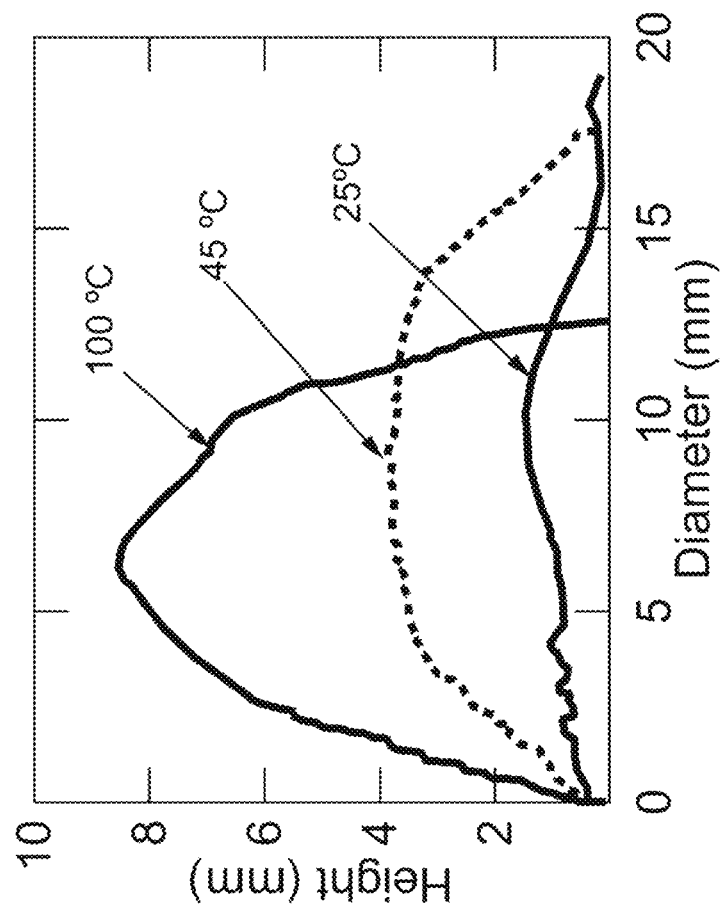
Figure 15D:
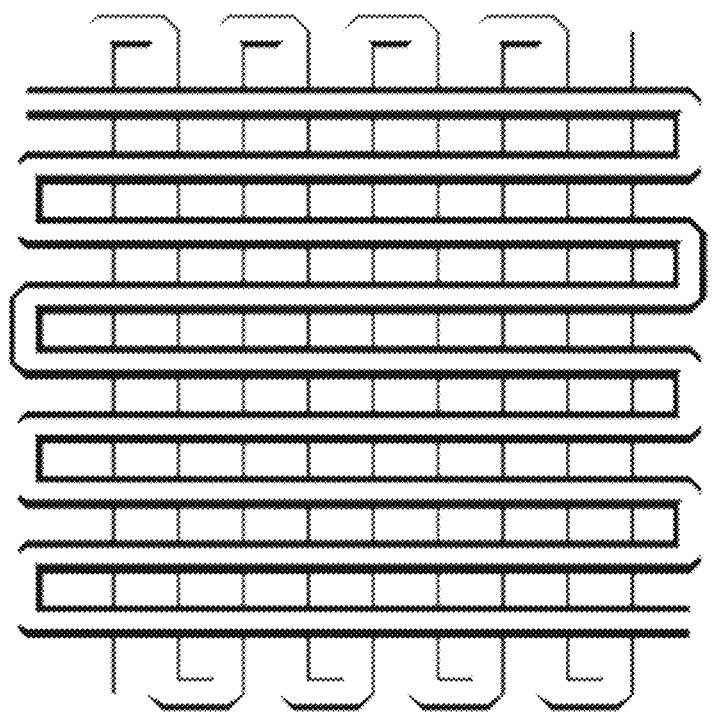
Figure 15E:
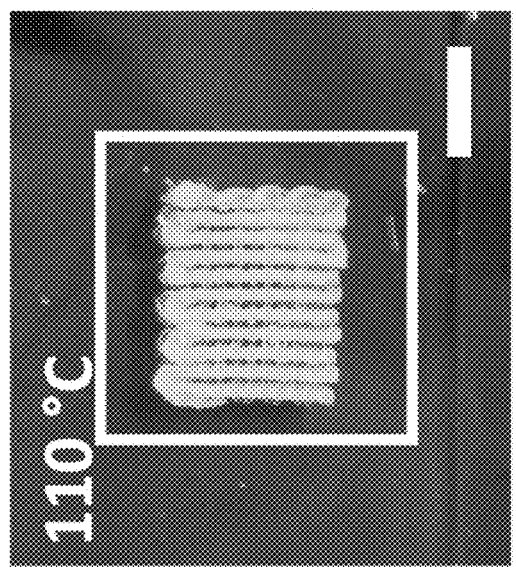
Figure 15E:
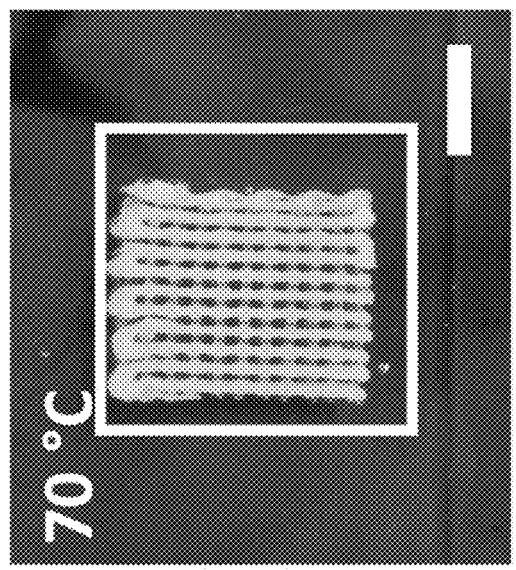
Figure 15E:
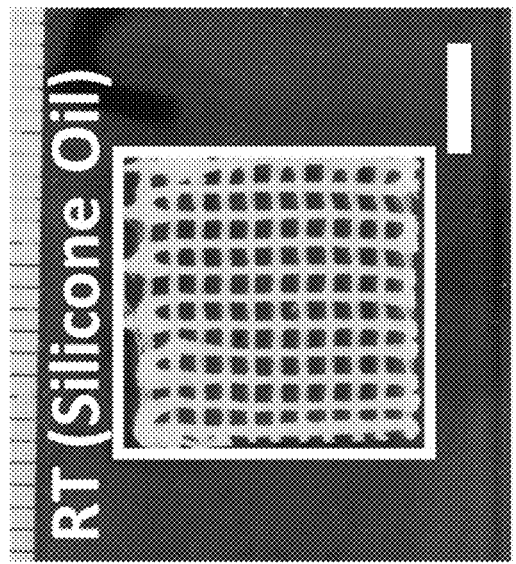
Figure 15F:
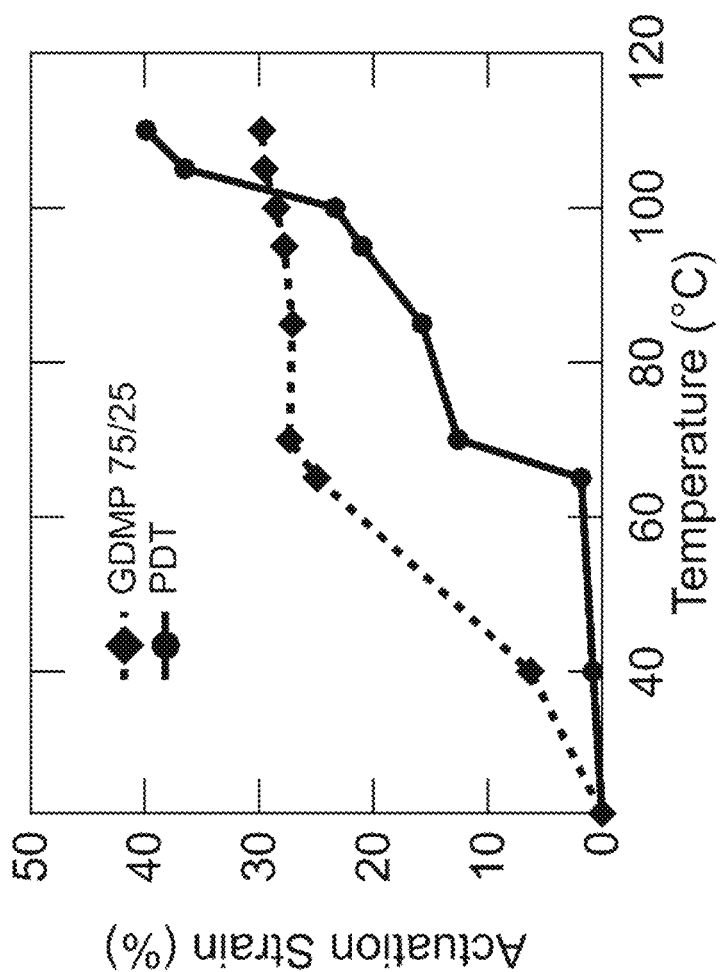

Taking advantage of DIW printing's ability to incorporate different types of materials in a 3D printed part, fabrication of LCE structures that exhibit sequential actuation upon uniform heating can be achieved. For example, a 20 mm, 1-layer LCE disk is printed with an overall +1 topological defect pattern, but with two different LC inks (FIG. 15a). The outer rim is printed with a low-temperature responsive LCE composition (GDMP 75-25), and the inner portion of the disk is printed with a high-temperature responsive LCE composition (PDT). As the disk is heated to 100° C., there is sequential actuation within the structure. At 45° C., the GDMP-LCE component forms a portion of a cone while the PDT component does not initiate actuation at this temperature (FIG. 15b). Not until over 70° C. does the PDT component respond to heat and the overall geometric cone, associated with +1 topological defect patterns, emerges (FIG. 15b). FIG. 15c exhibits quantified changes in the height profile of the disk. Upon cooling, the structure undergoes actuation in the reversed order: cone to plateaued-cone to disk geometry. Another demonstration of using multi-material printing capabilities is the printing of a 10×10 ×3 mm porous logpile structure. Each axis within the large plane of the structure is printed with a different LCE material. From the print schematic in FIG. 15d, the orange paths are printed with a PDT-based composition and the green paths correspond to prints from the GDMP 75-25-based composition. As the square is heated, the x-axis (GDMP 75-25) shrinks at low temperatures with the y-axis (PDT) staying relatively constant forming a rectangle, causing the pores to shrink anisotropically. When the temperature of the silicone oil bath exceeds the actuation temperature of the PDT component, the y-axis contracts creating an overall in-plane contraction (FIG. 15e). Instead of the geometry reaching a smaller square geometry, a final rectangular shape occurs due to the difference in maximum actuation strain of each material respectively. The PDT component exhibits a greater actuation strain compared to the GDMP 75-25 component (FIG. 15f). These sequential changes in shape are critical for creating smart structures that respond in controllable ways to environmental conditions.

Figure 16C:
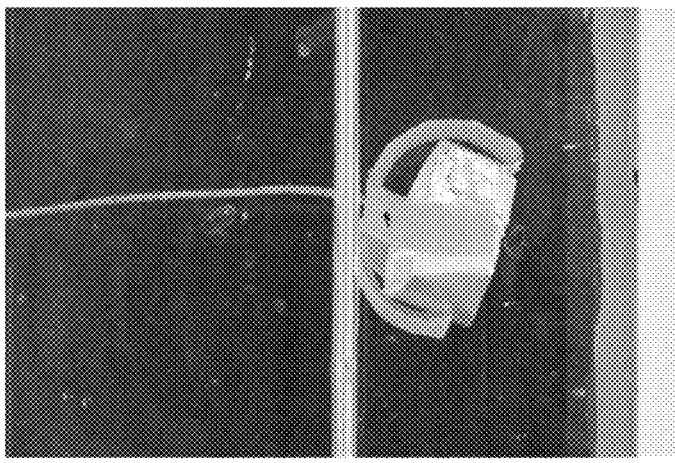
Figure 16C:
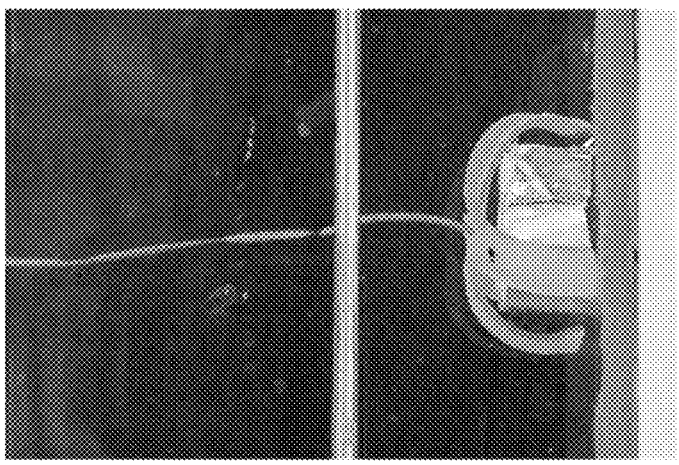
Figure 16C:
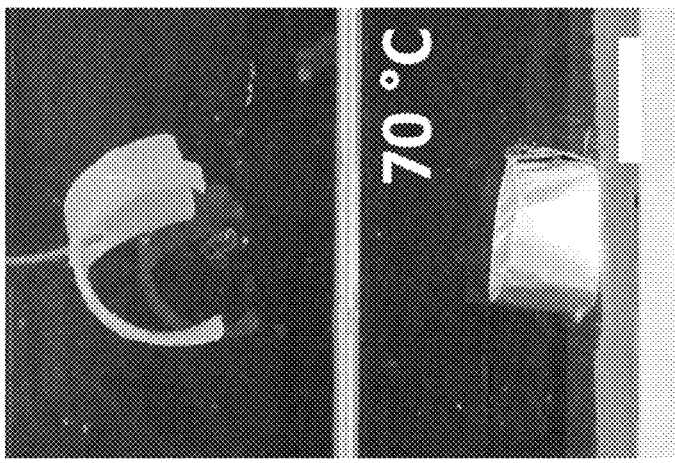
Figure 16D:
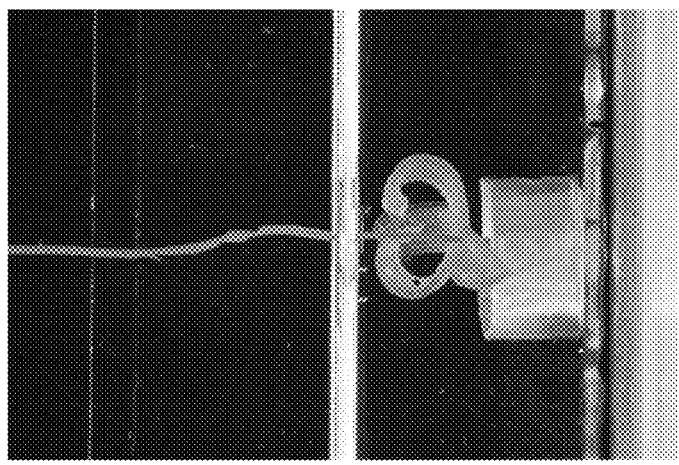
Figure 16D:
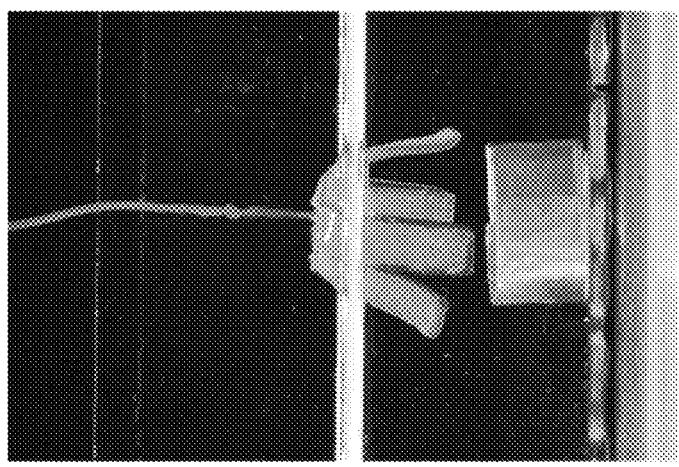
Figure 16D:
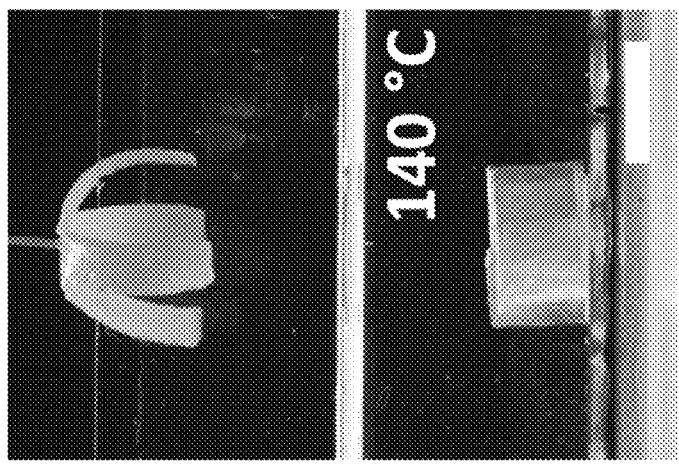

The controllable response of multi-material smart structures can also be used to embed a form of physical intelligence within an actuator. Specifically, we demonstrate how incorporating various LCE inks within one structure can be used to generate a demonstrative "sensing" gripper. The gripper is composed of a low-temperature responsive LCE (GDMP 75-25) and a high-temperature responsive LCE (PDT) (FIG. 16a). The gripper is four layers thick with GDMP-LCE on the bottom surface of the gripper ($L_1$ and $L_2$) and PDT-LCE on the top surface ($L_3$ and $L_4$) (FIG. 16b). The "sensing" aspect of the gripper stems from the combination of different LCE actuators influencing various motions within the structure. The two components of the gripper are designed to preferentially bend toward its respective side by printing "twisted nematic" configurations. When introduced to an environment above the GDMP 75-25's actuation temperature (70° C.), the gripper begins to actuate bending towards the object and leads to eventual grasping of the object (FIG. 16c). This phenomenon will only occur if the temperature is lower or on the low-end of PDT's actuation response allowing for the gripper to bend in the direction the GDMP 75/25 is printed on. At higher elevated temperatures (>PDT's actuation temperature), PDT's bending actuation toward its respective side overcomes the GDMP 75/25's actuation causing the same gripper's fingers to curl away in the opposite direction. This interaction inhibits the gripper to grasp the object at increased temperatures (140° C.) (FIG. 16d). By controlling the actuation sequence within a multi-material printed LCE structure, sensing mechanisms without the need for external wiring or computing source can be realized. Sensing accomplished by the material's inherent properties offers major implications and advances within the field of soft robotics.[p2-22]

Table 2 shows the examples of the influence of mesogen concentration, crosslinking method, crosslinker concentration, spacer molecular weight, and mesogen molecular weight on liquid crystal transition temperatures (smectic-to-nematic (TSN) and nematic-to-isotropic (TNI)) for the inks and the LCE networks: the mesogen content (wt %) is measured with respect to the total weight of all monomers compositions. The LC phase transition temperatures (TSN and TNI) for the inks are measured (DSC) at the second heating scan and defined as the minimum value of the first and the second endothermic peak, respectively. The actuation temperatures for LCE networks are characterized by the onset, midpoint, and off set (on heating) of the transition temperature of the actuation strain. The actuation strain is measured (DMA) as a function of temperature.

TABLE 2

| Reaction type (EDDT-based LCE) | Mesogen (wt. %) | Oligomer $T_{SN}$ (° C.) | Oligomer $T_{NI}$ (° C.) | LCE $T_{NI}$ onset (° C.) | LCE $T_{NI}$ midpoint (° C.) | LCE $T_{NI}$ offset (° C.) |
|---|---|---|---|---|---|---|
| Acrylate | 82 | 32 ± 3 | 82 ± 4 | 75 ± 2 | 95 ± 5 | 120 ± 10 |
| thiol-ene | 73 | 3 ± 2 | 42 ± 3 | 35 ± 1 | 65 ± 2 | 102 ± 1 |

| Crosslinker molar ratio (EDDT-based LCE) | Mesogen (wt. %) | Oligomer $T_{SN}$ (° C.) | Oligomer $T_{NI}$ (° C.) | LCE $T_{NI}$ onset (° C.) | LCE $T_{NI}$ midpoint (° C.) | LCE $T_{NI}$ offset (° C.) |
|---|---|---|---|---|---|---|
| 0.1 | 75.4 | 15 ± 4 | 53 ± 2 | N/A | N/A | N/A |
| 0.2 | 73 | 3 ± 2 | 42 ± 3 | 35 ± 1 | 65 ± 2 | 102 ± 1 |
| 0.4 | 67.5 | N/A | 18 ± 1 | 13 ± 2 | 53 ± 2 | 83 ± 1 |
| 0.6 | 63 | N/A | 0 ± 0.5 | 5 ± 1 | 38 ± 2 | 65 ± 4 |

| Network (RM82-based LCE) | Mesogen (wt. %) | Oligomer $T_{SN}$ (° C.) | Oligomer $T_{NI}$ (° C.) | LCE $T_{NI}$ onset (° C.) | LCE $T_{NI}$ midpoint (° C.) | LCE $T_{NI}$ offset (° C.) |
|---|---|---|---|---|---|---|
| PDT | 80 | 9 ± 1 | 80 ± 5 | 54 ± 1 | 105 ± 1 | 144 ± 2 |
| EDDT | 73 | 3 ± 2 | 42 ± 3 | 35 ± 1 | 65 ± 2 | 102 ± 1 |
| GDMP | 68.5 | 10 ± 1 | 41 ± 2 | 51 ± 1 | 65 ± 1 | 86 ± 1 |

| GDMP-based LCE Network with RM82/RM257 | Mesogen (wt. %) | Oligomer $T_{SN}$ (° C.) | Oligomer $T_{NI}$ (° C.) | LCE $T_{NI}$ onset (° C.) | LCE $T_{NI}$ midpoint (° C.) | LCE $T_{NI}$ offset (° C.) |
|---|---|---|---|---|---|---|
| 100 | 68.5 | 10 ± 1 | 41 ± 2 | 51 ± 1 | 65 ± 1 | 86 ± 1 |
| 75/25 | 67.5 | N/A | 29 ± 1 | 26 ± 1 | 47 ± 2 | 66 ± 2 |
| 50/50 | 66.7 | N/A | 17 ± 1 | 12 ± 2 | 28 ± 2 | 44 ± 6 |

Materials.

Liquid crystal monomers, 1,4-bis-[4-(6-acryloyloxhexyloxy)benzoyloxy]-2 methylbenzene (RM82) and 4-Bis-[4-(3-acryloyloxypropyloxy)benzoyloxy]-2-methylbenzene (RM257) were purchased from Wilshire Technologies, Inc. Thiol chain extenders, 1,3-propanedithiol (PDT) and 2,2'-(ethylenedioxy) diethanethiol (EDDT), were purchased from Sigma-Aldrich and Glycol Di(3-mercaptopropionate) (GDMP) was donated by Bruno Bock Thiochemicals. Triethylamine (TEA) was purchased from Sigma-Aldrich and used as base-catalyst. The photoinitiator, Irgacure I-369, was donated by BASF Corporation. Vinyl crosslinker, 1,3,5-Triallyl-1,3,5-triazine-2,4,6(1H,3H,5H)-trione, was purchased from Sigma-Aldrich. The radical inhibitor butylated hydroxytoluene (BHT) was purchased from Sigma-Aldrich.

Reactive Liquid Crystal Ink Preparation.

The LCEs are synthesized via a two-step method. First liquid crystal inks are synthesized via a thiol-acrylate Michael addition. Non-equimolar mixtures of LC monomers (diacrylate) and dithiols are heated to 80° C. and then mixed with a base-catalyst (1 wt % of TEA), 2 wt % of BHT, 1.5 wt % of photoinitiator and the vinyl crosslinker. This process results in thiol-terminated oligomers. The ratio of thiol, acrylate, and vinyl functional groups is kept constant in all samples. The molar ratio used is 0.8 acrylate:1 thiol:0.2 vinyl, unless otherwise noted. After mixing, the solution is transferred into the printing syringe to complete oligomerization for 3 h at 65° C., forming the liquid crystal ink.

Three-Dimensional (3D) Printing.

The liquid crystal ink within the printing syringe is then loaded into a KR-2 Extruder print head (Hyrel3D, Norcross, Ga.), which is an attachment of the system 30M 3D printer (Hyrel 3D, Norcross, Ga.). EDDT and GDMP inks are printed at room temperature whereas PDT ink is processed 60° C. These oligomers are crosslinked under 365 nm LEDs with an intensity of 0.8 mW $cm^2$, following extrusion from the printer. Samples are then postcured under 365 nm UV light for 15 minutes.

Differential Scanning Calorimetry (DSC).

DSC is performed using a TA Instruments Q2500 machine (New Castle, Del., USA). LC ink samples with a mass of approximately 10 mg are loaded into a standard aluminum DSC pan. Samples are equilibrated at −80° C. and heated to 120° C. to erase any thermal history, cooled to −80° C., then heated to 150° C., all at the same rate of 10° C. $min^{-1}$. The nematic-to-isotropic phase transition ($T_{NI}$) was measured using the minimum value of the endothermic well of the second heating cycle.

Liquid Crystal Ink Rheology.

A Discovery HR-3 Hybrid Rheometer (TA Instruments, New Castle, Del.) was used to characterize the rheological behavior of the LC inks. All flow experiments were conducted with 25 mm parallel plate geometries and tested with logarithmic shear rate sweeps from 0.1 to 100 $s^{-1}$. All rheological experiments are tested at a gap of 600 μm at their respective printing temperatures and after 3 hours of oligomerization to simulate ink printing conditions.

Gel Fraction Measurement.

LCEs were extracted in chloroform for 1 week to determine the gel fraction (GF) of the networks. LCE films were cut into rectangular samples measuring approximately 20 mm×5 mm×1 mm. Each sample was then placed in a vial of 25 mL of chloroform for the experiments. After 1 week, samples were removed from the swelling medium, dried for 24 h in an oven at 80° C. The GF was calculated by $$GF = \frac{Wf}{Wi} \times 100$$

where Wi is the initial dry weight of the sample and Wf is the final dry weight of the sample. Three samples (n=3) were tested for each composition.

Dynamic Mechanical Analysis (DMA).

DMA is performed using a TA Instruments RSA-G2 machine (New Castle, Del., USA). Polydomain LCE samples are created for DMA testing by photocrosslinking LC inks between two glass slides with 1 mm spacer using 365 nm UV light for 10 minutes. Rectangular samples measuring approximately 20×3×0.8 mm$^3$ are tested in tensile mode, with the active length measuring approximately 10 to 12 mm. Samples were cycled at 0.2% strain at 1 Hz and heated from −50 to 150° C. at a rate of 3° C. min$^{-1}$. All of samples are annealed at 80° C. and allowed to cool at room temperature for 24 h prior to testing. The glass transition temperature ($T_g$) is measured at a temperature corresponding the peak of tan δ curve.

Actuation Performance Measurement.

The actuation performance for the printed film is characterized using DMA machine described previously. Rectangular samples measuring approximately 15 mm×5 mm× 0.25 mm are tested in tensile mode. Then the actuation strain is measured with or without bias stress. A constant stress is applied to an LCE film; each sample is heated and cooled at least five time from 150 to 0° C., all at the same rate of 5° C. min−1. The magnitude of the strain and the hysteresis are measured in the second heating cycle. Thermal actuation response of the other 3D printed structures (disk, porous square, etc.) is characterized by image analysis (ImageJ) of the printed LCE structures from room temperature to a desired temperature above $T_{NI}$ (110° C.). Each structure was immersed in a silicone oil bath heated by a hot plate. The oil bath is allowed to reach a desired temperature and equilibrate for 3 min before the sample is photographed for image analysis. A GDMP-LCE composition, low temperature, is also shown actuating with hot water generated from the faucet (45° C.). The sample is placed in hot water for 2 min before photographed for image analysis. Actuation performance of the gripper is imaged with two silicone oil baths at 70° C. and 140° C., respectively. A copper wire was punctured through the middle of the "sensing" gripper to allow for ease of manipulation into and out of the baths. The gripper was then lowered to each respective bath toward a hollow, foil ring. The gripper was imaged as the gripper interacts with foil ring, either grasping or pulling away from the foil ring.

REFERENCES p2-1 M. Wehner, R. L. Truby, D. J. Fitzgerald, B. Mosadegh, G. M. Whitesides, J. A. Lewis, R. J. Wood, Nature 2016, 536, 451.
p2-2 S. I. Rich, R. J. Wood, C. Majidi, Nat. Electron. 2018, 1, 102.
p2-3 D. L. Thomsen, P. Keller, J. Naciri, R. Pink, H. Jeon, D. Shenoy, B. R. Ratna, Macromolecules 2001, 34, 5868.
p2-4 C. Ohm, M. Brehmer, R. Zentel, Adv. Mater. 2010, 22, 3366.
p2-5 Q. Zhao, H. J. Qi, T. Xie, Prog. Polym. Sci. 2015, 49, 79.
p2-6 A. Lendlein, S. Kelch, Angew. Chemie Int. Ed. 2002, 41, 2034.
p2-7 J. Kim, J. A. Hanna, M. Byun, C. D. Santangelo, R. C. Hayward, Science (80-.). 2012, 335, 1201.
p2-8 Y. Kim, H. Yuk, R. Zhao, S. A. Chester, X. Zhao, Nature 2018, 558, 274.
p2-9 X. Xu, H. Li, Q. Zhang, H. Hu, Z. Zhao, J. Li, J. Li, Y. Qiao, Y. Gogotsi, ACS Nano 2015, 9, 3969.
p2-10 T. J. White, D. J. Broer, Nat. Mater. 2015, 14, 1087.
p2-11 A. Lendlein, H. Jiang, O. Junger, R. Langer, Nature 2005, 434, 879.
p2-12 S. V Ahir, E. M. Terentjev, Nat. Mater. 2005, 4, 491.
p2-13 D. Rus, M. T. Tolley, Nature 2015, 521, 467.
p2-14 S. M. Mirvakili, I. W. Hunter, Adv. Mater. 2018, 30, 1704407.
p2-15 M. Urbanski, C. G. Reyes, J. Noh, A. Sharma, Y. Geng, V. S. R. Jampani, J. P. F. Lagerwall, J. Phys. Condens. Matter 2017, 29, 133003.
p2-16 S. Krause, R. Dersch, J. H. Wendorff, H. Finkelmann, Macromol. Rapid Commun. 2007, 28, 2062.
p2-17 C. Ohm, C. Serra, R. Zentel, Adv. Mater. 2009, 21, 4859.
p2-18 R. L. Truby, J. A. Lewis, Nature 2016, 540, 371.
p2-19 Q. Ge, H. J. Qi, M. L. Dunn, Appl. Phys. Lett. 2013, 103, 131901.
p2-20 Y. Mao, K. Yu, M. S. Isakov, J. Wu, M. L. Dunn, H. J. Qi, Sci. Rep. 2015, 5, 13616.
p2-21 A. S. Gladman, E. A. Matsumoto, R. G. Nuzzo, L. Mahadevan, J. A. Lewis, Nat. Mater. 2016, 15, 413.
p2-22 R. L. Truby, M. Wehner, A. K. Grosskopf, D. M. Vogt, S. G. M. Uzel, R. J. Wood, J. A. Lewis, Adv. Mater. 2018.
p2-23 Q. Ge, C. K. Dunn, H. J. Qi, M. L. Dunn, Smart Mater. Struct. 2014, 23, 94007.
p2-24 S. E. Bakarich, R. Gorkin, G. M. Spinks, Macromol. Rapid Commun. 2015, 36, 1211.
p2-25 M. Warner, E. M. Terentjev, Liquid crystal elastomers; OUP Oxford, 2003; Vol. 120.
p2-26 H. Finkelmann, H. Kock, G. Rehage, Die Makromol. Chemie, Rapid Commun. 1981, 2, 317.
p2-27 R. S. Kularatne, H. Kim, J. M. Boothby, T. H. Ware, J. Polym. Sci. Part B Polym. Phys. 2017, 55, 395.
p2-28 Z. Pei, Y. Yang, Q. Chen, E. M. Terentjev, Y. Wei, Y. Ji, Nat. Mater. 2014, 13, 36.
p2-29 T. H. Ware, M. E. McConney, J. J. Wie, V. P. Tondiglia, T. J. White, Science (80-.). 2015, 347, 982.
p2-30 A. Kotikian, R. L. Truby, J. W. Boley, T. J. White, J. A. Lewis, Adv. Mater. 2018.
p2-31 M. López—Valdeolivas, D. Liu, D. J. Broer, C. Sinchez—Somolinos, Macromol. Rapid Commun. 2018, 39, 1700710.
p2-32 C. P. Ambulo, J. J. Burroughs, J. M. Boothby, H. Kim, M. R. Shankar, T. H. Ware, ACS Appl. Mater. Interfaces 2017, 9, 37332.
p2-33 D. J. Broer, H. Finkelmann, K. Kondo, Die Makromol. Chemie Macromol. Chem. Phys. 1988, 189, 185.
p2-34 H. Yang, L. Wang, R. Shao, N. A. Clark, J. Ortega, J. Etxebarria, P.-A. Albouy, D. M. Walba, P. Keller, J. Mater. Chem. 2009, 19, 7208.
p2-35 T. H. Ware, Z. P. Perry, C. M. Middleton, S. T. Iacono, T. J. White, ACS Macro Lett. 2015, 4, 942.
p2-36 C. M. Yakacki, M. Saed, D. P. Nair, T. Gong, S. M. Reed, C. N. Bowman, RSC Adv. 2015, 5.
p2-37 M. K. McBride, M. Hendrikx, D. Liu, B. T. Worrell, D. J. Broer, C. N. Bowman, Adv. Mater. 2017, 29.
p2-38 M. O. Saed, A. H. Torbati, D. P. Nair, C. M. Yakacki, J. Vis. Exp. 2016, 2016.
p2-39 H. Kim, J. M. Boothby, S. Ramachandran, C. D. Lee, T. H. Ware, Macromolecules 2017, 50, 4267.
p2-40 D. Merkel, N. A. Traugutt, R. Visvanathan, C. M. Yakacki, C. P. Frick, Soft Matter 2018.
p2-41 C. E. Hoyle, C. N. Bowman, Angew. Chemie Int. Ed. 2010, 49, 1540.

p2-42 M. O. Saed, R. H. Volpe, N. A. Traugutt, R. Visvanathan, N. A. Clark, C. M. Yakacki, Soft Matter 2017, 13, 7537.

p2-43 M. O. Saed, A. H. Torbati, C. A. Starr, R. Visvanathan, N. A. Clark, C. M. Yakacki, J. Polym. Sci. Part B Polym. Phys. 2017, 55, 157.

p2-44 K. A. Burke, I. A. Rousseau, P. T. Mather, Polymer (Guildf). 2014, 55, 5897.

p2-45 W. Brostow, T. Sterzynski, S. Triouleyre, Polymer (Guildf). 1996, 37, 1561.

p2-46 S. Disch, C. Schmidt, H. Finkelmann, Macromol. Rapid Commun. 1994, 15, 303.

p2-47 B. G. Compton, J. A. Lewis, Adv. Mater. 2014, 26, 5930.

p2-48 J.-F. Berret, D. C. Roux, G. Porte, P. Lindner, EPL (Europhysics Lett. 1994, 25, 521.

p2-49 C. J. Diederich, Int. J. Hyperth. 2005, 21, 745.

p2-50 D. W. Hanzon, N. A. Traugutt, M. K. McBride, C. N. Bowman, C. M. Yakacki, K. Yu, Soft Matter 2018, 14, 951.

Those skilled in the art to which this application relates will appreciate that other and further additions, deletions, substitutions and modifications may be made to the described embodiments.

What is claimed is:

1. A liquid crystal ink for ink-extrusion printing, comprising:
   a mixture including liquid crystal diacrylate monomers and a chain extending monomer selected from the group consisting of a primary amine chain extending monomer, 2,2'-(ethylenedioxy)diethanethiol, glycol di(3-mercaptopropionate), 1,3-propanedithiol, nonanedithiol, ethanedithiol, hexanedithiol, and combinations thereof,
   wherein at least some of the liquid crystal diacrylate monomers are part of liquid crystal oligomers of the ink,
      wherein the chain extending monomer is incorporated between some or all of the liquid crystal diacrylate monomers and terminates the liquid crystal oligomers, and
   wherein the mixture when at a target printing temperature is in a nematic phase.

2. The ink of claim 1, wherein the ink has a nematic to isotropic transition temperature (TNI) in a range from about 0 to 150° C.

3. The ink of claim 1, wherein the liquid crystal oligomers having an average molecular weight in a range from about 2 kD to 25 kD.

4. The method of claim 1, wherein the liquid crystal monomers include one or more substituted or unsubstituted 1,4-bis-[(acryloyloxyalkyloxy)benzoyloxy] benzene liquid crystal monomers having the formula:

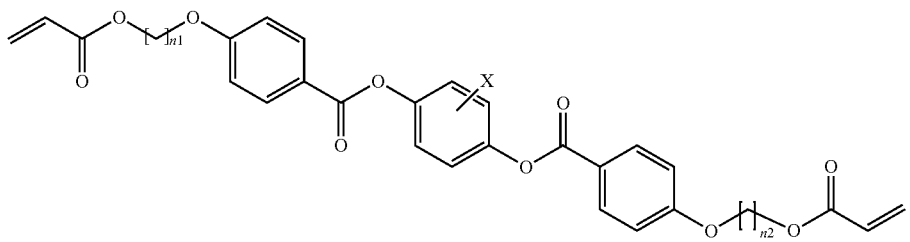

wherein $n_1$ and $n_2$ are integers in a range from 3 to 6, and X is —H, —CH$_3$ or —F.

5. The ink of claim 4, wherein the liquid crystal monomers include a first substituted or unsubstituted 1,4-bis-[(acryloyloxyalkyloxy)benzoyloxy] benzene liquid crystal monomer wherein $n_1=n_2$ and X is —H, —CH$_3$, or —F.

6. The ink of claim 5, wherein the liquid crystal monomers further include a second substituted or unsubstituted 1,4-bis-[(acryloyloxyalkyloxy)benzoyloxy] benzene liquid crystal monomer wherein X is —H, —CH$_3$, or —F and $n_1=n_2$ but the $n_1$ and $n_2$ of the second substituted or unsubstituted 1,4-bis-[(acryloyloxyalkyloxy)benzoyloxy] benzene liquid crystal monomer are not equal to the $n_1$ and $n_2$ of the first substituted or unsubstituted 1,4-bis-[(acryloyloxyalkyloxy)benzoyloxy] benzene liquid crystal monomer.

7. The ink of claim 6, wherein:
   for the first substituted or unsubstituted 1,4-bis-[(acryloyloxyalkyloxy)benzoyloxy] benzene liquid crystal monomer, $n_1=n_2=6$ and X=—CH$_3$ to provide 1,4-bis-[4-(6-acryloyloxhexyloxy)benzoyloxy]-2-methylbenzene;
   for the second substituted or unsubstituted 1,4-bis-[(acryloyloxyalkyloxy)benzoyloxy] benzene liquid crystal monomer, $n_1=n_2=3$ and X=—CH$_3$ to provide 1,4-Bis-[4-(3-acryloyloxypropyloxy)benzoyloxy]-2-methylbenzene; and
   a molar ratio of the first substituted or unsubstituted 1,4-bis-[(acryloyloxyalkyloxy)benzoyloxy] benzene liquid crystal monomer:second substituted or unsubstituted 1,4-bis-[(acryloyloxyalkyloxy)benzoyloxy] benzene liquid crystal monomer is in a range from about 25:75 to 75:25.

8. The ink of claim 1, wherein the primary amine chain extending monomer comprises a covalently linked series of three to ten carbon atoms and a primary amine end functional group.

9. The ink of claim 1, wherein the primary amine chain extender is n-butylamine.

10. The ink of claim 5, wherein X is —CH$_3$.

11. The ink of claim 6, wherein X is —CH$_3$.

12. The ink of claim 7, wherein the molar ratio of the first substituted or unsubstituted 1,4-bis-[(acryloyloxyalkyloxy)benzoyloxy] benzene liquid crystal monomer:second substituted or unsubstituted 1,4-bis-[(acryloyloxyalkyloxy)benzoyloxy] benzene liquid crystal monomer is 50:50.

* * * * *

UNITED STATES PATENT AND TRADEMARK OFFICE
CERTIFICATE OF CORRECTION

PATENT NO. : 11,780,154 B2
APPLICATION NO. : 17/238771
DATED : October 10, 2023
INVENTOR(S) : Taylor H. Ware et al.

It is certified that error appears in the above-identified patent and that said Letters Patent is hereby corrected as shown below:

In the Claims

Column 33, Line 51, Claim 4, delete "method" and insert -- ink --

Column 34, Line 20, Claim 7, delete "acryloyloxhexyloxy" and insert -- acryloyloxyhexyloxy --

Column 34, Line 24, Claim 7, delete "Bis" and insert -- bis --

Signed and Sealed this
Twelfth Day of December, 2023

*Katherine Kelly Vidal*

Katherine Kelly Vidal
*Director of the United States Patent and Trademark Office*